(12) United States Patent
Adachi

(10) Patent No.: US 7,773,776 B2
(45) Date of Patent: Aug. 10, 2010

(54) IMAGE PROCESSING APPARATUS, IMAGE FORMING APPARATUS, IMAGE READING PROCESS APPARATUS, IMAGE PROCESSING METHOD, IMAGE PROCESSING PROGRAM, AND COMPUTER-READABLE STORAGE MEDIUM

(75) Inventor: Yasushi Adachi, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 925 days.

(21) Appl. No.: 11/334,519

(22) Filed: Jan. 19, 2006

(65) Prior Publication Data
US 2006/0165285 A1 Jul. 27, 2006

(30) Foreign Application Priority Data
Jan. 21, 2005 (JP) ............................. 2005-014803

(51) Int. Cl.
G06K 9/00 (2006.01)
G06K 9/46 (2006.01)
G06K 15/00 (2006.01)
H04N 1/40 (2006.01)

(52) U.S. Cl. ...................... 382/112; 382/190; 358/3.06; 358/2.1; 358/462

(58) Field of Classification Search ................. 382/190, 382/112; 356/3.1; 358/3.06, 2.1, 462
See application file for complete search history.

(56) References Cited

U.S. PATENT DOCUMENTS
5,018,024 A * 5/1991 Tanioka ...................... 358/2.1

FOREIGN PATENT DOCUMENTS

| JP | 3093235 B2 | 7/2000 |
|---|---|---|
| JP | 2001-218046 A | 8/2001 |
| JP | 2002-77623 A | 3/2002 |
| JP | 2004-96535 A | 3/2004 |
| JP | 2004-102551 A | 4/2004 |
| JP | 2004-328292 A | 11/2004 |

* cited by examiner

Primary Examiner—Bhavesh M Mehta
Assistant Examiner—Kathleen S Yuan
(74) Attorney, Agent, or Firm—Birch, Stewart, Kolasch & Birch, LLP

(57) ABSTRACT

An image processing apparatus is provided with a halftone frequency determining section for determining a halftone frequency of an image data consisting of plural color components. The halftone frequency determining section is provided with a flat halftone discriminating section for extracting information of density distribution per segment block, and discriminating, based on the information of density distribution, whether or not the segment block is a flat halftone region in which density transition is low; a threshold value determining section for determining a threshold value by using an adjusting value that is predetermined in accordance with a reading property of the image reading apparatus with respect to respective color components, the threshold value being for use in extraction of the binary data of the pixel density; a maximum transition number averaging section for averaging the transition numbers of the binary data, the transition numbers being worked out by using the threshold value; and a halftone frequency estimating section for estimating the halftone frequency, based on the average. With this arrangement, it is possible to realize an image processing apparatus capable of performing highly accurate halftone frequency determination even for composite color halftone.

23 Claims, 32 Drawing Sheets

FIG. 4 (a)

| f(0,0) | f(0,1) | f(0,2) |
|--------|--------|--------|
| f(1,0) | f(1,1) | f(1,2) |
| f(2,0) | f(2,1) | f(2,2) |

FIG. 4 (b)

| 1  | 2  | 1  |
|----|----|----|
| 0  | 0  | 0  |
| -1 | -2 | -1 |

FIG. 4 (c)

| 1 | 0 | -1 |
|---|---|----|
| 2 | 0 | -2 |
| 1 | 0 | -1 |

| f(0,0) | f(0,1) | f(0,2) | f(0,3) | f(0,4) |
|--------|--------|--------|--------|--------|
| f(1,0) | f(1,1) | f(1,2) | f(1,3) | f(1,4) |
| f(2,0) | f(2,1) | f(2,2) | f(2,3) | f(2,4) |
| f(3,0) | f(3,1) | f(3,2) | f(3,3) | f(3,4) |
| f(4,0) | f(4,1) | f(4,2) | f(4,3) | f(4,4) |

Ns1/Np1 > THr1
THr1 ≧ Ns2/Np2 ≧ THr2

Ns1/Np1 < THr2
THr1 ≧ Ns2/Np2 ≧ THr2

⟋⟋ : MAGENTA, 50%

⟋⟋ : CYAN, 20%

FIG. 23 (a)

| -10 | -10 | -10 | -10 | -10 | -10 | -10 | -10 | -10 |
|---|---|---|---|---|---|---|---|---|
| -10 | -10 | 18 | 18 | 18 | 18 | 18 | -10 | -10 |
| -10 | 18 | 16 | 16 | 16 | 16 | 16 | 18 | -10 |
| -10 | 18 | 16 | 16 | 20 | 16 | 16 | 18 | -10 |
| -10 | 18 | 16 | 20 | 24 | 20 | 16 | 18 | -10 |
| -10 | 18 | 16 | 16 | 20 | 16 | 16 | 18 | -10 |
| -10 | 18 | 16 | 16 | 16 | 16 | 16 | 18 | -10 |
| -10 | -10 | 18 | 18 | 18 | 18 | 18 | -10 | -10 |
| -10 | -10 | -10 | -10 | -10 | -10 | -10 | -10 | -10 |

FIG. 23 (b)

| -2 | -2 | -2 | -2 | -2 | -2 | -2 | -2 | -2 |
|---|---|---|---|---|---|---|---|---|
| -2 | -2 | -2 | -1 | 5 | -1 | -2 | -2 | -2 |
| -2 | -2 | 10 | 10 | 10 | 10 | 10 | -2 | -2 |
| -2 | -1 | 10 | 16 | 20 | 16 | 10 | -1 | -2 |
| -2 | 5 | 10 | 20 | 24 | 20 | 10 | 5 | -2 |
| -2 | -1 | 10 | 16 | 20 | 16 | 10 | -1 | -2 |
| -2 | -2 | 10 | 10 | 10 | 10 | 10 | -2 | -2 |
| -2 | -2 | -2 | -1 | 5 | -1 | -2 | -2 | -2 |
| -2 | -2 | -2 | -2 | -2 | -2 | -2 | -2 | -2 |

FIG. 23 (c)

| -2 | -2 | -2 | -2 | -2 | -2 | -2 | -2 | -2 |
|---|---|---|---|---|---|---|---|---|
| -2 | -2 | -2 | -1 | 0 | -1 | -2 | -2 | -2 |
| -2 | -2 | 2 | 4 | 10 | 4 | 2 | -2 | -2 |
| -2 | -1 | 4 | 16 | 20 | 16 | 4 | -1 | -2 |
| -2 | 0 | 10 | 20 | 24 | 20 | 10 | 0 | -2 |
| -2 | -1 | 4 | 16 | 20 | 16 | 4 | -1 | -2 |
| -2 | -2 | 2 | 4 | 10 | 4 | 2 | -2 | -2 |
| -2 | -2 | -2 | -1 | 0 | -1 | -2 | -2 | -2 |
| -2 | -2 | -2 | -2 | -2 | -2 | -2 | -2 | -2 |

FIG. 24 (a)

| 1 | 1 | 1 | 0 | −1 | −1 | −1 |
|---|---|---|---|---|---|---|
| 1 | 1 | 1 | 0 | −1 | −1 | −1 |
| 1 | 1 | 1 | 0 | −1 | −1 | −1 |
| 1 | 1 | 1 | 0 | −1 | −1 | −1 |
| 1 | 1 | 1 | 0 | −1 | −1 | −1 |
| 1 | 1 | 1 | 0 | −1 | −1 | −1 |
| 1 | 1 | 1 | 0 | −1 | −1 | −1 |

FIG. 24 (b)

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 1 | 1 | 1 | 1 |
| 0 | 0 | 0 | 0 | 0 | 0 | 0 |
| −1 | −1 | −1 | −1 | −1 | −1 | −1 |
| −1 | −1 | −1 | −1 | −1 | −1 | −1 |
| −1 | −1 | −1 | −1 | −1 | −1 | −1 |

FIG. 32 (a)
| 190 | 120 | 150 | 120 | 100 | 70 | 100 | 70 | 30 | 70 |
FIG. 32 (b)
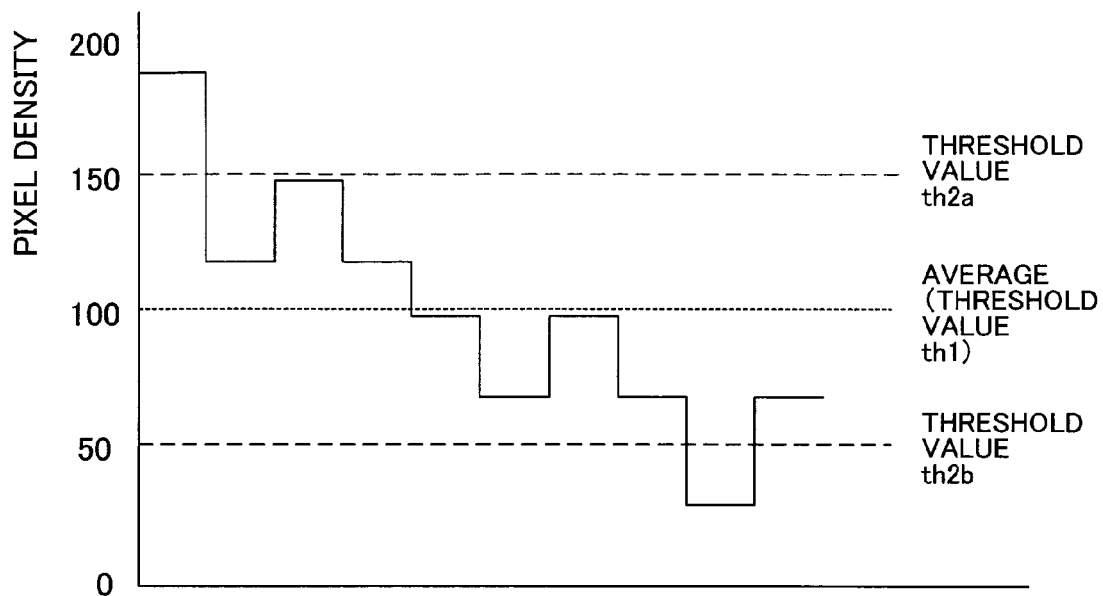
FIG. 32 (c)
FIG. 32 (d)

IMAGE PROCESSING APPARATUS, IMAGE FORMING APPARATUS, IMAGE READING PROCESS APPARATUS, IMAGE PROCESSING METHOD, IMAGE PROCESSING PROGRAM, AND COMPUTER-READABLE STORAGE MEDIUM

This Nonprovisional application claims priority under 35 U.S.C. §119(a) on Patent Application No. 2005/014803 filed in Japan on Jan. 21, 2005, the entire contents of which are hereby incorporated by reference.

FIELD OF THE INVENTION

The present invention relates to an image processing apparatus and image processing method in which a level of halftone frequency of an image signal obtained by document scanning is determined (i.e. found out) and process is suitably carried out based on the determined level of halftone frequency so as to improve quality of an outputted image. The image processing apparatus and image processing method are for use in digital copying machines, facsimile machines, and the like. The present invention further relates to an image reading process apparatus and image forming apparatus provided with the same, and to a program and a storage medium.

BACKGROUND OF THE INVENTION

In digital color image input apparatuses (such as digital scanners, digital still cameras, and the like), tristimulus color information (R, G, B) is obtained via a solid-state image sensing element (CCD) that serves as a color separation system. The tristimulus color information, which is obtained in a form of analog signals, is then converted to digital signals, which are used as input signals that represent input color image data (color information). Segmentation is carried out so that display or output is carried out most suitably according to the signals obtained via the image input apparatus. The segmentation partitions a read document image into regions of equivalent properties so that each region can be processed with image process most suitable thereto. This makes it possible to reproduce a good-quality image.

In general, the segmentation of a document image includes discriminating a text region, a halftone region (halftone area) and photo region (in another words, contone region, which is sometimes expressed as other region) in the document image to read, so that quality improvement process can be switched over for the determined respective regions. This attains higher reproduction quality of the image.

Furthermore, the halftone regions (image) have halftone varied from low frequencies to high frequencies, such as 65 line/inch, 85 line/inch, 100 line/inch, 120 line/inch, 133 line/inch, 150 line/inch, 175 line/inch, 200 line/inch, and the like. Therefore, various methods have been proposed for determining halftone frequencies so as to perform suitable process according to the determination.

For example, Japanese Unexamined Patent Publication, Tokukai, No. 2001-218046 (published on Aug. 10, 2001) discloses a method in which a similar peak is determined from a degree of similarity between a current block and a block located within a region which is distanced from the current block by a given number of pixels, and if the region is a halftone region, a halftone frequency is determined (i.e., found out) based on a peak nearest to a center of the halftone region.

Moreover, Japanese Patent No. 3093235 (issued on Oct. 3, 2000), and Japanese Unexamined Patent Publication No. 2002-77623 (published on Mar. 15, 2002) disclose a method in which halftone frequency determination is performed based on a number of peak pixels, which is a number of peak pixels in a predetermined number of block where the peak pixels are found using a mask of M pixels×N pixels (where M and N are integers predetermined experimentally).

Moreover, for example, Japanese Unexamined Patent Publication No. 2004-96535 (published on Mar. 25, 2004) discloses a method in which absolute differences in pixel value between given pixels and pixels adjacent thereto are compared with a first threshold value so as to calculate out (find out) a number of pixels (low-frequency halftone pixels) whose absolute differences in pixel value are larger than the first threshold value, and then this number of the pixels is compared with a second threshold value so as to obtain a comparison result on which the halftone frequency of a halftone region is estimated (i.e., determined).

Moreover, Japanese Unexamined Patent Publications, Tokukai, No. 2004-102551 (published on Apr. 2, 2004), and No. 2004-328292 (published on November 18) disclose methods for determining a halftone frequency based on a number of changeover (i.e., transition number) of the binary values of binary data of an input image.

According to Japanese Unexamined Patent Publication, Tokukai, No. 2001-218046 (published on Aug. 10, 2001), whether the halftone is composite color halftone or single-color halftone is not taken into consideration it is difficult to accurately determine the halftone frequency with respect to the composite color halftone region.

According to Japanese Patent No. 3093235 (issued on Oct. 3, 2000), and Japanese Unexamined Patent Publication No. 2002-77623 (published on Mar. 15, 2002), the halftone frequency determination is performed based on the number of peak pixels of the predetermined number of blocks. However, a composite color halftone and a single-color halftone of like halftone frequency give largely different numbers of peak pixels, where the composite color halftone is a halftone consisting of at least two of cyan (hereinafter, C), magenta (hereinafter, M), yellow (hereinafter, Y), and black (hereinafter K), and the single-color halftone is a halftone consisting of one of CMYK. In other words, it is difficult to distinguish the composite color halftone and the single-color halftone having similar numbers of peak pixels but different halftone frequencies. For example, it is difficult to distinguish a 133 line/inch composite color halftone and 175 line/inch single-color halftone, which have similar numbers of peak pixels. Therefore, it is impossible to extract a number of peak pixels of a particular color component.

Moreover, Japanese Unexamined Patent Publications, Tokukai, No. 2004-96535 (published on Mar. 25, 2004) extracts the low-frequency halftone pixels whose absolute differences in pixel value between the given pixels and adjacent pixels are larger than the first threshold value, and the judgment as to whether the halftone is low or high is made based on the number of the low-frequency halftone pixels. Therefore, in is difficult to determine the halftone frequency accurately.

In the methods disclosed in Japanese Unexamined Patent Publications, Tokukai, No. 2004-102551 (published on Apr. 2, 2004), and No. 2004-328292 (published on November 18), the halftone frequency is determined based the number of changeover (i.e., transition number) of the binary values of the binary data of the input image, but no information of density distribution is taken into consideration. Therefore, with this method, binarization of a halftone region in which density transition is high is associated with the following problem (here, what is meant by the term "density" is "density in color, that is, pixel value in color". So, for example, what is meant by the term "pixel density" is "density of color of the pixel", but not population of the pixels").

FIG. 32(a) illustrates an example of one line along a main scanning direction of segment blocks in a halftone region in which the density transition is high. FIG. 32(b) illustrates the change of the density in FIG. 32(a). Here, it is put, for example, that a threshold value th1 illustrated in FIG. 32(b) is used as a threshold value for generation of binary data. In this case, as illustrated in FIG. 32(d), the segment blocks are discriminated into white pixel portions (that represent low-density halftone portion) and black pixel portions (that represent high-density halftone portion), thereby failing to attain such extraction in which black pixel portions (that represent a printed portion in the halftone) are extracted as illustrated in FIG. 32(c). Use of the other threshold value values th2a and th2b gives the same result. With such extraction as illustrated in FIG. 32(d), it is impossible to generate binary data that reproduce halftone frequency accurately. This results in inaccurate halftone frequency determination.

SUMMARY OF THE INVENTION

An object of the present invention is to provide an image processing apparatus and an image processing method, which are capable to extract a feature of a particular color component selectively, and further to provide (a) an image reading process apparatus and an image forming apparatus provided with the image processing apparatus, (b) an image processing program, and a computer-readable storage medium in which the image processing program is stored. More specifically, the object of the present invention is to provide an image processing apparatus and an image processing method which allows highly accurate halftone frequency determination by determining, as having the same halftone frequencies, a composite color halftone and a single-color halftone that have the same halftone frequencies but are largely different in number of peak pixels in a current block, and further to provide (a) an image reading process apparatus and an image forming apparatus provided with the image processing apparatus, (b) an image processing program, and a computer-readable storage medium in which the image processing program is stored.

In order to attain the object, an image processing apparatus according to the present invention is provided with a halftone frequency determining section for determining a halftone frequency of an image that has been read from a document by an image reading apparatus, the halftone frequency determining section being arranged as follows. The halftone frequency determining section is provided with a flat halftone discriminating section for extracting information of density distribution per segment block consisting of a plurality of pixels, and discriminating, based on the information of density distribution, whether the segment block is a flat halftone region which is a halftone region in which density transition is low, or a non-flat halftone region which is a halftone region in which the density transition is high; a threshold value determining section for determining a threshold value by using an adjusting value that is predetermined in accordance with a reading property of the image reading apparatus with respect to respective color components, the threshold value being for use in extraction of a feature of density transition between pixels (an example of a feature of the segment block that represents a state of the density transition between pixels); an extracting section for extracting, by using the threshold value determined by the threshold value determining section, the feature of density transition between pixels of the segment block which the flat halftone discriminating section discriminates as the flat halftone region; and a halftone frequency estimating section for estimating the halftone frequency, based on the feature extracted by the extracting section.

Here, the segment block is not limited to a rectangular region and may have any kind of shape arbitrarily.

In this arrangement, the flat halftone discriminating section extracts information of density distribution per segment block consisting of a plurality of pixels, and discriminates, based on the information of density distribution, whether a given segment block is a flat halftone region (in which the density transition is low) or a non-flat halftone region (in which the density transition is high). Then, the extracting section extracts the feature of density transition between pixels of the segment block which the flat halftone discriminating section discriminates as the flat halftone region. The halftone frequency is determined based on the feature.

As described above, the halftone frequency is determined based on the feature of the segment block which is included in the flat halftone region in which the density transition is low. That is, the determination of the halftone frequency is carried out after removing the influence of the non-flat halftone region in which the density transition is high and which causes erroneous halftone frequency determination. In this way, accurate halftone frequency determination is attained.

Moreover, the reading property of the image reading apparatus with respect to respective color components is, for example, a filter spectral property of the image reading apparatus (such as a scanner) with respect to the respective color component, a spectral reflection property of ink with respect to the respective color component, or the like property of the image reading apparatus. For instance, G (green) image data is theoretically consists of only magenta, which is in a complementary color of green. However, in reality, unnecessary cyan component is also mixed in the G (green) image data due to the reading property of the image reading apparatus with respect to the document. An extent of influence given by the cyan component is varied depending on the reading property.

Therefore, the adjusting value is predetermined considering the extent of the influence given to the image data by the unnecessary color component other than the particular color component. The use of the adjusting value in determining the threshold value, the threshold value determining section can determine the threshold value so that the influence given by the unnecessary color component is removed from the threshold value.

Further, the extracting section extracts the feature of density transition between pixels according to the threshold value determined by the threshold value determining section. With this, the feature extracted by the extracting section is not influenced by the unnecessary color component. Therefore, the halftone frequency determination based on the particular color component can be performed by determining the halftone frequency from the feature extracted from the extracting section. That is, it is possible to perform highly accurate halftone frequency determination even for the composite color halftone region.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4(a) is an explanatory view illustrating an example of a block memory for use in convolution operation for detecting a text pixel by a text pixel detecting section provided to the document type automatic discrimination section.

FIG. 4(b) is an explanatory view illustrating an example of a filter coefficient for use in the convolution operation of input image data for detecting a text pixel by the text pixel detecting section provided to the document type automatic discrimination section.

FIG. 4(c) is an explanatory view illustrating an example of another filter coefficient for use in the convolution operation of input image data for detecting a text pixel by the text pixel detecting section provided to the document type automatic discrimination section.

FIG. 23(a) is an explanatory view illustrating an example of filter coefficients corresponding to FIG. 22(a).

FIG. 23(b) is an explanatory view illustrating an example of filter coefficients corresponding to FIG. 22(b).

FIG. 23(c) is an explanatory view illustrating an example of filter coefficients corresponding to FIG. 22(c).

FIG. 24(a) is an explanatory view illustrating an example of a filter coefficient for use in a low-frequency edge filter for use in detecting a character on halftone, the low-frequency edge filter being used according to the halftone frequency.

FIG. 24(b) is an explanatory view illustrating another example of a filter coefficient for use in a low-frequency edge filter for use in detecting a character on halftone, the low-frequency edge filter being used according to the halftone frequency.

FIG. 32(a) is a view illustrating an example of one line along a main scanning direction of a segment block in a halftone region in which density transition is high.

FIG. 32(b) is a view illustrating relationship between the density transition and a threshold value in FIG. 32(a).

FIG. 32(c) is a view illustrating binary data, which correctly reproduces the halftone frequency of FIG. 32(a).

FIG. 32(d) is a view illustrating binary data generated using a threshold value th1 indicated FIG. 32 (b).

DESCRIPTION OF THE EMBODIMENTS

First Embodiment

One embodiment of the present invention is described below referring to FIGS. 1 to 29.

<Overall Arrangement of Image Forming Apparatus>

Figure 2:
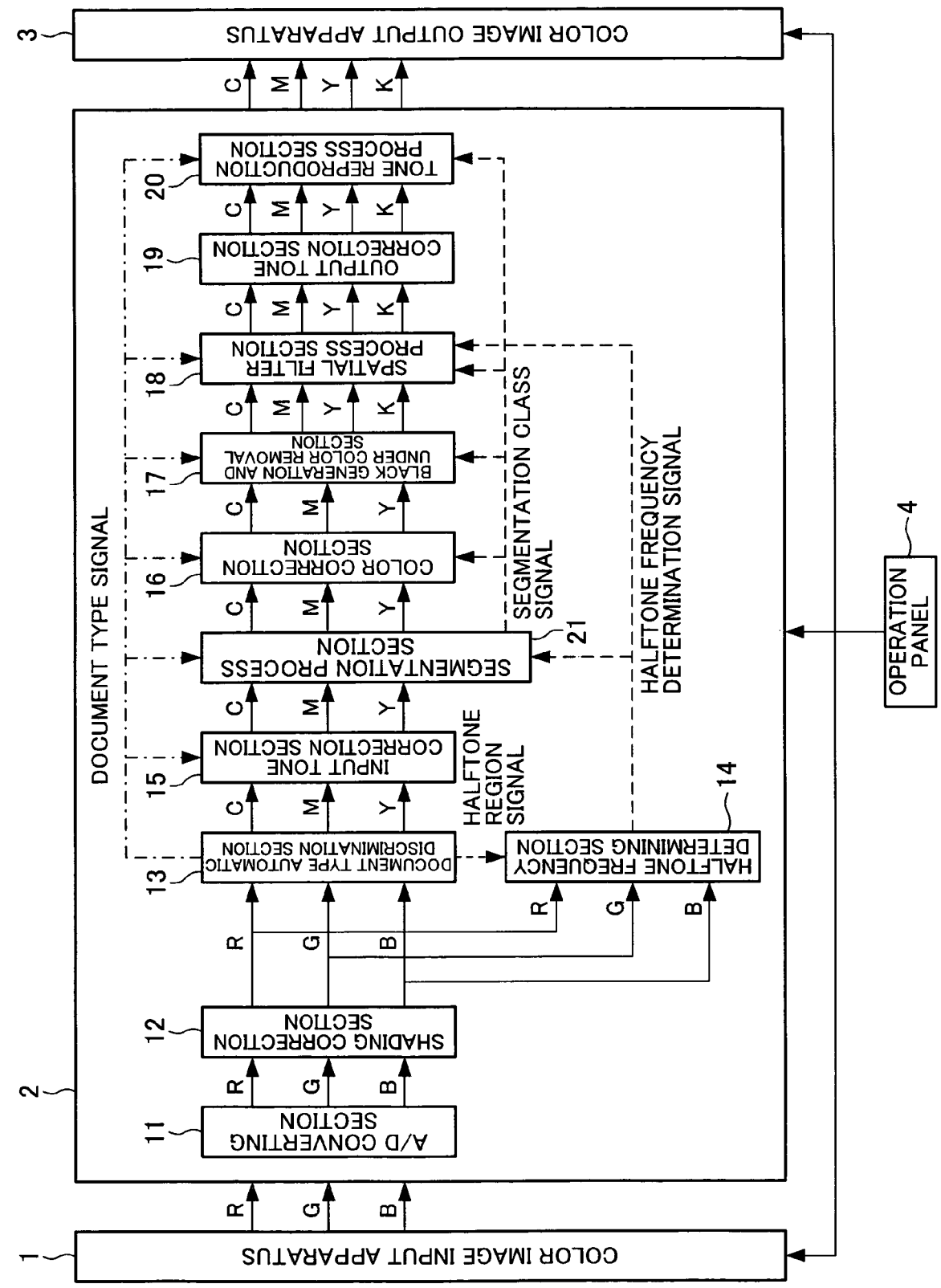
FIG. 2 is a block diagram illustrating an arrangement of the image forming apparatus according to the present invention.

As illustrated in FIG. 2, an image forming apparatus according to the present embodiment is provided with a color image input apparatus 1, an image processing apparatus 2, a color image output apparatus 3, and an operation panel 4.

The operation panel 4 is provided with a setting key(s) for setting an operation mode of the image forming apparatus (e.g., digital copier), ten keys, a display section (constituted by a liquid crystal display apparatus or the like), and the like.

The color image input apparatus 1 is provided with a scanner section, for example. The color image input apparatus reads reflection image from a document via a CCD (Charge Coupled Device) as RGB analog signals (R: red; G: green; and B: blue).

The color image output apparatus 3 is an apparatus for outputting a result of a given image process performed by the image processing apparatus 2.

The image processing apparatus 2 is provided with an A/D (analog/digital) converting section 11, a shading correction section 12, a document type automatic discrimination section 13, a halftone frequency determining section (halftone frequency determining means) 14, an input tone correction section 15, a color correction section 16, a black generation and under color removal section 17, a spatial filter process section 18, an output tone correction section 19, a tone reproduction process section 20, and a segmentation process section 21.

By the A/D converting section 11, the analog signals obtained via the color image input apparatus 1 are converted into digital signals.

The shading correction section 12 performs shading correction to remove various distortions which are caused in an illumination system, focusing system, and/or image pickup system of the color image input apparatus 2.

By the document type automatic discrimination section 13, the RGB signals (reflectance signals respectively regarding RGB) from which the distortions are removed by the shading correction section 12 are converted into signals (such as density signals) which are adopted in the image processing apparatus 2 and easy to handle for the image processing system. Further, the document type automatic discrimination section 13 performs discrimination of the obtained document image, for example, as to whether the document image is a text document, a printed photo document (halftone), a photo (contone), or a text/printed photo document (a document on which a character and a photo are printed in combination). According to the document type discrimination, the document type automatic discrimination section 13 outputs a document type signal to the input tone correction section 15, the segmentation process section 21, the color correction section 16, the black generation and under color removal section 17, the spatial filter process section 18, and the tone reproduction process section 20. The document type signal indicates the type of the document image. Moreover, according to the document type discrimination, the document type automatic discrimination section 13 outputs a halftone region signal to the halftone frequency determining section 14. The halftone region signal indicates the halftone region.

The halftone frequency determining section 14 determines (i.e. finds out) the halftone frequency in the halftone region from the feature that indicates the halftone frequency. The halftone frequency determining section 14 will be described later.

The input tone correction section 15 performs image quality adjustment process according to the discrimination made by the document type automatic discrimination section 13. Examples of the image quality adjustment process include: omission of page background region density, contrast adjustment, etc.

Based on the discrimination made by the document type automatic discrimination section 13, the segmentation process section 21 performs segmentation to discriminate the pixel in question as to whether the pixel in question is in a text region, a halftone region, a photo region (or another region). Based on the segmentation, the segmentation process section 21 outputs a segmentation class signal to the color correction section 16, the black generation and under color removal section 17, the spatial filter process section 18, and the tone reproduction process section 20. The segmentation class signal indicates to which type of region each pixel belongs.

In order to realize accurate color reproduction, the color correction section 16 performs color correction process for eliminating color impurity including components unnecessarily absorbed due to spectral characteristics of CMY (C: Cyan, M: Magenta, Y: Yellow) color materials that include unnecessary absorption components.

The black generation and under color removal section 17 performs black generating process to generate a black (K) signal from the three CMY color signals subjected to the color correction, and performs page background color removal process to remove from the CMY signal the K signal obtained by the black generating, thereby to obtain new CMY signals. As a result of the processes (black generating process and page background color removal process), the three colors signals are converted into four CMYK color signals.

The spatial filter process section 18 performs spatial filter process using a digital filter. The spatial filter process corrects spatial frequency property thereby to prevent blurring of output image and graininess deterioration.

The output tone correction section 19 performs output tone correction process to convert the signals such as the density signal into a halftone region ratio, which is a property of the image output apparatus.

The tone reproduction process section 20 performs tone reproduction process (intermediate tone generation process). The tone reproduction process decomposes the image into pixels and makes it possible to reproduce tones of the pixels.

An image region extracted as a black character, or as a color character in some cases, by the segmentation process section 21 is subjected to sharpness enhancement process performed by the spatial filter process section 18 to enhance the high halftone frequency thereby to be able to reproduce the black character or the color character with higher reproduction quality. In performing the above process, the spatial filter process section 18 performs the process based on the halftone frequency determination signal sent thereto from the halftone frequency determining section 14. This will be discussed later. In the intermediate tone generating process, binarization or multivaluing process for a high resolution screen suitable for reproducing the high halftone frequency is selected.

On the other hand, the region judged as being of the halftone by the segmentation process section 21 is subjected to a low-pass filter process by the spatial filter process section 18 to remove input halftone component. The spatial filter process section 18 performs the low-pass filter process based on the halftone frequency determination signal sent thereto from the halftone frequency determining section 14. This process will be described later. Moreover, in the intermediate tone generating process, the binarization or multivaluing process for a screen for high tone reproduction quality is performed.

In the region segmented as a photo by the segmentation process section 21, the binarization or multivaluing process for a screen for high tone reproduction quality is performed.

The image date subjected to the above-mentioned processes is stored temporally in storage means (not illustrated) and read out to the color image output apparatus 3 at a predetermined timing. The above-mentioned processes are carried out by a CPU (Central Processing Unit).

The color image output apparatus 3 outputs the image data on a recording medium (for example, paper or the like). The color image output apparatus 3 is not particularly limited. For example, the color image output apparatus 3 may be an electronic photographic color image forming apparatus, an ink-jet color image forming apparatus, or the like.

The document type automatic discrimination section 13 is not inevitably necessary. The halftone frequency determining section 14 may be used in lieu of the document type automatic discrimination section 13. In this arrangement, pre-scanned image data or image data that has been subjected to the shading correction is stored in a memory such as a hard disc or the like. The judgment whether or not the image data includes a halftone region is made by using the stored image data, and the determination of the halftone frequency is carried out based on the judgment.

<Document Type Automatic Discrimination Section>

Next, the image process performed by the document type automatic discrimination section 13 is described, the image process being for detecting the halftone region which is to be subjected to the halftone frequency determination process.

Figure 3:
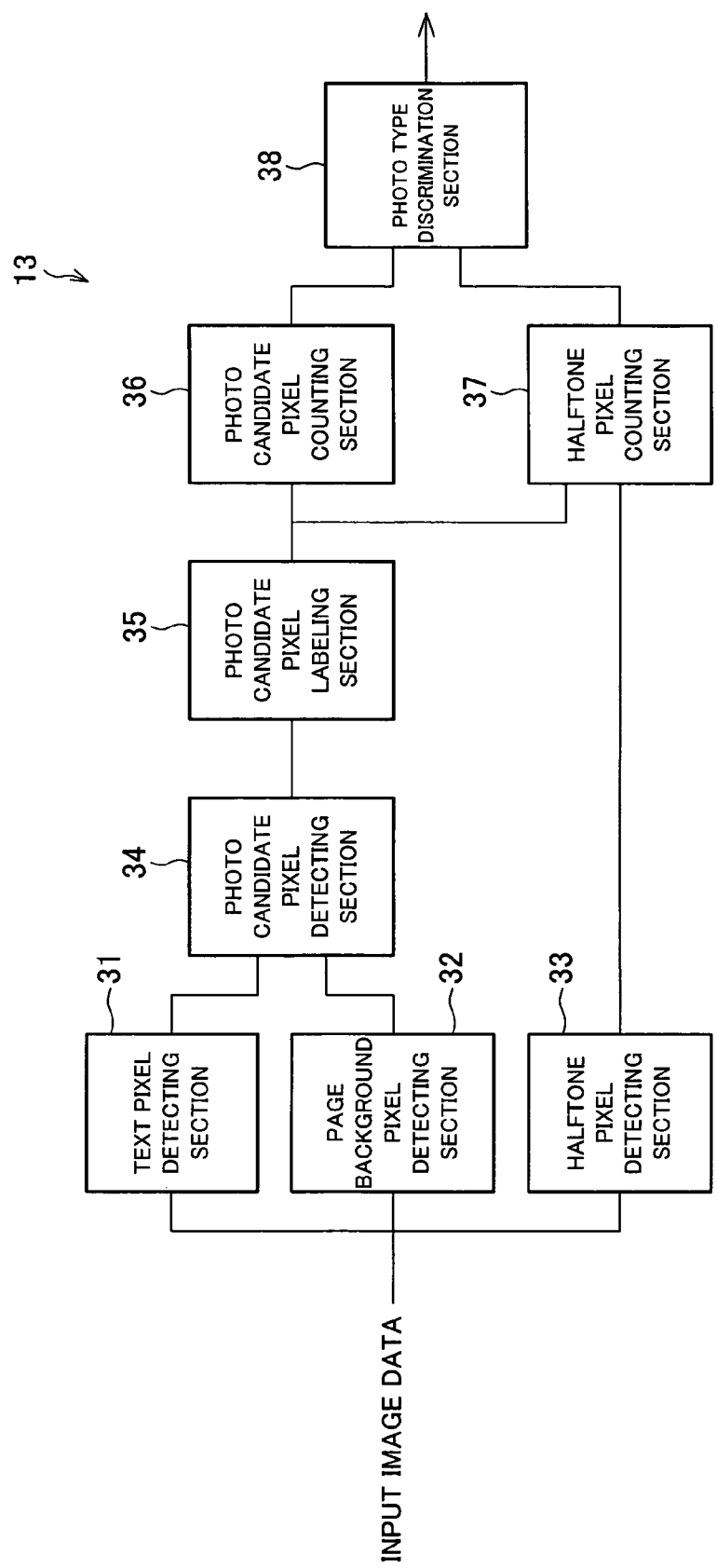
FIG. 3 is a block diagram illustrating an arrangement of an automatic document type estimating section provided to the image processing apparatus according to the present invention.

As illustrated in FIG. 3, the document type automatic discrimination section 13 is provided with a text pixel detecting section 31, a page background pixel detecting section 32, a halftone pixel detecting section 33, a photo candidate pixel detecting section 34, a photo candidate pixel labeling section 35, a photo candidate pixel counting section 36, a halftone pixel counting section 37, and a photo type discrimination section 38. Even though the following explains the image process referring to a case where CMY signals obtained by complementary color transformation of RGB signals are used, the image process may be arranged such that the RGB signals are used.

The text pixel detecting section 31 outputs a discriminating signal that indicates whether or not a given pixel in the input image data is in a character edge region. An example of the process of the text pixel detecting section is process using the following convolution operation results S1 and S2. The convolution operation results S1 and S2 is obtained by convolution operation of input image data (f(0,0) to f(2,2), which are respectively pixel densities of input image data) by using filter coefficients as illustrated in FIGS. 4(b) and 4(c), the input image data being stored in a block memory as illustrated in FIG. 4(a).

$$S1=1\times f(0,0)+2\times f(0,1)+1\times f(0,2)-1\times f(2,0)-2\times f(2,1)-1\times f(2,2)$$

$$S2=1\times f(1,0)+2\times f(1,1)+1\times f(2,0)-1\times f(0,2)-2\times f(1,2)-1\times f(2,2)$$

$$S=\sqrt{S1+S2}$$

If S was greater than a predetermined threshold value, a processing pixel (coordinates (1,1)) in the input image data stored in the block memory would be recognized as a text pixel present in the character edge region. All the pixels in the input image data is subjected to this process, thereby discriminating the text pixels in the input image data.

Figure 5:
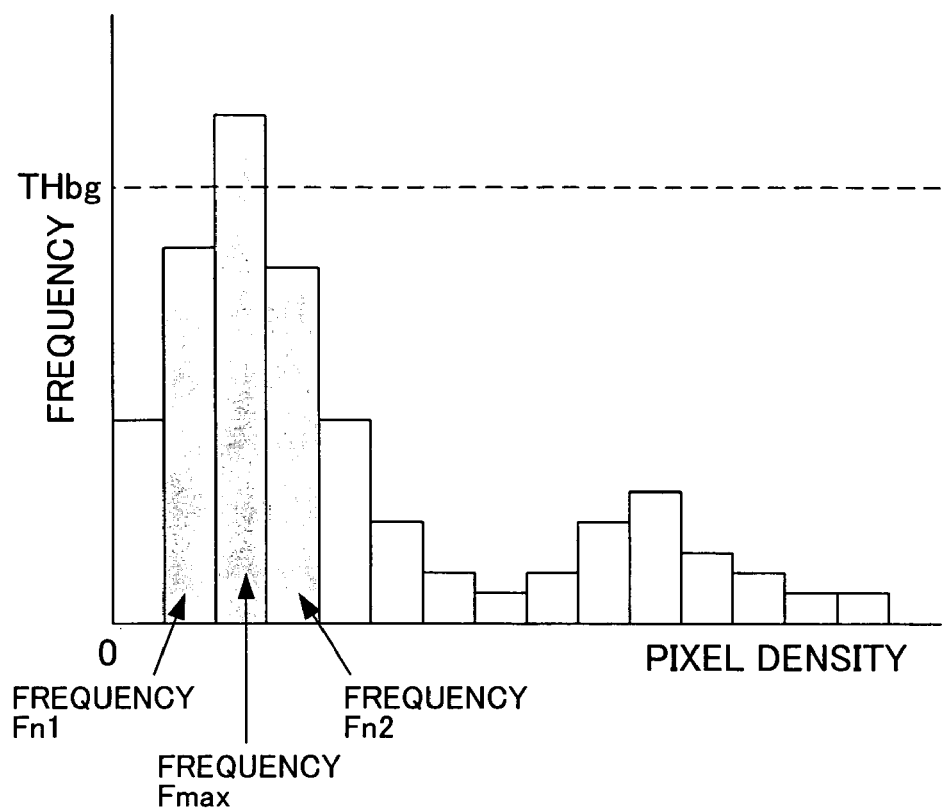
FIG. 5(a) is an explanatory view illustrating an example of a density histogram as a result of detection of a page background pixel detecting section provided to the document type automatic discrimination section, where the detection detects page background pixels.
FIG. 5(b) is an explanatory view illustrating an example of a density histogram as a result of detection of a page background pixel detecting section provided to the document type automatic discrimination section, where the detection does not detect page background pixels.
Figure 5:
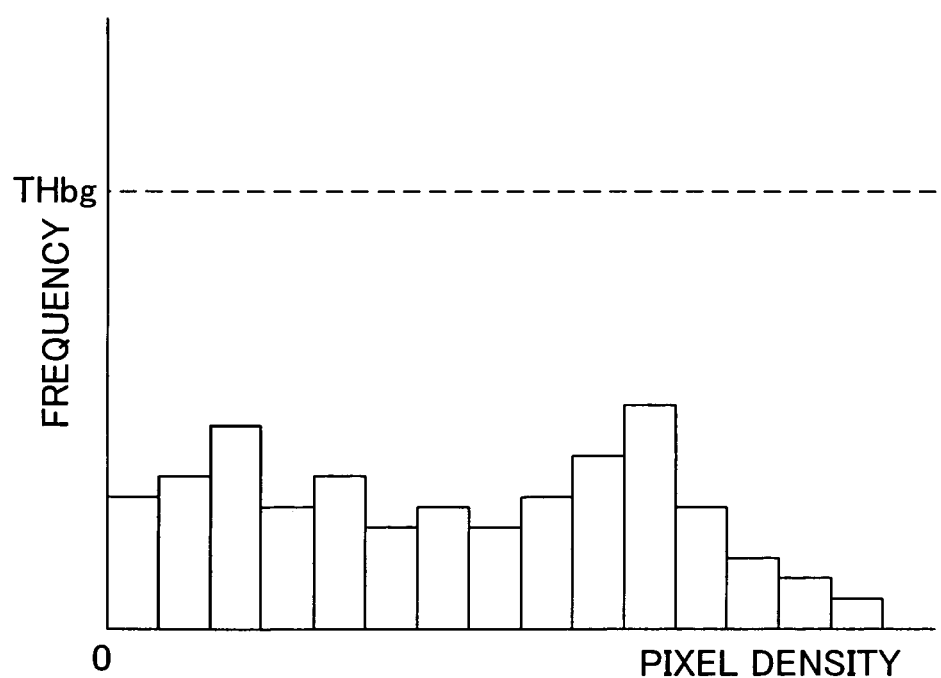
Figure 6:
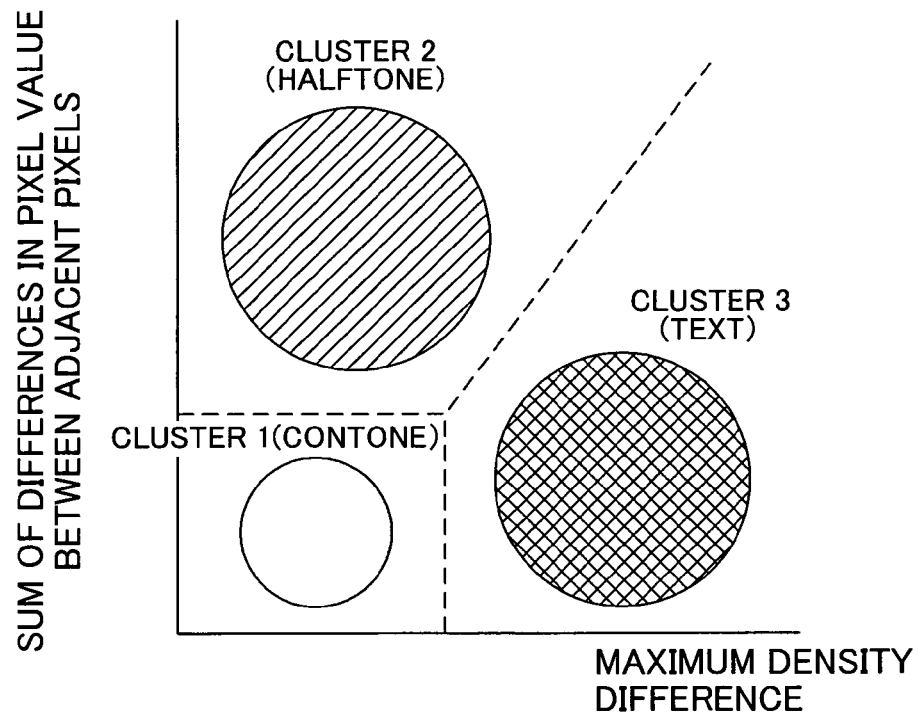
FIG. 6(a) is an explanatory view illustrating an example of a block memory for use in calculation of a feature (sum of differences between adjacent pixels, maximum density difference) for detecting the halftone pixel by a halftone pixel detecting section provided to the document type automatic discrimination section.
FIG. 6(b) is an explanatory view illustrating an example of distribution of a text region, halftone region, and photo region on a two dimensional plane whose axes are a sum of differences between adjacent pixels and maximum density difference, which are features for detecting the halftone pixel.
Figure 7:
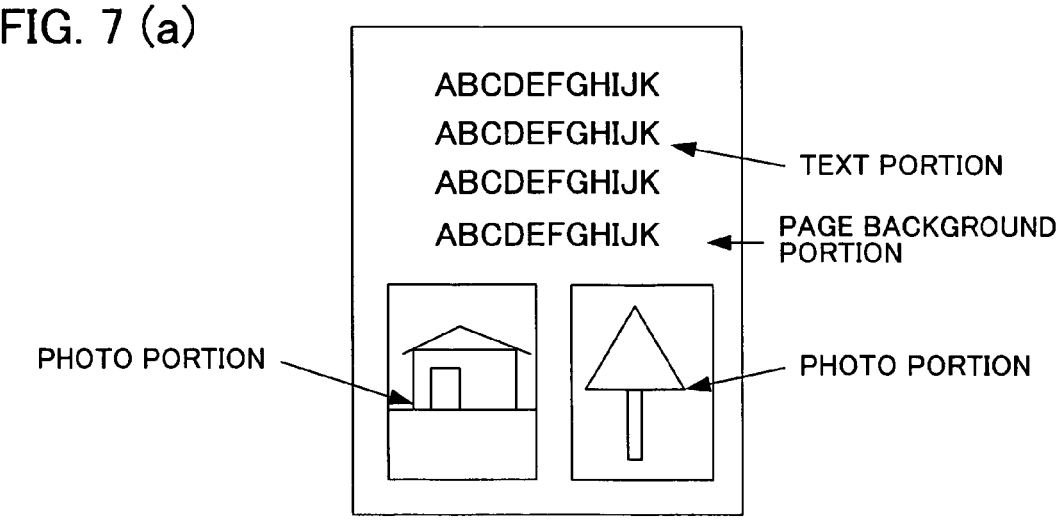
FIG. 7(a) is an explanatory view illustrating an example of the input image data in which a plurality of photo regions coexist.
FIG. 7(b) is an explanatory view illustrating an example of a result of process performed on the example of FIG. 7(a) by a photo candidate pixel labeling section provided to the document type automatic discrimination section.
FIG. 7(c) is an explanatory view illustrating an example of a result of discrimination performed on the example FIG. 7(b) by a photo type discrimination section provided to the document type automatic discrimination section.
FIG. 7(d) is an explanatory view illustrating an example of a result of discrimination performed on the example of FIG. 7(b) by a photo type discrimination section provided to the document type automatic discrimination section.
Figure 7:
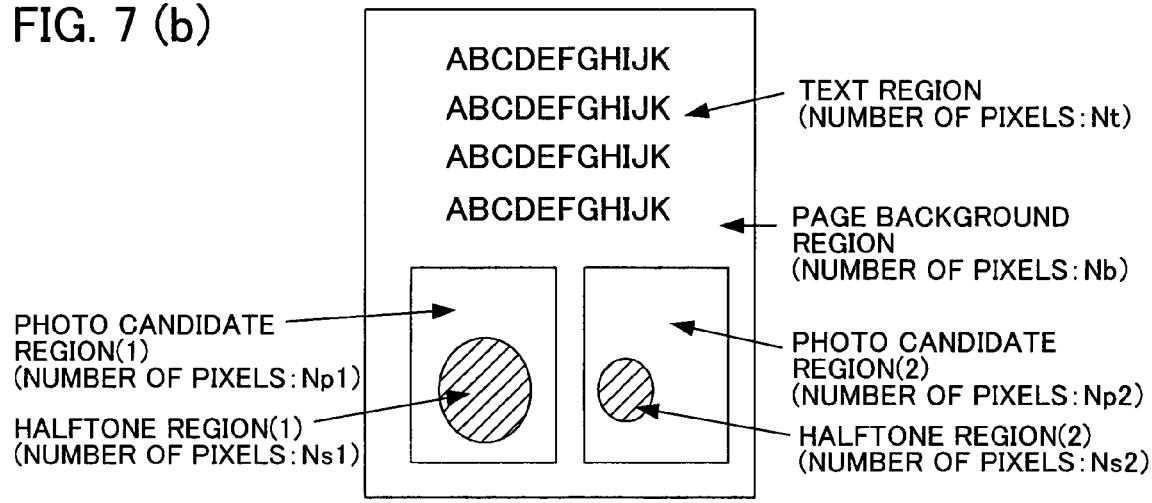
Figure 7:
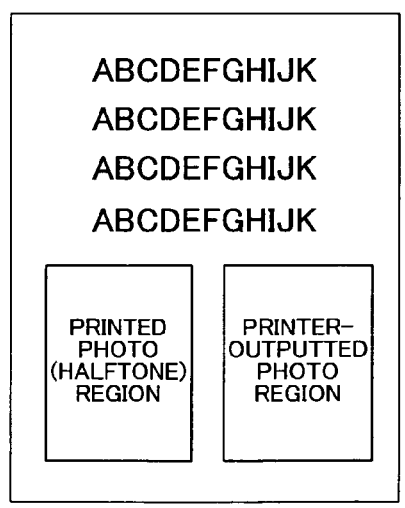
Figure 7:
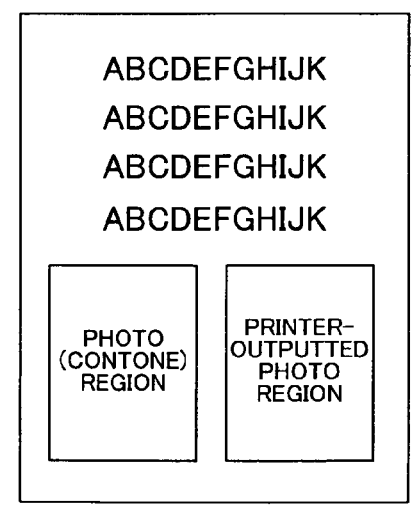

The page background pixel detecting section 32 outputs a discriminating signal that indicates whether or not a given pixel in the input image data is in the page background region. An example of the process of the page background pixel detecting section 32 is process using a density histogram as illustrated in FIG. 5. The density histogram indicates a pixel density (e.g. of the M signal of the CMY signals obtained by complementary color reversion) in the input image data.

In the following, the process steps are explained specifically referring to FIGS. 5(a) and 5(b).

Step 1: Find a maximum frequency (Fmax).

Step 2: If the Fmax is smaller than the predetermined threshold value (THbg), it is judged that the input image data includes no page background region.

Step 3: If the Fmax is equal to or greater than the predetermined threshold value (THbg), and if a sum of the Fmax and a frequency of a pixel density close to a pixel density (Dmax) which gives the Fmax is greater than the predetermined threshold value, it is judged that the input image data includes a page background region. (For example, the frequency of the pixel density close to the pixel density (Dmax) may be, e.g., Fn1 and Fn2 (meshing portions in FIG. 5(a)) where Fn1 and Fn2 are frequencies of pixel densities Dmax−1 and Dmax+1).

Step 4: If it is judged in Step 3 that the input image data includes the page background region, pixels having pixel densities in a vicinity of the Dmax, e.g., Dmax−5 to Dmax+5 are recognized as page background pixels.

The density histogram may be a simple density histogram in which density classes (e.g., 16 classes in which the 256 levels of pixel densities are divided) are used instead of individual pixel densities. Alternatively, a luminance histogram of luminance Y obtained by the following equation may be used.

$$Y_j = 0.30 R_j + 0.59 G_j + 0.11 B_j$$

$Y_j$: luminance of processing pixel, $R_j$, $G_j$, $B_j$: color components of processing pixel The halftone pixel detecting section 33 outputs a discriminating signal that indicates whether or not a given pixel in the input image data is in the halftone region. An example of the process of the halftone pixel detecting section 33 is process using adjacent pixel difference sum Busy (which is a sum of differences of adjacent pixels) and a maximum density difference MD with respect to the input image data stored in the a block memory as illustrated in FIG. 6(a). In FIG. 6(a), (f(0,0) to f(4,4)) represent pixel densities of the input image data. The adjacent pixel difference sum Busy and a maximum density difference MD are described as follows:

$$Busy1 = \sum_{i,j} |f(i, j) - f(i, j+1)| \quad (0 \le i \le 5, 0 \le j \le 4)$$

$$Busy2 = \sum_{i,j} |f(i, j) - f(i+1, j)| \quad (0 \le i \le 4, 0 \le j \le 5)$$

Busy=max(busy1,busy2)
MaxD: Maximum of f(0,0) to f(4,4)
MinD: Minimum of f(0,0) to f(4,4)
MD=MaxD−MinD Here, the Busy and MD are used to judge whether or not a processing pixel (coordinates (2,2)) is a halftone pixel present in the halftone region.

On a two dimensional plane in which the Busy and MD are the axes, the halftone pixels are distributed differently from pixels located in the other regions (such as text and photo), as illustrated in FIG. 6(b). Therefore, the judgment whether or not the processing pixel in the input image data is present in the halftone region is carried out by threshold value process regarding the Busy and MD calculated respectively for the individual processing pixels, using border lines (broken lines) indicated in FIG. 6(b) as threshold values.

An example of the threshold value process is given below.

Judge as halftone region if MD≦70 and Busy>2000
Judge as halftone region if MD>70 and MD≦Busy By performing the above process for all the pixels in the input image data, it is possible to discriminate the halftone pixels in the input image data.

The photo candidate pixel detecting section 34 outputs a discrimination signal that indicates whether a given pixel is present in the photo candidate pixel region. For example, recognized as a photo candidate pixel is a pixel other than the text pixel recognized by the text pixel detecting section 31 and the page background pixel recognized by the page background pixel detecting section 32.

For input image data including a plurality of photo portions as illustrated in FIG. 7(a), the photo candidate pixel labeling section 35 performs labeling process with respect to a plurality of photo candidate regions that consist of photo candidate pixels discriminated by the photo candidate pixel detecting section 34. For instance, the plurality of photo candidate regions are labeled as a photo candidate region (1) and a photo candidate region (2) as illustrated in FIG. 7(b). This allows recognizing each photo candidate region individually. Here, for example, the photo candidate region is recognized as "1", while other regions are recognized as "0", and the labeling process is carried out per pixel. The labeling process will be described later.

The photo candidate pixel counting section 36 counts up pixels included in the respective photo candidate regions labeled by the photo candidate pixel labeling section 35.

The halftone pixel counting section 37 counts up pixels in the halftone regions (recognized by the halftone pixel detecting section 33) in the respective photo candidate regions labeled by the photo candidate pixel labeling section 35. For example, the halftone pixel counting section 37 gives a pixel number Ns1 by counting pixels consisting the halftone region (halftone region (1)) located in the photo candidate region (1) and a pixel number Ns2 by counting pixels consisting the halftone region (halftone region (2)) located in the photo candidate region (2).

The photo type discrimination section 38 judges whether the respective photo candidate regions are a printed photo (halftone region), photo (contone region) or printer-outputted photo (which is outputted (formed) by using a laser beam printer, ink-jet printer, thermal transfer printer or the like). For example, as illustrated in FIGS. 7(c) and 7(d), this discrimination is made by the following conditional equation using the photo candidate pixel number Np, the halftone pixel number Ns, and predetermined threshold values THr1 and THr2:

If Ns/Np>THr1, judge as printed photo (halftone)    Condition 1:

If Thr1≦Ns/Np≦THr2, Judge as printer-output photo    Condition 2:

If Ns/Np<Thr2, judge as photo (contone)    Condition 3:

The threshold values may be THr1=0.7 and THr2=0.3, for example.

Moreover, the discrimination result may be outputted per pixel, per region, or per document. Moreover, even though in the exemplary process the discrimination as to types regards photos, the discrimination may regards any type of document components such as graphic images, graphs, etc., except the characters and page background. Moreover, the photo type discrimination section 38 may be arranged to control switching-over of contents of the processes of the color correction section 16, the spatial filter process section 18, and the like based on a comparison between (a) a ratio of the halftone pixel number Ns to the photo candidate pixel number Np and (b) a predetermined threshold value, instead of judging whether the photo candidate region is a printed photo, a printer-outputted photo, or a photo.

In FIG. 7(c), the photo candidate region (1) is judged as a printed photo because the photo candidate region (1) satisfies the condition 1, whereas the photo candidate region (2) is judged as a printer-output photo region because the photo candidate region (2) satisfies the condition 2. In FIG. 7(d), the photo candidate region (1) is judged as a photo because the photo candidate region (1) satisfies the condition 3, whereas the photo candidate region (2) is judged as a printer-output photo region because the photo candidate region (2) satisfies the condition 2.

Figure 8:
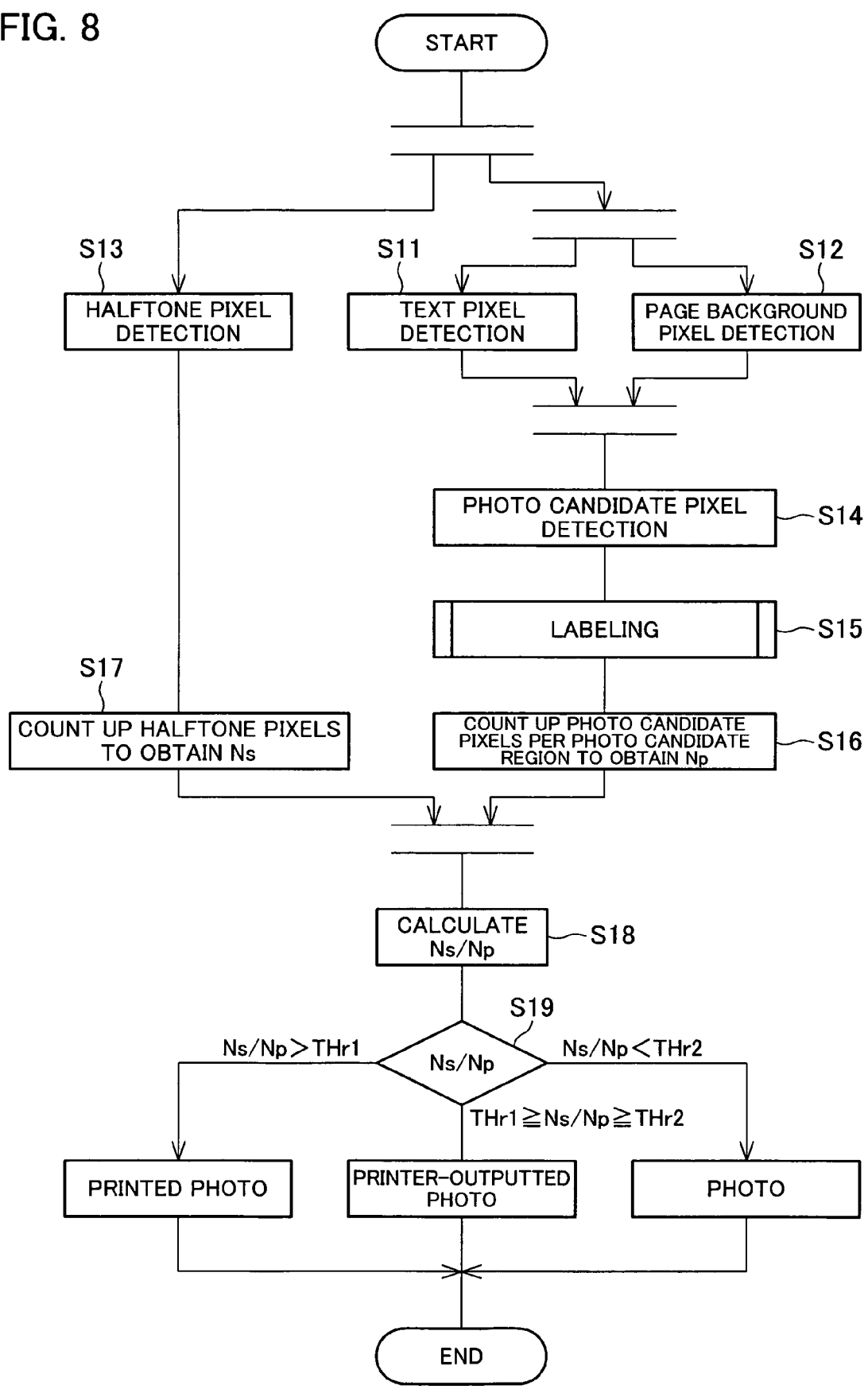
FIG. 8 is a flowchart illustrating a method of process of the document type automatic discrimination section (photo type discriminating section) illustrated in FIG. 3.
Figure 9:
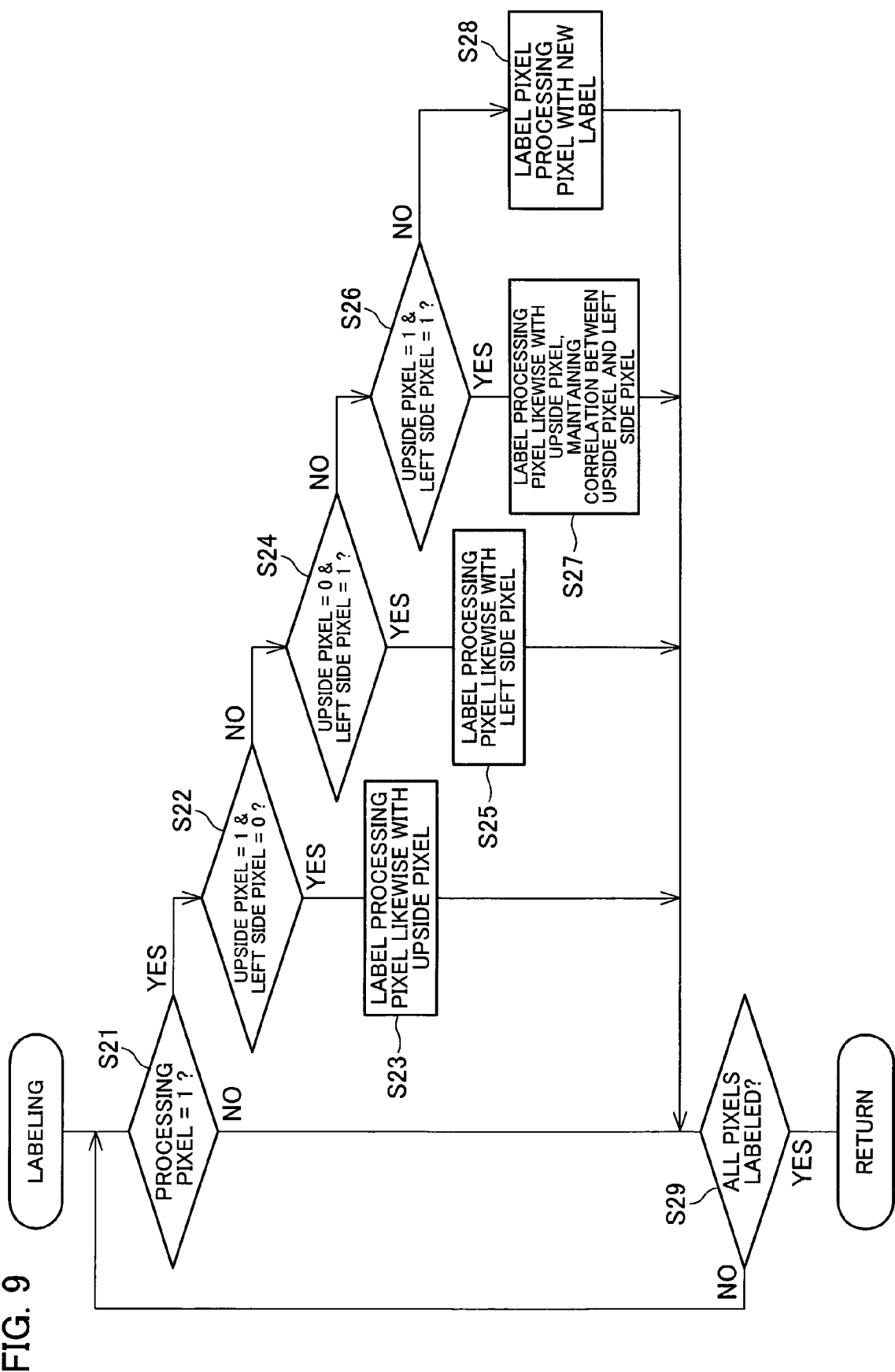
FIG. 9 is a flowchart illustrating a method of process of a labeling section provided to the document type automatic discrimination section illustrated in FIG. 3.
Figure 10:
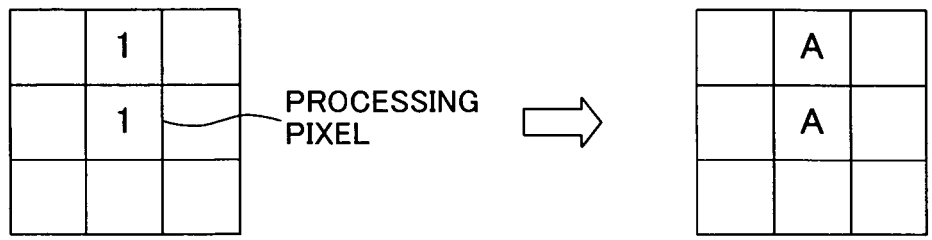
FIG. 10(a) is an explanatory view illustrating an example of a processing method of the labeling section in case where a pixel (upside pixel) adjacently on an upper side of a processing pixel is 1.
FIG. 10(b) is an explanatory view illustrating an example of a processing method of the labeling section in case where a pixel adjacently on the upper side of a processing pixel and a pixel (left side pixel) adjacently on a left side of a processing pixel are 1 but are labeled with different labels.
FIG. 10(c) is an explanatory view illustrating an example of a processing method of the labeling section in case where a pixel adjacently on the upper side of a processing pixel is 0 and a pixel adjacently on a left side of a processing pixel is 1.
FIG. 10(d) is an explanatory view illustrating an example of a processing method of the labeling section in case where a pixel adjacently on the upper side of a processing pixel and a pixel adjacently on a left side of a processing pixel are 0.
Figure 10:
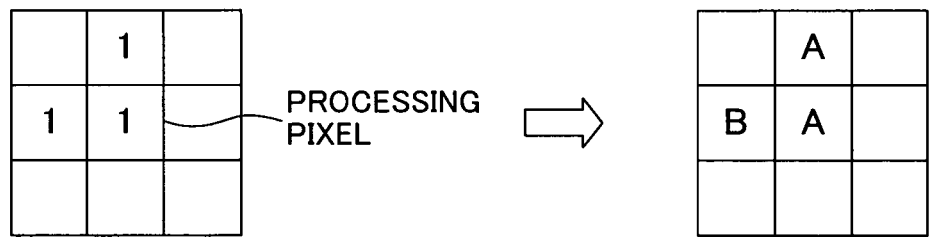
Figure 10:
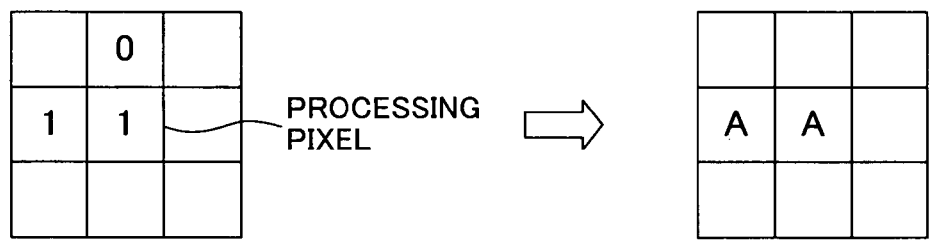
Figure 10:
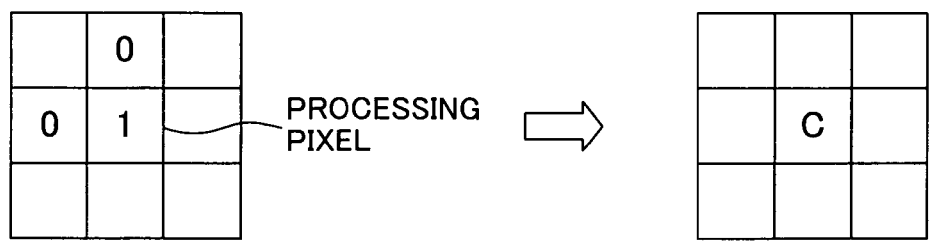
Figure 11:
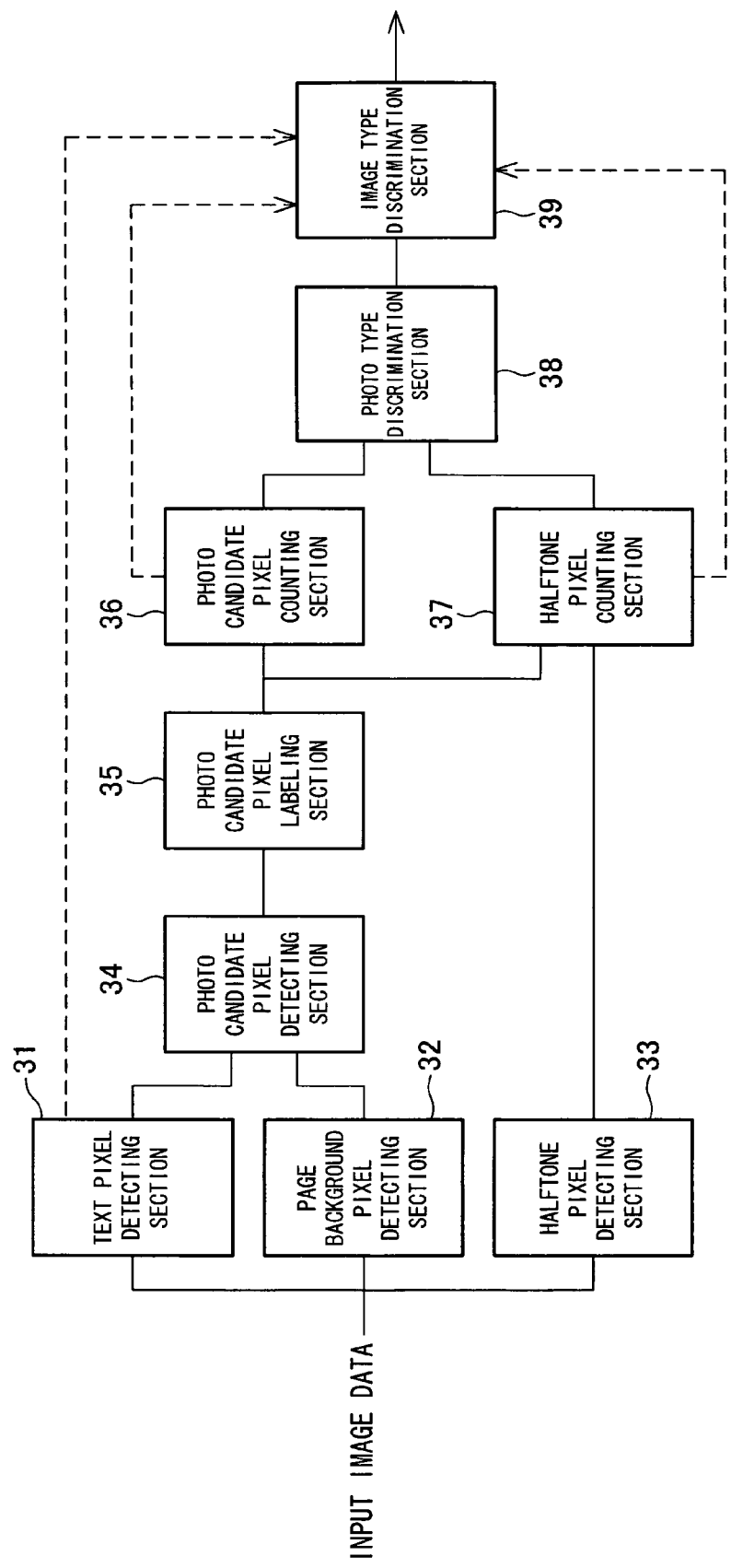
FIG. 11 is a block diagram illustrating another arrangement of the document type automatic discrimination section.
Figure 12:
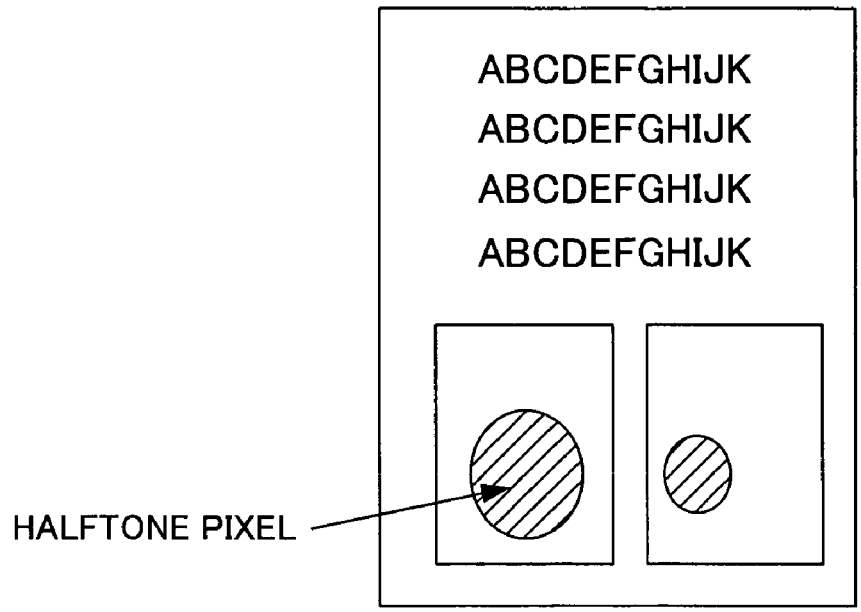
FIG. 12(a) is an explanatory view illustrating halftone pixels for which the halftone frequency determining section performs its process.
FIG. 12(b) is an explanatory view illustrating a halftone region for which the halftone frequency determining section performs its process.
Figure 12:
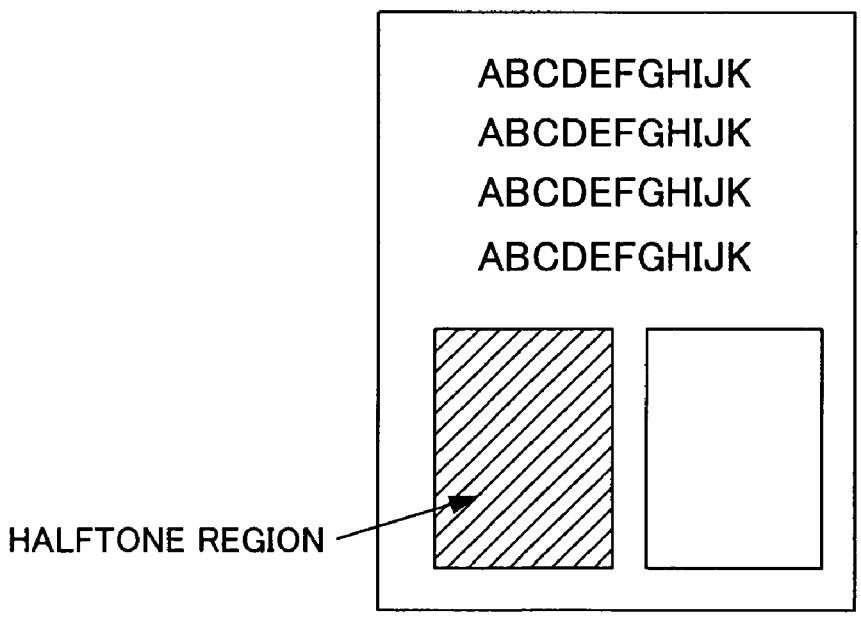

In the following, a method of an image type determining process performed by the document type automatic discrimination section 13 having the above arrangement is described referring to a flowchart illustrated in FIG. 8.

Firstly, based on the RGB density signals obtained by conversion of RGB signals (RGB reflectance signals) from which various distortions have been removed by the shading correction section 12 (see FIG. 2), the text pixel detecting process (S11), the page background pixel detecting process (S12), and the halftone pixel detecting process (S13) are performed in parallel. Here, the text pixel detecting process is carried out by the text pixel detecting section 31, the page background pixel detecting process is carried out by the page background pixel detecting section 32, and the halftone pixel detecting process is carried out by the halftone pixel detecting section 33. Therefore, detailed explanation of these processes is omitted here.

Next, based on results of the text pixel detecting process and the page background pixel detecting process, a photo candidate pixel detecting process is carried out (S14). The photo candidate pixel detecting process is carried out by the photo candidate pixel detecting section 34. Therefore, detailed explanation of this process is omitted here.

Next, the labeling process is carried out with respect to the detected photo candidate pixel (S15). The labeling process will be described later.

Then, based on a result of the labeling process, the photo candidate pixels are counted to obtain the photo candidate pixel number Np (S16). This counting is carried out by the photo candidate pixel counting section 36. Therefore, detailed explanation is omitted here.

In parallel with the processes S11 to S16, the halftone pixels are counted to obtain the halftone pixel number Ns based on a result of the halftone pixel detecting process at S13 (S17). This counting is carried out by the halftone pixel counting section 37. Therefore, detailed explanation of this process is omitted here.

Next, based on the photo candidate pixel number Np obtained at S16 and the halftone pixel number Ns obtained at S17, a ratio of the halftone pixel number Ns to the photo candidate pixel number Np (i.e. Ns/Np) is calculated out (S18).

Then, from Ns/Np obtained at S18, the photo candidate region is judged whether it is a printed photo, a printer-outputted photo, or a photo (S19).

The processes at S18 and S19 are carried out by the photo type discrimination section 38. Therefore, detailed explanation on these processes is omitted here.

In the following, the labeling process is described.

In general, the labeling process is a process to label a cluster of equivalent and continuous foreground pixels (=1) with a label likewise, and label a cluster of other equivalent and continuous foreground pixels with a different label likewise. (see Image process standard text book of CG-APTS, p. 262 to 268). Various kinds of labeling process have been proposed. In the present embodiment, a labeling system in which scanning is carried out twice is employed. A method of the labeling process is described below referring to a flowchart illustrated in FIG. 9.

To begin with, values of pixels are measured from an uppermost and leftmost pixel in a raster scanning order (S21). If the value of a processing pixel=1, it is judged that whether or not a pixel (upside pixel) adjacently on an upper side of the processing pixel is 1 and whether or not a pixel (left side pixel) adjacently on a left side of the processing pixel is 0 (S22).

Here, if the pixel adjacently on the upper side of the processing pixel=1 and the pixel adjacently on the left side of the processing pixel=0 at S22, procedure 1 is carried out. The procedure 1 is as follows.

Procedure 1: As illustrated in FIG. 10(a), if the processing pixel=1, and if the pixel adjacently on the upper side thereof is labeled with a label (A), the processing pixel is labeled with the label (A) likewise (S23). Then, the process goes to S29, at which it is judged whether all the pixels are labeled or not. If all the pixels are labeled at S29, the process goes to S16 (illustrated in FIG. 8) at which the counting to obtain the photo candidate pixel number Np is carried out for every photo candidate region.

Moreover, if the pixel adjacently on the upper side of the processing pixel=1 and the pixel adjacently on the left side of the processing pixel≠#0 at S22, it is judged whether the pixel adjacently on the left side of the processing pixel is 1 or not (S24).

Here, if the pixel adjacently on the upper side of the processing pixel=0 and the pixel adjacently on the left side of the processing pixel=1 at S24, procedure 2 is carried out. The procedure 2 is as follows.

Procedure 2: as illustrated in FIG. 10(c), if the pixel adjacently on the upper side thereof=0 and the pixel adjacently on the left side thereof=1, the processing pixel is labeled with the label (A) likewise with the pixel adjacently on the left side thereof (S25). Then, the process moves to S29, at which it is judged whether all the pixels are labeled or not. If all the pixels are labeled at S29, the processes goes to S16 (illustrated in FIG. 8) at which the counting to obtain the photo candidate pixel number Np is carried out for every photo candidate region.

Moreover, if the pixel adjacently on the upper side of the processing pixel≠0 and the pixel adjacently on the left side of the processing pixel≠1 at S24, it is judged whether or not the pixel adjacently on the upper side of the processing pixel=1 and whether or not the pixel adjacently on the left side of the processing pixel=1 (S26).

If the pixel adjacently on the upper side of the processing pixel=1 and the pixel adjacently on the left side of the processing pixel=1 at S26, procedure 3 is carried out. The procedure 3 is as follows.

Procedure 3: As illustrated in FIG. 10(b), if the pixel adjacently on the left side thereof is also "1" and is labeled with a label (B) unlikewise with the pixel adjacently on the upper side of the processing pixel, the processing pixel is labeled with the label (A) likewise with the pixel adjacently on the upper side thereof, while keeping correlation between the label (B) of the pixel adjacently on the left side thereof and the label (A) of the pixel adjacently on the upper side thereof (S27). Then, the process moves to S29, at which it is judged whether all the pixels are labeled or not. If all the pixels are labeled at S29, the process goes to S16 (illustrated in FIG. 8) at which the counting to obtain the photo candidate pixel number Np is carried out for every photo candidate region.

Further, if the pixel adjacently on the upper side of the processing pixel≠1 and the pixel adjacently on the left side of the processing pixel≠1 at S26, procedure 4 is carried out. The procedure 4 is as follows:

Procedure 4: As illustrated in FIG. 10(d), if both the pixels adjacently on the upper side and on the left side thereof=0, the processing pixel is labeled with a new label (C) (S28). Then, the process moves to S29, at which it is judged whether all the pixels are labeled or not. If all the pixels are labeled at S29, the process goes to S16 (illustrated in FIG. 8) at which the counting to obtain the photo candidate pixel number Np is carried out for every photo candidate region.

In the case where plural kinds of labels are used to label the pixels, the above-mentioned rule is applied so that like pixels are labeled with a label likewise.

Moreover, the arrangement illustrated in FIG. 3 may be arranged not only to discriminate the photo regions, but also to discriminate the type of the whole image. In this case, the arrangement illustrated in FIG. 3 is provided with an image type discrimination section 39 in the downstream of the photo type discrimination section 38 (see FIG. 11). The image type discrimination section 39 finds a ratio Nt/Na (which is a ratio of the text pixel number to total number of the pixels), a ratio (Np−Ns)/Na (which is a ratio of a difference between the photo candidate pixel number and halftone pixel number to the total number of the pixels), and a ratio Ns/Na (which is a ratio of the halftone pixel number to the total number of the pixels), and compares these ratios respectively with predetermined threshold values THt, THp, and THs. Based on the comparisons and the result of the process of the photo type discrimination section 38, the image type discrimination section 39 performs the discrimination with respect to the whole image to find the type of the image overall. For example, if the ratio Nt/Na is equal to or more than the threshold value, and if the photo type discrimination section 38 judges that the document is a printer-output photo, the image type discrimination section 39 judges that the document is a document on which text and printer-outputted photo coexist.

<Halftone Frequency Determining Section>

The following describes the image process (halftone frequency determining process) performed by the halftone frequency determining section (halftone frequency determining means) 14. The halftone frequency determining process is a characteristic feature of the present embodiment.

The process performed by the halftone frequency determining section 14 is carried out only with respect to the halftone pixels (see FIG. 12(a)) detected during the process of the document type automatic discrimination section 13 or the halftone region (see FIG. 12(b)) detected by the document type automatic discrimination section 13. The halftone pixels illustrated in FIG. 12(a) corresponds to the halftone region (1) illustrated in FIG. 7(b), and the halftone region illustrated in FIG. 12(b) corresponds to the printed photo (halftone) region illustrated in FIG. 7(c).

Figure 1:
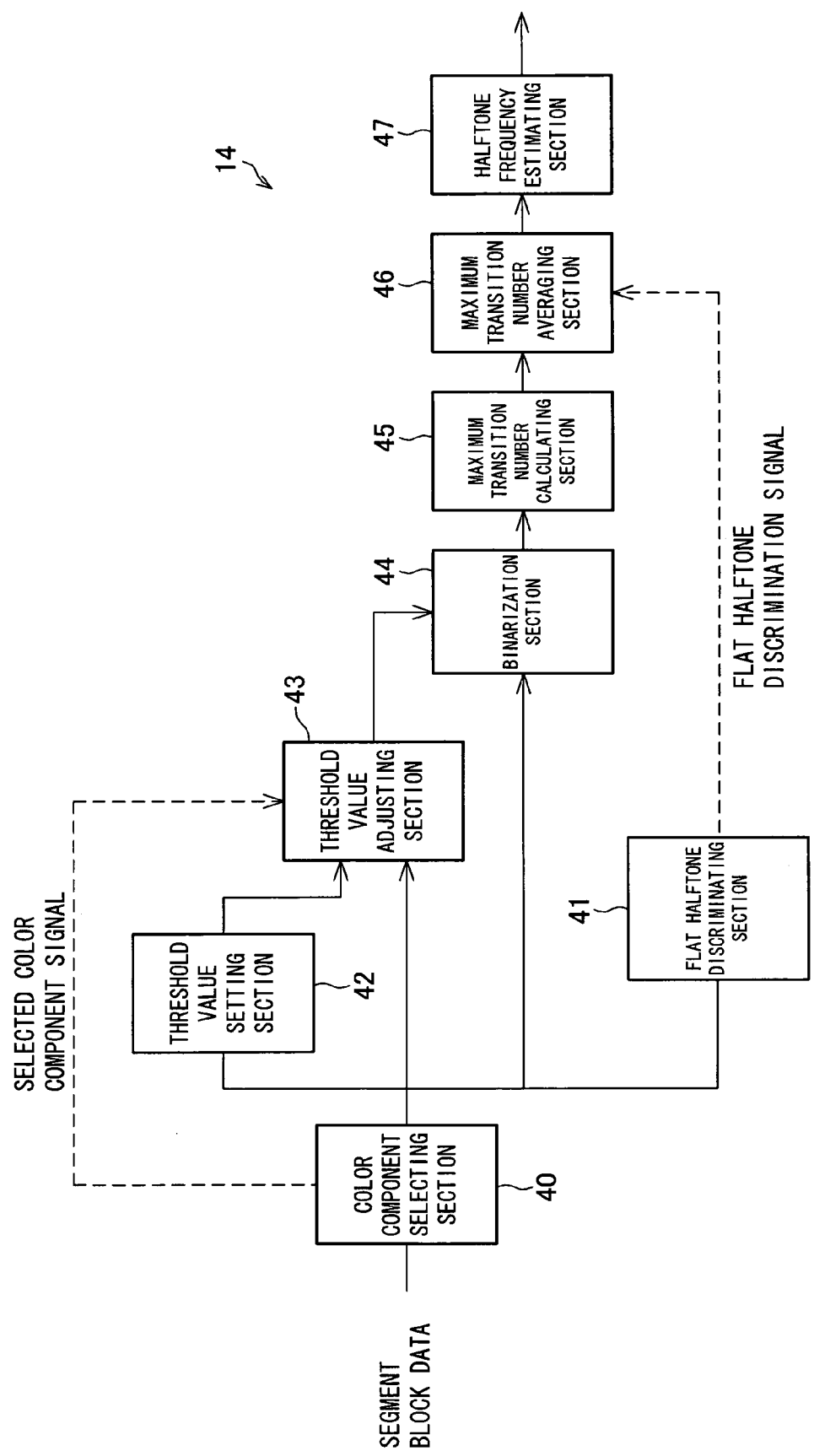
FIG. 1, which illustrates a first embodiment of the present invention, is a block diagram illustrating a halftone frequency determining section provided to an image processing apparatus.

The halftone frequency determining section 14 is, as illustrated in FIG. 1, provided with a color component selecting section 40, flat halftone discriminating section (flat halftone discriminating means) 41, a threshold value setting section (threshold value determining means) 42, a threshold value adjusting section (threshold value determining means) 43, a binarization section (extracting means, binarization means) 44, a maximum transition number calculating section (extracting means, transition number calculating means) 45, a maximum transition number averaging section (extracting means, transition number extracting means) 46, and a halftone frequency estimating section (halftone frequency operating means) 47.

These sections perform their processes per segment block which is constituted of the processing pixel and pixels nearby the processing pixel and which has a size of M pixel×N pixel where M and N are integers predetermined experimentally. These sections output their results per pixel or per segment block.

The color component selecting section 40 finds respective sums of density differences for the respective RGB components (Hereinafter, the sums of the density differences are referred to as "busyness"). By the color component selecting section 40, image data having a color component having a largest busyness among them is selected as image data to be outputted to the flat halftone discriminating 41, the threshold value setting section 42, the threshold value adjusting section 43, and the binarization section 44. Moreover, the color component selecting section 40 outputs, to the threshold value adjusting section 43, a selected color component signal which indicates which color component is selected.

The flat halftone discriminating section 41 performs discrimination of the segment blocks as to whether the respective segment blocks are in flat halftone or in non-flat halftone. The flat halftone is a halftone in which density transition is low. The non-flat halftone is a halftone in which density transition is high. The flat halftone discriminating section 41 calculates out a absolute difference sum subm1, a absolute difference sum subm2, a absolute difference sum subs1, and an absolute difference sum subs2 in a given segment block. The absolute difference sum subm1 is a sum of absolutes of differences between adjacent pairs of pixels the right one of which is greater in density than the left one. The absolute difference sum subm2 is a sum of absolutes of differences between adjacent pairs of pixels the right one of which is less in density than the left one. The absolute difference sum subs1 is a sum of absolutes of differences between adjacent pairs of pixels the upper one of which is greater in density than the lower one. The absolute difference sum subs2 is a sum of absolutes of differences between adjacent pairs of pixels the upper one of which is less in density than the lower one. Moreover, the flat halftone discriminating section 41 finds busy and busy_sub from Equation (1), and judges that the segment block is a flat halftone portion, if the obtained busy and busy_sub satisfy Equation (2). TH pair in Equation (2) is a value predetermined via experiment. Further, the flat halftone discriminating section 41 outputs a flat halftone discrimination signal flat (a flat halftone discrimination signal flat of 1 indicates flat halftone, whereas a flat halftone discrimination signal flat of 0 indicates non-flat halftone).

$$\left.\begin{array}{l} \text{If } |subm1 - subm2| > |subs1 - subs2| \\ \quad busy = subm1 + subm2 \\ \quad busy\_sub = |subm1 - subm2| \\ \text{If } |subm1 - subm2| \leq |subs1 - subs2| \\ \quad busy = subs1 + subs2 \\ \quad busy\_sub = |subs1 - subs2| \end{array}\right\} \qquad \text{Equation 1}$$

$$busy\_sub / busy < THpair \qquad \text{Equation 2}$$

From the image data of the color component selected by the color component selecting section 40, the threshold value setting section 42 calculates out an average density ave of pixels in a segment block. Then, the threshold value setting section 42 sets the average density ave as a threshold value th1. The threshold value th1 is used to obtain a final threshold value th2 to be used in the binarization of the segment block.

The threshold value adjusting section 43 calculates out a maximum density difference msub as density information of the segment block. Then, the threshold value adjusting section 43 adjusts the threshold value th1, using the following equations (3), based on the threshold value th1 set by the threshold value setting section 42, the average density ave, and the maximum density difference msub, thereby to obtain the final threshold value th2. The threshold value adjustment performed by the threshold value adjusting section 43 is to prevent the binarization section 44 from extracting an unnecessary color except the color component selected by the color component selecting section 40.

if ave>thave, $th2=th1-msub \times c1-c2$, and if not, $th2=th1+msub \times c1+c2$     Equation (3)

In the equations, thave, c1, and c2 (where c1 and c2 are adjusting values) are optimum values that are set in consideration of reading properties of the color image input apparatus 1 for the respective color components. The optimum values thave, c1, and c2 are obtained via experiment respectively for R, G, B components. The threshold value adjusting section 43 stores therein thave, c1, and c2, which are predetermined respectively for each color component. The threshold value adjusting section 43 uses thave, c1, and c2 that correspond to the color component indicated by the selection color component signal sent thereto from the color component selecting section 40. How to obtain thave, c1, and c2 will be described later.

The binarization section 44 prepares binary data via binarization of the image data of the selected color component as to the pixels of the segment block. In the binarization performed the binarization section 44, the final threshold value th2 obtained by the threshold value adjusting section 43 is used.

The maximum transition number calculating section 45 calculates out a maximum transition number of the segment block from a transition number (m rev) of the binary data obtained from main scanning lines and sub scanning lines, i.e., how many times the binary data, obtained from main scanning lines and sub scanning lines, is switched over.

The maximum transition number averaging section 46 calculates out an average m rev_ave of the transition numbers (m rev) of all those segment blocks in the halftone region for which the flat halftone discrimination signal outputted from the flat halftone discriminating section 41 is 1, the transition numbers (m rev) having been calculated out by the maximum transition number calculating section 45. The transition number and the flat halftone discrimination signal obtained for each segment block may be stored in the maximum transition number averaging section 46 or may be stored in a memory provided in addition.

The halftone frequency estimating section 47 estimates the frequency of the input image by comparing (a) the maximum transition number average m rev_ave calculated by the maximum transition number averaging section 46 with (b) theoretical maximum transition numbers predetermined for halftone documents (printed photo document) of respective frequencies. For example, a 120 line/inch document theoretically has a maximum transition number of 6 to 8, whereas a 175 line/inch document theoretically has a maximum transition number of 10 to 12. The halftone frequency estimating section 46 outputs a halftone frequency discrimination signal, which indicates the determined (i.e., found-out) halftone frequency.

In the following, a method of the halftone frequency determining process of the halftone frequency determining section 14 having the above arrangement is described below referring to a flowchart illustrated in FIG. 13.

To begin with, as to the halftone pixel or segment block of the halftone region, which is detected by the document type automatic discrimination section 13, the color component selecting section 40 selects the color component having the largest busyness (S31). Moreover, the color component selecting section 40 outputs to the threshold value adjusting section 43 a selected color component signal, which indicates a selected color component.

Next, for the segment block, the threshold value setting section 42 calculates out the average density ave of the color component selected by the color component selecting section 40, and sets the average density ave as the threshold value th1 (S32).

Then, the threshold value adjusting section 43 calculates out a maximum density difference msub in the selected color component in the segment block (S33). After that, the threshold value adjusting section 43 calculates out the final threshold value th2 by adjusting the threshold value th1 according to Equations (3), using the thave, c1, and c2 that correspond to the selected color component signal outputted thereto from the color component selecting section 40 (S34).

Then, the binarization section 44 performs the binarization of the pixels of the segment block, referring to the final threshold value th2 obtain by using the threshold value adjusting section 43 (S35).

After that, the maximum transition number calculating section 45 calculates out (finds out) the maximum transition number in the segment block (S36).

In parallel with S32 to S35, the flat halftone discriminating section 41 performs the flat halftone discriminating process for discriminating whether the segment block is in halftone or in non-halftone, and outputs the flat halftone discrimination signal flat to the maximum transition number averaging section 46 (S37).

Then, it is judged whether or not the processes are done for all the segment blocks (S38). If not, the processes of S31 to S37 are repeated for a segment block to be processed next.

If the processes are done for all the segment blocks, the maximum transition number averaging section 46 calculates out the average of the maximum transition numbers, calculated at S37, of all those segment blocks in the halftone region for which the flat halftone discrimination signal flat is 1 (S39).

Then, based on the maximum transition number average calculated out by the maximum transition number averaging section 46, the halftone frequency estimating section 47 estimates the halftone frequency of the halftone region (S40). Then, the halftone frequency estimating section 47 outputs the halftone frequency determination signal that indicates the halftone frequency determined by its estimation. By this, the halftone frequency determining process is completed.

Next, a concrete example of the processes dealing with actual image data and its effect are explained below. Here, it is assumed that the segment block is in size of 10×10 pixels.

Figure 14:
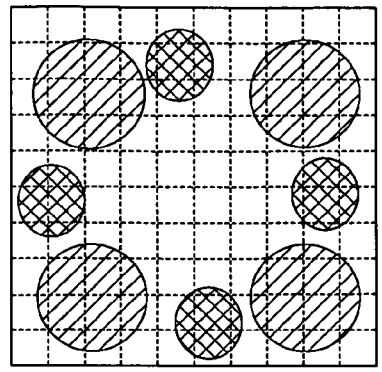
FIG. 14(a) is an explanatory view illustrating an example of a 120 line/inch composite color halftone consisting of magenta dots and cyan dots.
FIG. 14(b) is an explanatory view illustrating G (Green) image data obtained from the halftone of FIG. 14(a).
Figure 14:
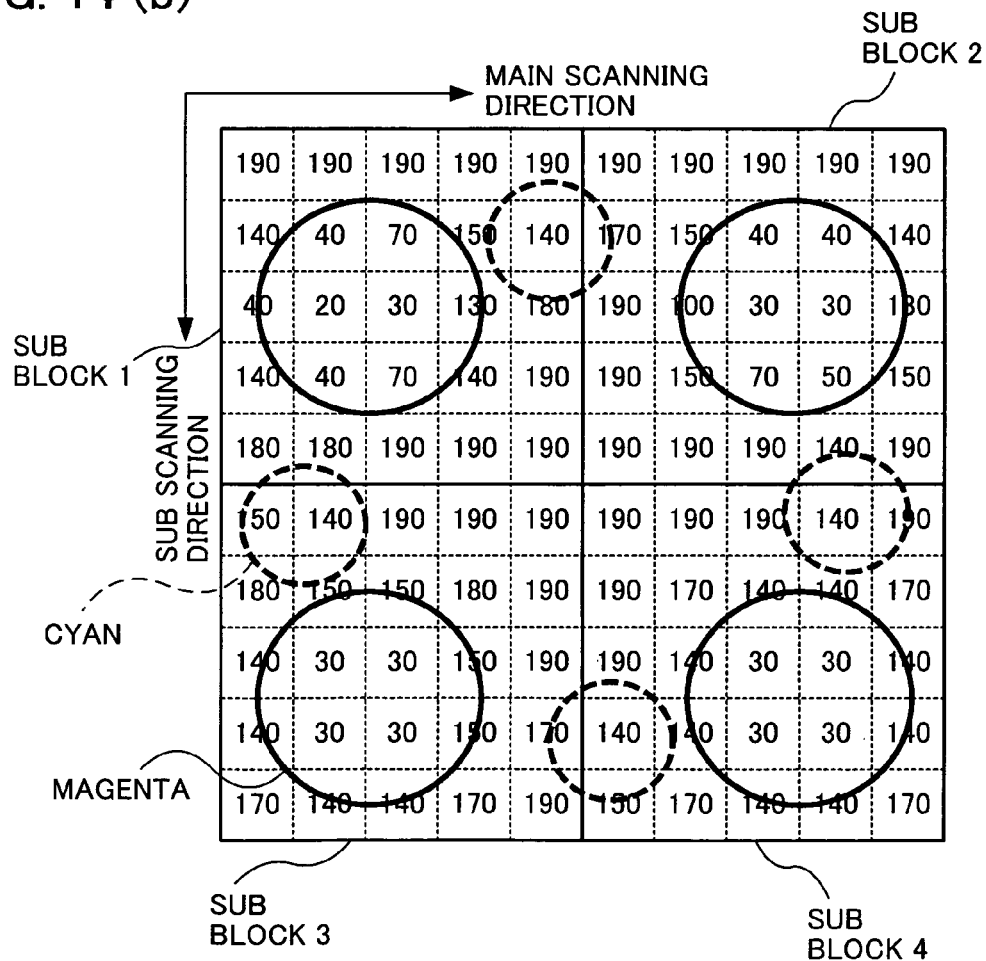

FIG. 14(*a*) illustrates an example of a halftone of 120 line/inch in composite color, consisting of magenta dots and cyan dots. If the input image is in composite color halftone, it is desirable that, among CMY in each segment block, only the color having a larger density change (busyness) than the rest be taken into consideration and the halftone frequency of the color be used for determining the halftone frequency of the document. Further, it is desirable that dots of the color having the larger density transition than the rest are processed by using a channel (signal of the input image data) most suitable for representing the density of the dots of the color. Specifically, for a composite color halftone consisted mainly of magenta dots as illustrated in FIG. 14(a), G (green) image (complementary color for magenta) is used, which is most suitable for processing magenta. This makes it possible to perform halftone frequency determining process which is based on substantially only the magenta dots. In the segment block as illustrated in FIG. 14(a), G (Green) image data is the image data having the larger busyness than the other image data. Thus, the color component selecting section 40 selects the G (Green) image data as image data to be outputted to the flat halftone discriminating section 41, the threshold value setting section 42, the threshold value adjusting section 43, and the binarization section 44.

FIG. 14(b) is a view illustrating density of G (Green) image data in each pixel in the segment block illustrated in FIG. 14(a). In FIG. 14(b), the density "0" represents black and the density "255" represents white. The flat halftone discriminating section 41 subjects the G (Green) image data as illustrated in FIG. 14(b) to the following process.

Figure 15:
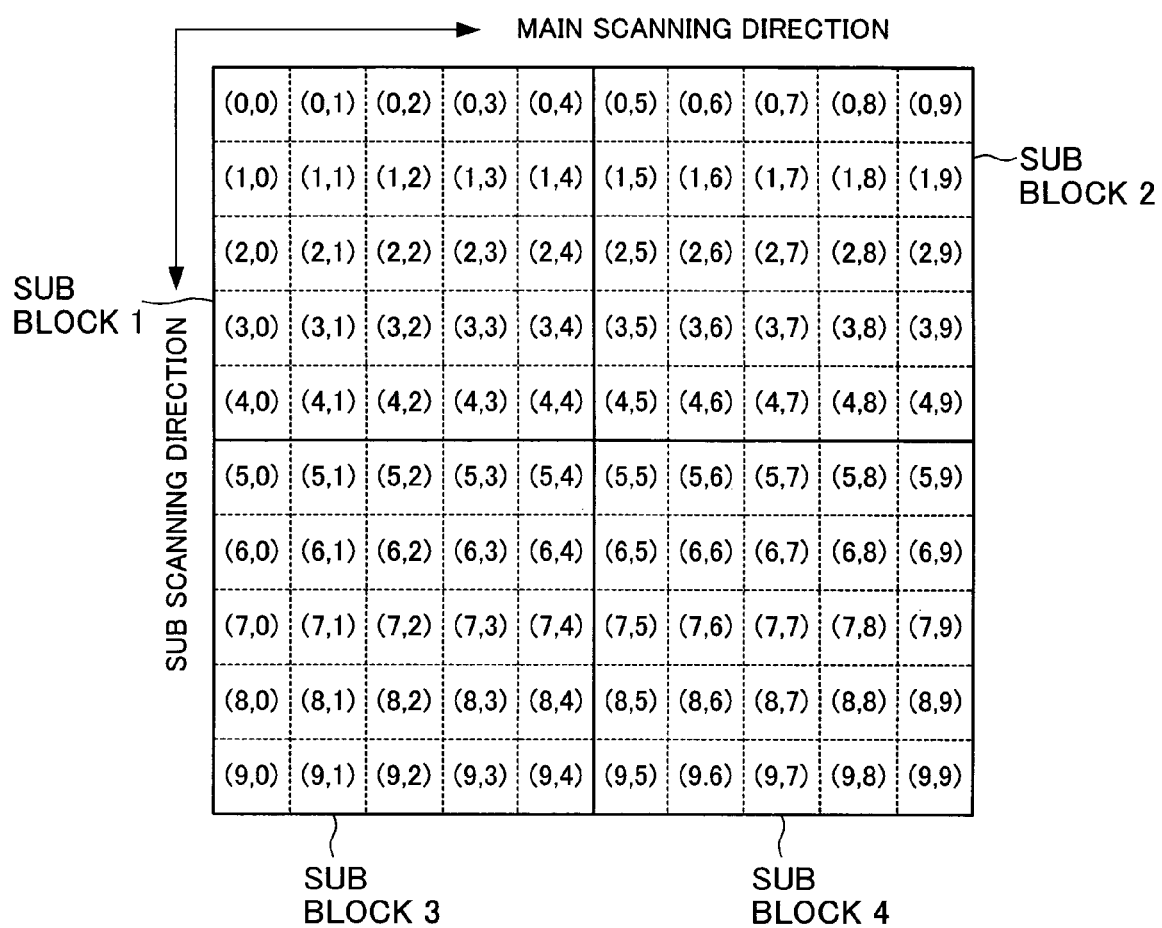
FIG. 15 is an explanatory view illustrating coordinates of each pixel of a segment block illustrated in FIGS. 14(a) and 14(b).

FIG. 15 illustrates coordinates of each pixel in the segment block illustrated in FIG. 14.

For each line in the main scanning direction, the absolute difference sum $subm1(i)$, which is the sum of the absolute differences in pixel value between density of a pair of adjacent pixels the right one of which is greater in density than the left one, is calculated as follows. Here, the calculation for the second line from the top is explained by way of example. In the second line, the pairs of the coordinates $(1,1)$ and $(1,2)$, $(1,2)$ and $(1,3)$, $(1,4)$ and $(1,5)$, and $(1,8)$ and $(1,9)$ are such pairs of adjacent pixels, the right one of which is greater in density than the left one. Hence, the absolute difference sum $subm1(1)$ is as follows:

$$subm1(1)=|70-40|+|150-70|+|170-140|+|140-40|=240,$$

where $subm1(i)$ represents the subm1 at a sub-scanning direction coordinates i.

For each line in the main scanning direction, the absolute difference sum $subm2(i)$, which is the sum of the absolute differences in pixel value between density of a pair of adjacent pixels, the right one of which is less in density than (or equal in density to) the left one, is calculated as follows. Here, the calculation for the second line from the top is explained by way of example. In the second line, the pairs of the coordinates $(1,0)$ and $(1,1)$, $(1,3)$ and $(1,4)$, $(1,6)$ and $(1,7)$, and $(1,7)$ and $(1,8)$ are such pairs of adjacent pixels, the right one of which is less in density than (or equal in density to) the left one. Hence, the absolute difference sum $subm2(1)$ is as follows:

$$subm2(1)=|40-140|+|140-150|+|150-170|+|40-40|=240,$$

where $subm2(i)$ represents the subm2 at a sub-scanning direction coordinates i.

From the following equation using $subm1(0)$ to $subm1(9)$ and $subm2(0)$ to $subm2(9)$ calculated in the same manner, subm1, subm2, busy, busy_sub are calculated out.

$$subm1 = \sum_{i=0}^{9} subm1(i) = 1610$$

$$subm2 = \sum_{i=0}^{9} subm2(i) = 1470$$

With respect to the sub-scanning direction, the G (Green) image data illustrated in FIG. 14(b) is subjected to a process similar to the process for the main scanning direction, thereby to calculate out that subs1 is 1520 and subs2 is 1950.

The obtained subm1, subm2, subs1, subs2 satisfy $|subm1-subm2| \leq |subs1-subs2|$ when applied to Equation 1. From this, it is found that busy=3470 and busy_sub=430. When the busy and busy_sub obtained are applied to Equation 2 using the predetermined THpair (=0.3), the following is obtained:

$$busy\_sub/busy=0.12$$

As understood from the above, Equation 2 is satisfied. Accordingly, the flat halftone discrimination signal flat of 1, which indicates that the segment block illustrated in FIG. 14(b) is in flat halftone, is outputted to the maximum transition number averaging section 46. Then, the maximum transition number averaging section 46 calculates out the maximum transition number average per segment block of flat halftone.

As described above, for a segment block of the non-flat halftone portion (e.g., see FIG. 32(a)) in which the density transition is high, the threshold value is a single threshold value for the segment block, no matter how the threshold value is set, for example, even if the threshold value is th1, th2a, or th2b illustrated in FIG. 32(b). Thus, if the segment block was of the non-flat halftone portion, the calculated transition number would be much smaller than the transition number that is supposed to be calculated out. For example, even if th1, th2a, th2b illustrated in FIG. 32(b) were set as threshold values, the calculated transition number would be much smaller than the transition number that is supposed to be calculated out. Specifically, as illustrated in FIG. 32(c) in which binary data correctly reproducing the halftone frequency is illustrated, the transition number that is supposed to be calculated out is 6. However, in FIG. 32(d) in which the binary data obtained from FIG. 32(a) using the threshold value th1, th2a, and th2b, the transition number is 2. Therefore, the calculated transition number is much smaller than the transition number that is supposed to be calculated out. This would deteriorate the halftone frequency determination accuracy.

FIG. 16(b) gives an example of frequency distributions of maximum transition number averages of 85 line/inch documents, 133 line/inch documents, and 175 line/inch documents. In the example illustrated in FIG. 16(b), not only the flat halftone region in which the density transition is low, but also the non-flat halftone region in which the density transition is high is used. The binarization process of a halftone region in which the density transition is high cannot extract the black pixel portions (that indicate the halftone portions) as illustrated in FIG. 32(c) but discriminates the white pixel portion (that indicates a low density halftone portion) and the black pixel portion (that indicates a high density halftone portion) as illustrated in FIG. 32(d). As a result, the calculated transition number is too small for the halftone frequency that correctly represents the halftone in question. This increases a number of the input images in which the maximum transition number average is smaller than in the case where the calculation is done with respect to only the flat halftone region, thereby extending the distribution of the maximum transition number averages of halftones of each halftone frequency in the smaller direction. Consequently, the frequency distributions overlap each other, whereby the halftone frequencies in portions of the document which correspond to the overlapping cannot be determined accurately.

However, according to the halftone frequency determining section 14 of the present embodiment, the flat halftone discrimination section 41 performs discrimination of the segment blocks as to whether a segment block is the flat halftone portion. Then, the maximum transition number averaging section 46 calculates out an average only from the transition numbers of those segment blocks which are discriminated as the flat halftone portion.

Figure 16:
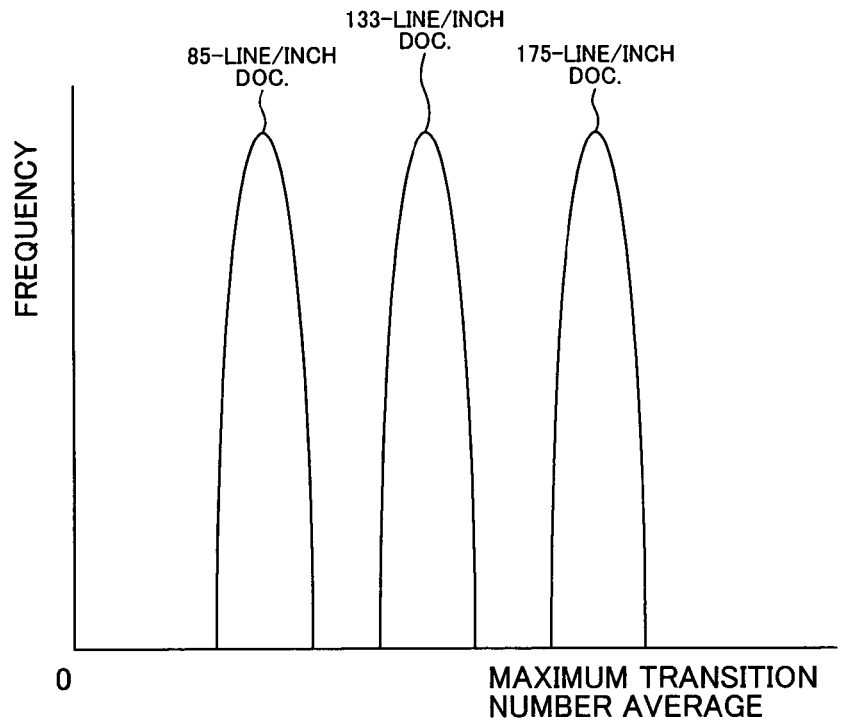
FIG. 16(a) is a view illustrating an example of frequency distributions of maximum transition number averages of 85 line/inch documents ("85-line/inch doc." in drawing), 133 line/inch documents ("133-line/inch freq. doc." in drawing), and 175-line/inch documents ("175-line/inch doc." in drawing), where the maximum transition number averages are obtained only from the flat halftone regions.
FIG. 16(b) is a view illustrating an example of frequency distributions of maximum transition number averages of 85 line/inch documents, 133 line/inch documents, and 175 line/inch documents, where the maximum transition number averages are obtained from not only the flat halftone regions but also non-flat halftone regions.
Figure 16:
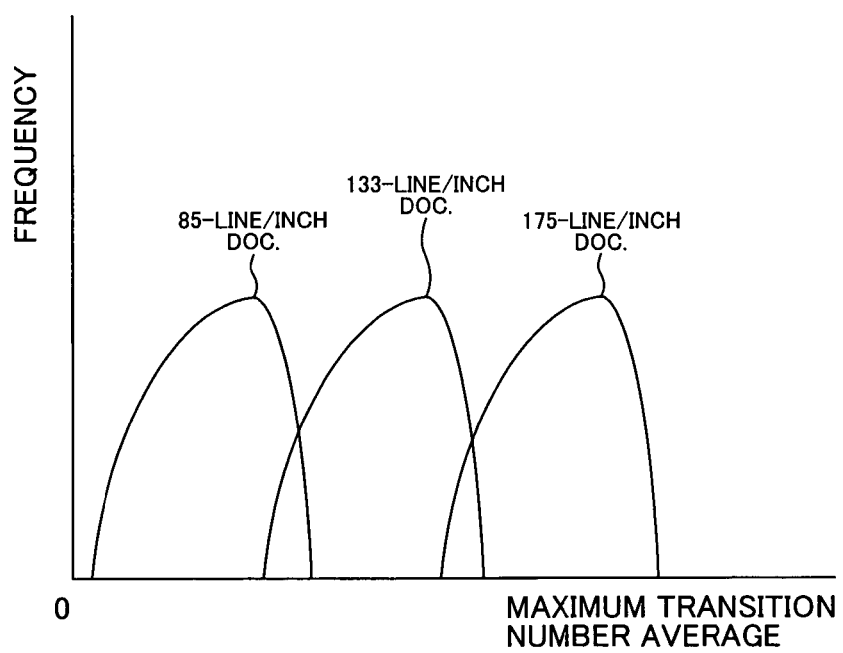

FIG. 16(*a*) gives an example of frequency distributions of maximum transition number averages of 85 line/inch documents, 133 line/inch documents, and 175 line/inch documents. In the example illustrated in FIG. 16(*a*), only the flat halftone region in which the density transition is low is used. By using the flat halftone region in which the density transition is low, it is possible to generate binary data that reproduces the halftone frequency accurately. Thus, halftone frequencies have different maximum transition number averages, thereby eliminating, or reducing, the overlapping of the frequency distributions of the halftone frequencies. This makes it possible to attain higher halftone frequency determination accuracy.

In parallel with the process of the halftone determining section 14, the threshold value setting section 42, the threshold value adjusting section 43, the binarization section 44, and the maximum transition number calculating section 45 perform the following processes with respect to the G (Green) image data illustrated in FIG. 14(*b*).

With respect to the G (Green) image data as illustrated in FIG. 14(*b*), the threshold value setting section 42 sets the average pixel density value ave (=138) as the threshold value th1.

The threshold value adjusting section 43 adjusts the threshold value th1 thereby to obtain the final threshold value th2. This adjustment aims to attain such binarization that allows extracting only the dots in the color component in question to be counted for obtaining the transition number thereof (that is, the color component selected by the color component selecting section 40). In the case discussed here, the adjustment aims to attain such binarization that allows extracting only the magenta dots.

Figure 17:
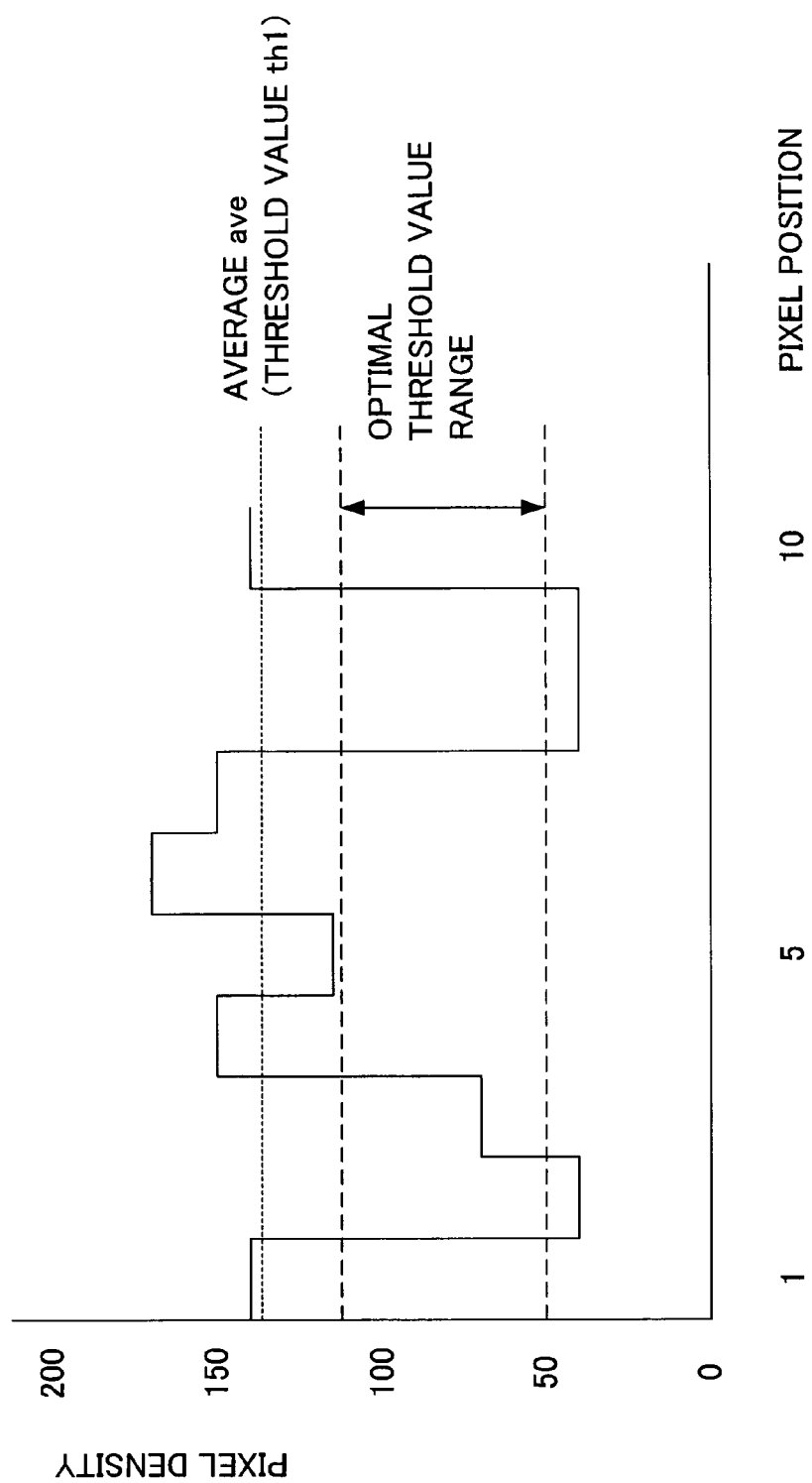
FIG. 17 is an explanatory view illustrating density transition of a second line from the top along a main scanning direction in FIG. 14(b), a threshold value th1 with respect to the density transition, and a most suitable threshold value range within which it is preferable to adjust the threshold value th1.
Figure 18:
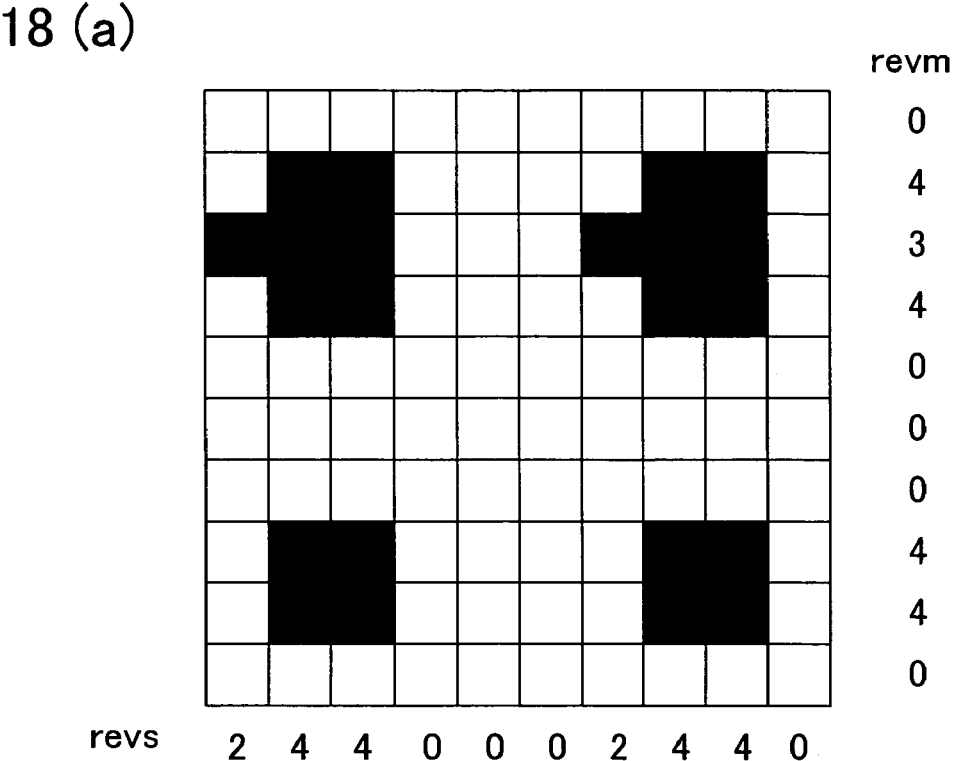
FIG. 18(a) is an explanatory view illustrating binary data obtained from binarization of the G (Green) image data illustrated in FIG. 14(b) where a threshold value th2 is used.
FIG. 18(b) is an explanatory view illustrating binary data obtained from binarization of the G (Green) image data illustrated in FIG. 14(b) where a threshold value th1 is used.
Figure 18:
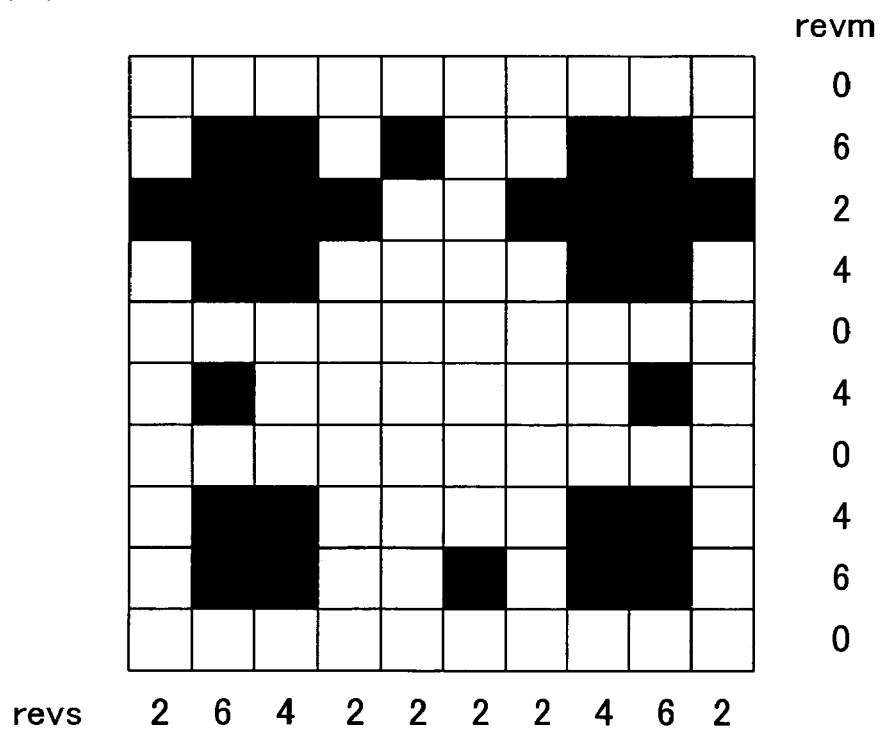
Figure 19:
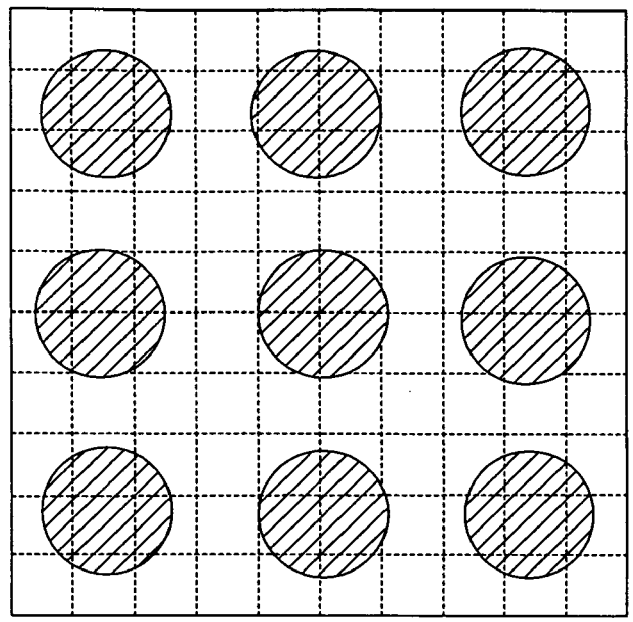
FIG. 19(a) is an explanatory view illustrating an example of a 175 line/inch single-color halftone.
FIG. 19(b) is an explanatory view illustrating binary data obtained from binarization of G (Green) image data of the halftone of FIG. 19(a).
Figure 19:
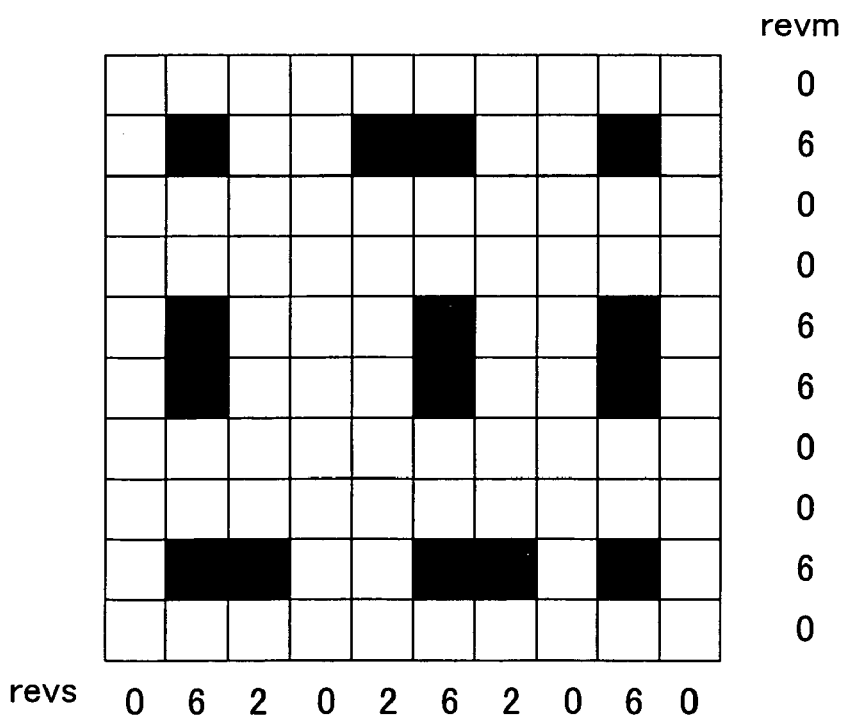

FIG. 17 illustrates density transition along a second line in the main scanning direction from the top in FIG. 14(*b*), the threshold value th1 for the density transition, and an optimal threshold value range within which the threshold value th1 is preferably adjusted. Here, if the threshold value th1 is set as the average density ave by the threshold value setting section 42, the threshold value th1 could be substantially at a center of (i.e., substantially equal to the median of) the density range of the segment block.

The optimal threshold value range is a range within which the threshold value allows the extraction of the dots of the color component selected by the color component selecting section 40, without extracting the dots of the unnecessary color component other than the color component selected by the color component selecting section 40. That is, as illustrated in FIG. 17, the optimal threshold value range is from the density of the dots of the color component selected by the color component selecting section 40, to the density of the dots of the unnecessary color component.

Specifically, in case of white-based color dots as illustrated in FIG. 17, the optimal threshold value range is larger than a density of color dots of the color component selected by the color component selecting section 40 (i.e., the optimal threshold value range is larger than a minimum value of a pixel peak of the color component selected by the color component selecting section 40), but smaller than a density of color dots of the unnecessary color component (i.e., the optimal threshold value range is smaller than a minimum value of a pixel peak of the unnecessary color component). In case of black-based white dots, the optimal threshold value range is smaller than a density of white dots of the color component selected by the color component selecting section 40 (i.e., the optimal threshold value range is smaller than a minimum value of a pixel peak of the color component selected by the color component selecting section 40), but larger than a density of white dots of the unnecessary color component (i.e., the optimal threshold value range is larger than a minimum value of a pixel peak of the unnecessary color component).

The optimal threshold value range depends on the reading characteristic of the color image input device 1 as to the respective color component from the document. The reading characteristic is a filter spectral characteristic of the respective components, spectral reflectance characteristic of ink corresponding to the respective colors, and/or the like.

As described above, each RGB image data theoretically includes only the color component that is in the relationship of complementary color therewith. But in reality, each RGB image includes an unnecessary color component. An extent of the unnecessary color component mixed in the image data, that is, a degree of influence from the mixed unnecessary color component, is dependent on the reading characteristic of the color image input apparatus 1. Therefore, thave, c1, and c2 are predetermined in view of the reading property of the color image input apparatus 1 such that the final threshold value th2 is within the optical threshold value range (as illustrated in FIG. 17) for various halftone documents. Here, thave is 128, which is the median density, c1 is 0.2, and c2 is 0.

With this, the threshold value adjusting section 43 performs the threshold value adjustment in which the value substantially equal to the median of the density range is a starting point of the adjustment and the value is adjusted using the maxim density difference m sub. As a result, the threshold value adjustment performed by the threshold value adjusting section 43 can adjust the threshold value within the optimal threshold value range of FIG. 17 in such a manner that the threshold value will not be adjusted to cause many cases where the transition number of the binary data becomes far from the theoretical value, for example, because the final threshold value th2 becomes so low that halftone density values to be extracted will be above the final threshold value th2.

Specifically, the threshold value adjusting section 43 calculates out the maximum density difference (=170) in the G (Green) image data illustrated in FIG. 14(*b*). Then, the threshold value th1 is adjusted according to Equations (3), using the predetermined thave (=128), c1 (=0.2), and c2 (=0), thereby to obtain the final threshold value th2 (=104).

With this arrangement in which the final threshold value th2 is obtained from a function using the average density ave and the maximum density m sub of the segment block, it is possible to relatively easily adjust the threshold value to be within the density range such that only the desired dots are extracted regardless of the density characteristic of the halftone document.

On the other hand, if the threshold value setting section 42 did not use the average density ave and the threshold value adjusting section 43 did not use the maximum density difference m sub (that is, the threshold value setting section 42 and threshold value adjusting section 43 respectively used fixed values), threshold value adjustment would be performed using, as the starting value of adjustment, a value that is not substantially equal to the median of the density range, and the threshold value adjustment would be possibly performed limitlessly. Consequently, the transition number of the binary data would become far from the theoretical value more often, for example, because the final threshold value th2 becomes so low that halftone density values to be extracted will be above the final threshold value th2. That is, the extraction would fail more often to selectively extract the color component in question.

As seen from Equations (3), the threshold value adjusting section 43 performs different adjustments depending on whether or not the average density ave is larger than thave. The reason is as follows.

Assume that density "0" indicates the color that the signal of a given color component indicates (e.g., green for the G signal), and the density "255" indicates white. As illustrated in FIG. 17, the average density ave larger than thave indicates that the halftone is a composite color halftone that is white-based. In this case, as described above, the influence from the dots (here, the dots of pixel position 5 in FIG. 17) of the unnecessary color component (here, cyan) except the color component (here, magenta) in question can be removed by subtracting Msub×c1+c2 from the threshold value th1. A small G signal indicates that the G signal is absorbed by the magenta component and a large G signal indicates that the magenta component is little and the G signal is not absorbed.

On the other hand, the average density ave less than thave indicates that the halftone is consisting of white dots caused in the composite color halftone of halftone-based state. In this case, the influence from the white dots of the unnecessary color component (here, cyan) except the color component in question (here, magenta) can be removed by adding Msub× c1+c2 to the threshold value th1.

FIG. 18(a) illustrates the binary data obtained via the binarization of the G (Green) image data (illustrated in FIG. 14(b)) by the binarization section 44, using the final threshold value th2 (=104) calculated by the threshold value adjusting section 43.

In FIG. 18(a) in which the threshold value th2 is used, only the magenta dots for which the transition number is counted are extracted. Moreover, in the example illustrated in FIG. 18(a), the maximum transition number calculating section 45 calculates out the maximum transition number m rev (=8) of the segment block in the following manner.

(1) Count the transition number revm (j) of the binary data of each line along the main scanning direction (where j is a number of column (here j=0 to 9); a transition regardless of from "0" to "1" or from "1" to "0" is counted as "one" transition.)

(2) Calculate out the maximum m revm of revm (j)

(3) Count the transition number revs (i) of the binary data of each line along the sub scanning direction where i is a number of rows (here i=0 to 9).

(4) Calculate out the maximum m revs of revs (i) (see FIG. 16(a) for the results of the calculation for the main and sub scanning directions).

(5) Calculate out the maximum transition number m rev of the segment block, using the following equation:

$$m\ rev = m\ revm + m\ revs$$

Other examples of how to calculate the maximum transition number m rev of the segment block encompass use of either of the following equations:

$$m\ rev = m\ revm \times m\ revs$$

$$m\ rev = \max(m\ revm, m\ revs)$$

In the following, the threshold value adjusting section 43 is compared with a comparative example (illustrated in FIG. 18(b)) in order to clearly show the effect of the threshold value adjusting section 14. FIG. 18(b) illustrates binary data obtained via binarization of the G (Green) data (illustrated in FIG. 14(b)), using the threshold value th1 (=138) set by the threshold value setting section 42. In the case illustrated in FIG. 18(b), the maximum transition number calculating section 45 calculates out a maximum transition number mrev (=12) of a segment block.

The transition number of a segment block is uniquely dependent on an input resolution of the image reading apparatus such as scanners and the like, and a halftone frequency of a printed mater. In the case of the halftone illustrated in FIG. 14(a), there are four dots in the segment block. Therefore, the maximum transition number m rev in the segment block is theoretically in a range of 6 to 8. On the other hand, in the case of single-color halftone of high frequency (175 line/inch) as illustrated in FIG. 19(a), there are nine dots in the segment block. Therefore, as illustrated in FIG. 19(b), the maximum transition number m rev in the segment block is theoretically in a range of 10 to 12.

As described above, for the segment block illustrated in FIGS. 14(a) and 14(b), the maximum transition number calculation using the final threshold value th2 obtained via the adjustment by the threshold value adjusting section 43 showed that m rev=8, which is within the theoretical range of m rev in which the segment block of the halftone frequency (133 line/inch) should fall theoretically. On the other hand, the maximum transition number calculation using the unadjusted threshold value th1 showed that m rev=12 for the segment block illustrated in FIGS. 14(a) and 14(b). This value of m rev falls off from the theoretical range in which the segment block of the halftone frequency (133 line/inch) should fall theoretically, and becomes equal to the theoretical value of the halftone of higher halftone frequency (175 line/inch).

This is because of the following reason.

Figure 20:
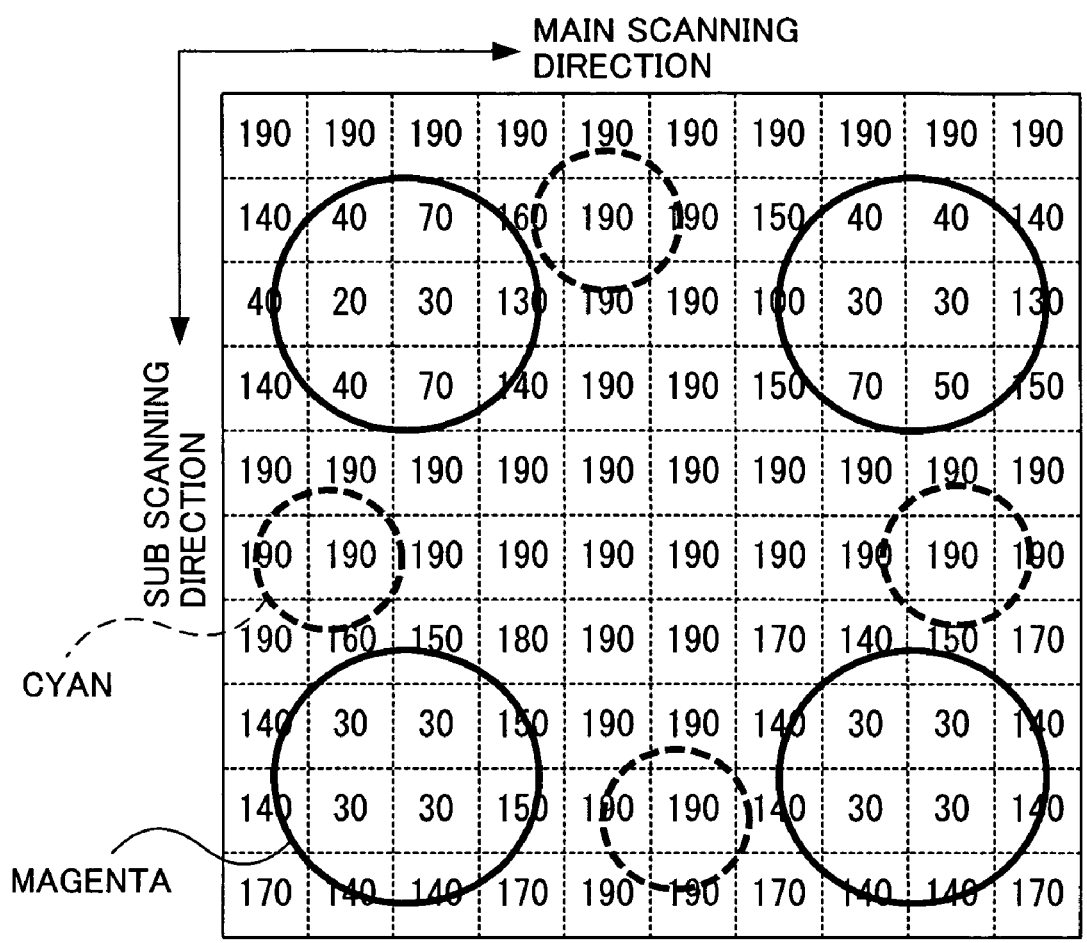
FIG. 20 is an explanatory view illustrating an example of G (Green) image data of the halftone of FIG. 14(a), where density transition of cyan dots is not reflected.

Spectral transmittance characteristic of the color image input apparatus 1 such as scanners is not always similar to spectral reflectance characteristic of ink. Therefore, e.g., in the case of the composite color halftone consisting of magenta and cyan dots as illustrated in FIG. 14(a), the G (Green) image data cannot avoid influence from the density transition due to the cyan dots. As a result, not only the magenta dots in question but also the cyan dots not in question and unnecessary are reflected in the G (Green) image data as illustrated in FIG. 14(b), which illustrates the G (Green) image data from the RGB image captured via a scanner or the like. In FIG. 14(b), the density (value of G signal) of each pixel in the image of FIG. 14(a) is shown, where the density "0" represents black and the density "255" represents white. On the other hands, an example of image data without influence of the density transition due to cyan dots is illustrated in FIG. 20. The density of the cyan halftone portion is equal to that of the paper color portion (190). However, the densities of the cyan halftone portion and the paper color portion are actually different as illustrated in FIG. 14(b). In the transition number determination using the threshold value th1, not only the magenta dots to be counted but also the unnecessary cyan dots are also counted. Thus, the use of the threshold value th1 gives a value close to the theoretical value (10 to 12) of the single-color halftone of higher halftone frequency (175 line/inch) as illustrated in FIG. 17, thereby leading to erroneous determination of the halftone frequency. That is, the use of the threshold value th1 causes poor accuracy in the halftone frequency determination.

Figure 21:
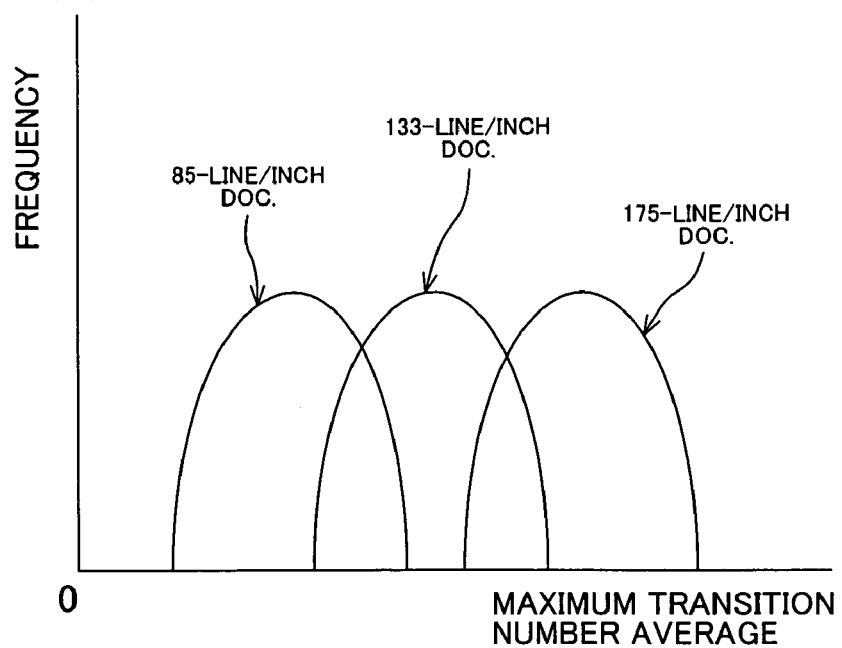
FIG. 21(a) is an explanatory view illustrating a frequency distributions of maximum transition number averages of binary data, making a comparison with those of the present invention illustrated in FIG. 21(b).
FIG. 21(b) is an explanatory view illustrating the frequency distributions of the maximum transition number averages of the binary data, the frequency distributions being attained according to the present invention.
Figure 21:
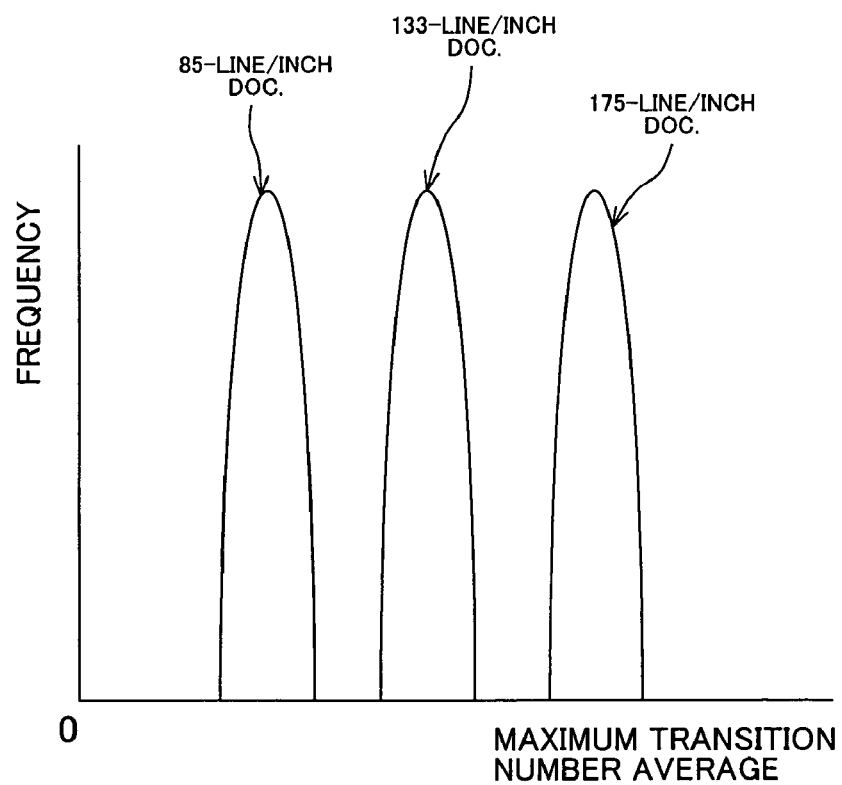

FIG. 21(a) is a view illustrating an example of frequency distributions of maximum transition number averages of 85 line/inch documents ("85-line/inch doc." in drawing), 133 line/inch documents ("133-line/inch doc." in drawing), and 175-line/inch documents ("175-line/inch doc." in drawing), where the maximum transition number averages are obtained using the threshold value th1 set by the threshold value setting section 42. The use of the threshold value th1 results in closeness of the composite color halftone of low frequency and the single-color halftone of high frequency, which results in overlapping of the frequency distributions of different frequencies. As a result, the halftone frequencies in portions of the document which correspond to the overlapping cannot be determined accurately. FIG. 21(*b*) is a view illustrating an example of frequency distributions of maximum transition number averages of 85 line/inch documents ("85-line/inch doc." in drawing), 133 line/inch documents ("133-line/inch doc." in drawing), and 175-line/inch documents ("175-line/inch doc." in drawing), where the maximum transition number averages are obtained using the threshold value th2 obtained by the threshold value adjusting section 43. As a result of the use of the threshold value th2, the maximum transition number average of the composite color halftone of low frequency becomes largely different from that of the single-color halftone of high frequency, thereby eliminating or reducing the overlapping of the frequency distributions. This makes it possible to attain higher halftone frequency determination accuracy.

As described above, the present embodiment is arranged such that the flat halftone discrimination section 41 discriminates the segment block as to whether they are of flat halftone portion, and the maximum transition number averages of those segment blocks which are discriminated as the flat halftone portion are extracted. With this, overlapping of the frequency distributions of the maximum transition number averages for the respective halftone frequencies is eliminated (or reduced).

Further, the threshold value adjusting section 43 adjusts the threshold value of the binarization by using the adjusting value predetermined corresponding to the reading property of the color image input apparatus 1. With this, the transition number of the color component in question can be selectively extracted even for the composite color halftone. As a result, overlapping of the frequency distributions of the maximum transition number averages is eliminated (or reduced).

This allows highly accurate halftone determination.

Note that the threshold value setting section 42 and the threshold value adjusting section 43 may be individual sections (blocks) separately, but may be a single section (block) integrally that performs both the functions of the threshold value setting section 42 and the threshold value adjusting section 43, even though the former case is described above.

Example of Process Using Halftone frequency Determination Signal

An example of the process based on the result of the halftone frequency discrimination performed by the halftone frequency determining section 14 is described below.

In halftone images, moiré sometimes occurs due to interference between the halftone frequency and a periodic intermediate tone process (such as dither process). To prevent moiré, a flattening process that reduces amplitude of the halftone image in advance may be adopted. Such a flattening process may be sometimes accompanied with such image deterioration that a halftone photo and a character on halftone are blurred. Examples of solutions for this problem are as follows:

Solution (1): Employ flattening/enhancing mixing filter that reduces an amplitude of only the moiré-causing frequency of the halftone while amplifying an amplitude of a frequency component lower than the frequency of a constituent element (human, landscape, etc.) of the photo or of a character.

Solution (2): (2) Detect a character located on a halftone and subject such a character to an enhancing process, which is not carried out for the photo halftone and background halftone.

Here, Solution (1) is discussed. Different halftone frequencies require the filter to have different frequency properties in order to prevent the moiré and keep the sharpness of the character on halftone and the halftone photo at the same time. Therefore, according to the halftone frequency determined by the halftone frequency determining section 14, the spatial filter processing section 18 performs a filtering process having the frequency property suitable for the halftone frequency. With this, it is possible to attain the moiré prevention and sharpness of the halftone photo and character on halftone at the same time for halftones of any frequencies.

On the other hand, if, as in the conventional art, the frequency of the halftone image was unknown, it would be necessary to have a process that prevents moiré in the halftone images of all the frequencies, in order to prevent moiré that causes the most significant image deterioration. This does not allow using any flattening filters except a flattening filter that reduces the amplitudes of all the halftone frequencies. The use of such a flattening filter results in blurring of the halftone photo and the character on halftone.

Figure 22:
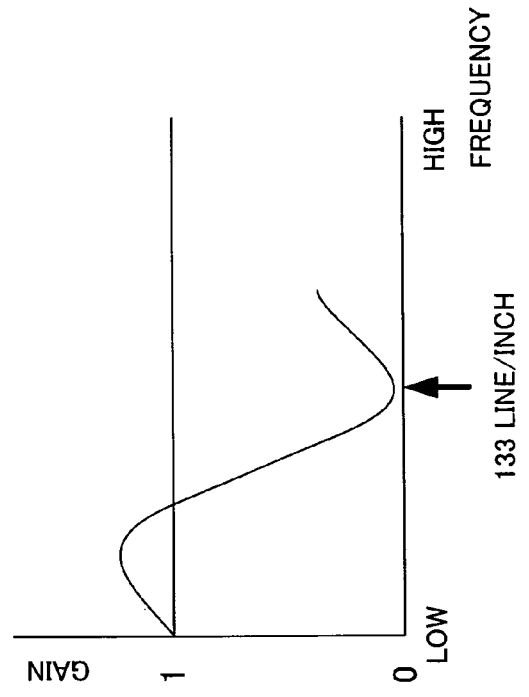
FIG. 22(a) is an explanatory view illustrating a filter frequency property most suitable for documents with a resolution of 85 line/inch.
FIG. 22(b) is an explanatory view illustrating a filter frequency property most suitable for documents with a resolution of 133 line/inch.
FIG. 22(c) is an explanatory view illustrating a filter frequency property most suitable for documents with a resolution of 175 line/inch.
Figure 22:
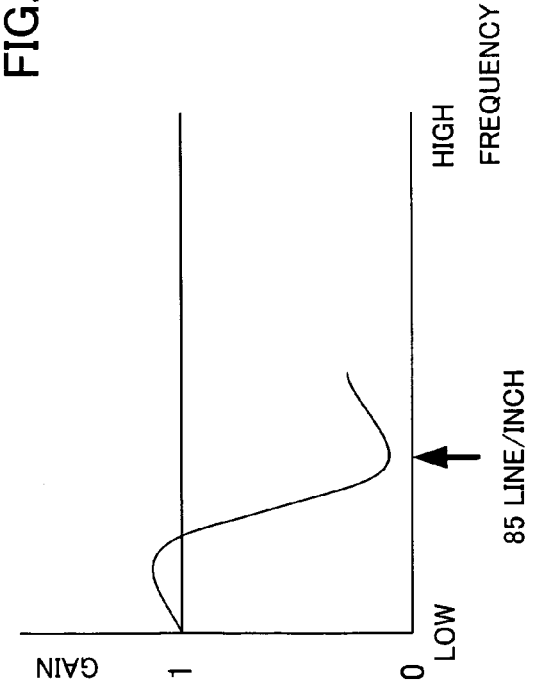
Figure 22:
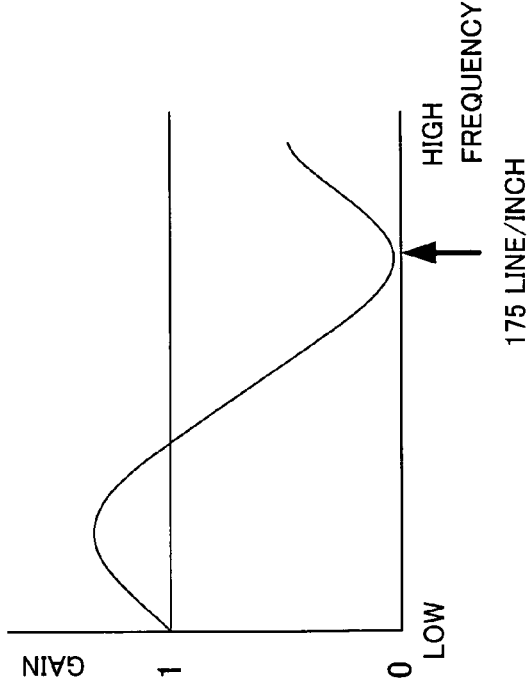

FIG. 22(*a*) gives an example of a filter frequency property most suitable for the 85 line/inch. FIG. 22(*b*) gives an example of a filter frequency property most suitable for the 133 line/inch. FIG. 22(*c*) gives an example of a filter frequency property most suitable for the 175 line/inch. FIG. 23(*a*) gives an example of filter coefficients corresponding to FIG. 22(*a*). FIG. 23(*b*) gives an example of filter coefficients corresponding to FIG. 22(*b*). FIG. 23(*c*) gives an example of filter coefficients corresponding to FIG. 22(*c*).

Here, Solution (2) is discussed. Use of a low-frequency edge detecting filter or the like, as illustrated in FIG. 24(*a*) or 24(*b*), can detect the character on high-frequency halftone highly accurately without erroneously detecting the edge of the high-frequency halftone, because the character and the high-frequency halftone are different in the frequency properties. However, for the low-frequency edge detecting filter or the like, it is difficult to detect a character on low-frequency halftone because the low-frequency halftone has a frequency property similar to that of the character. If such a character on low-frequency halftone was detected, erroneous detection of the halftone edge would be significant, thereby causing poor image quality. Hence, based on the frequency of the halftone image determined by the halftone frequency determining section 14, a detection process for the character on halftone is carried out by the segmentation process section 21 only when the character is on a high-frequency halftone, e.g. 133 line/inch or higher. Alternatively, a result of the halftone edge would be valid only when the character is on a high-frequency halftone, e.g., 133 line/inch or higher. With this, it is possible to improve readability of the character on high-frequency halftone without causing the image deterioration.

The process using the halftone frequency determination signal may be carried out by the color correction section 16 or the tone reproduction process section 20.

<Modification 1>

The halftone frequency determining section 14 may be replaced with a halftone frequency determining section (halftone frequency determining means) 14*a*, which is provided with a threshold value setting section (threshold value determining means) 42a, instead of the threshold value setting section 42. The threshold value setting section 42a sets a fixed value as the threshold value, while the threshold value setting section 42 sets, as the threshold value, the average density of the pixels in the segment block.

Figure 25:
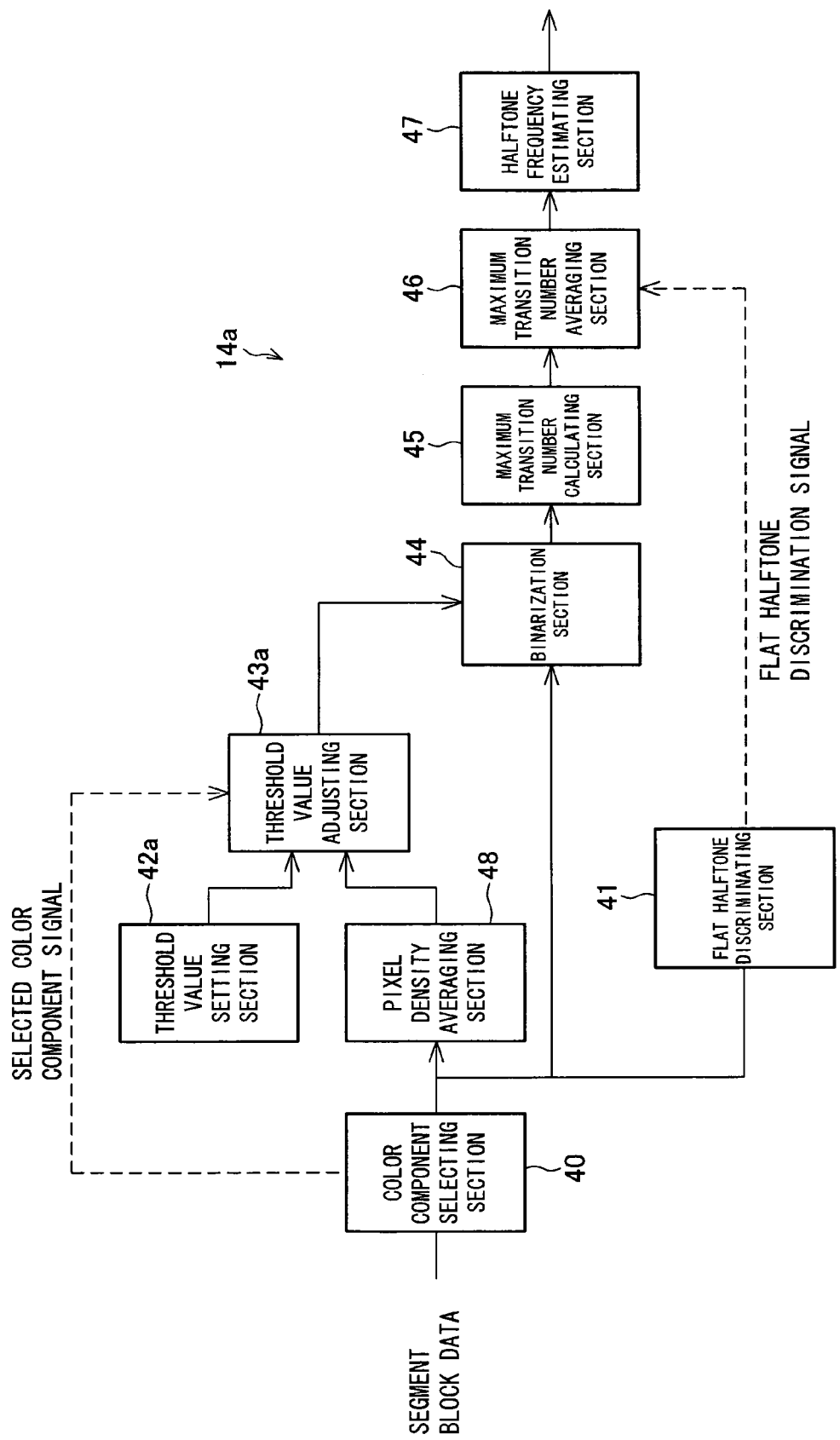
FIG. 25 is a block diagram illustrating a modification 1 of the halftone frequency determining section of the present invention.

FIG. 25 is a block diagram illustrating an arrangement of halftone frequency determining section 14a. As illustrated in FIG. 25, halftone frequency determining section 14a is provided with a color component selecting section 40, a flat halftone frequency determining section 41, the threshold value setting section 42a, a threshold value adjusting section (threshold value determining means) 43a, a binarization section 44, a maximum transition number calculating section 45, a maximum transition number averaging section 46, a halftone frequency estimating section 47, and an pixel density averaging section 48.

The threshold value setting section 42a sets a predetermined fixed value as a threshold value th1 that is used to obtain a final threshold value th2 for use in binarization of a segment block. For example, the fixed value set by the threshold value setting section 42a is 128, which is a median of a whole density range (0 to 255).

The pixel density averaging section 48 calculates out an average density ave of pixels in the segment block.

The threshold value adjusting section 43a gives the final threshold value th2 by adjusting the threshold value th1 from the following Equations (4) using the threshold value th1 set by the threshold value setting section 42a and the average density ave calculated out by the pixel density averaging section 48.

If ave>thave, $th2=th1-c3$, and

If not, $th2=th1+c3$     Equation (4), where thave and c3 are optical values predetermined via experiment for the respective R, G, B color components. The threshold value adjusting section 43a stores therein thave and c3 predetermined for the respective color components, so that the threshold value adjusting section 43a uses thave and c3 that correspond to the color component indicated by a selection color component signal sent thereto from the color component selecting section 40.

Moreover, thave and c3 are so predetermined to attain such a threshold value th2 that the threshold value th2 will be within an optimal threshold value range that allows extraction of only the desired dots of the color component that the final threshold value th2 targets, without extracting the unnecessary color component. Specifically, thave and c3 are predetermined via such an experiment in which various halftone documents whose halftone frequencies are already known are used to find final threshold values th2 that give transition numbers of the binary data close to theoretical values (expected values) of the halftone documents.

Figure 26:
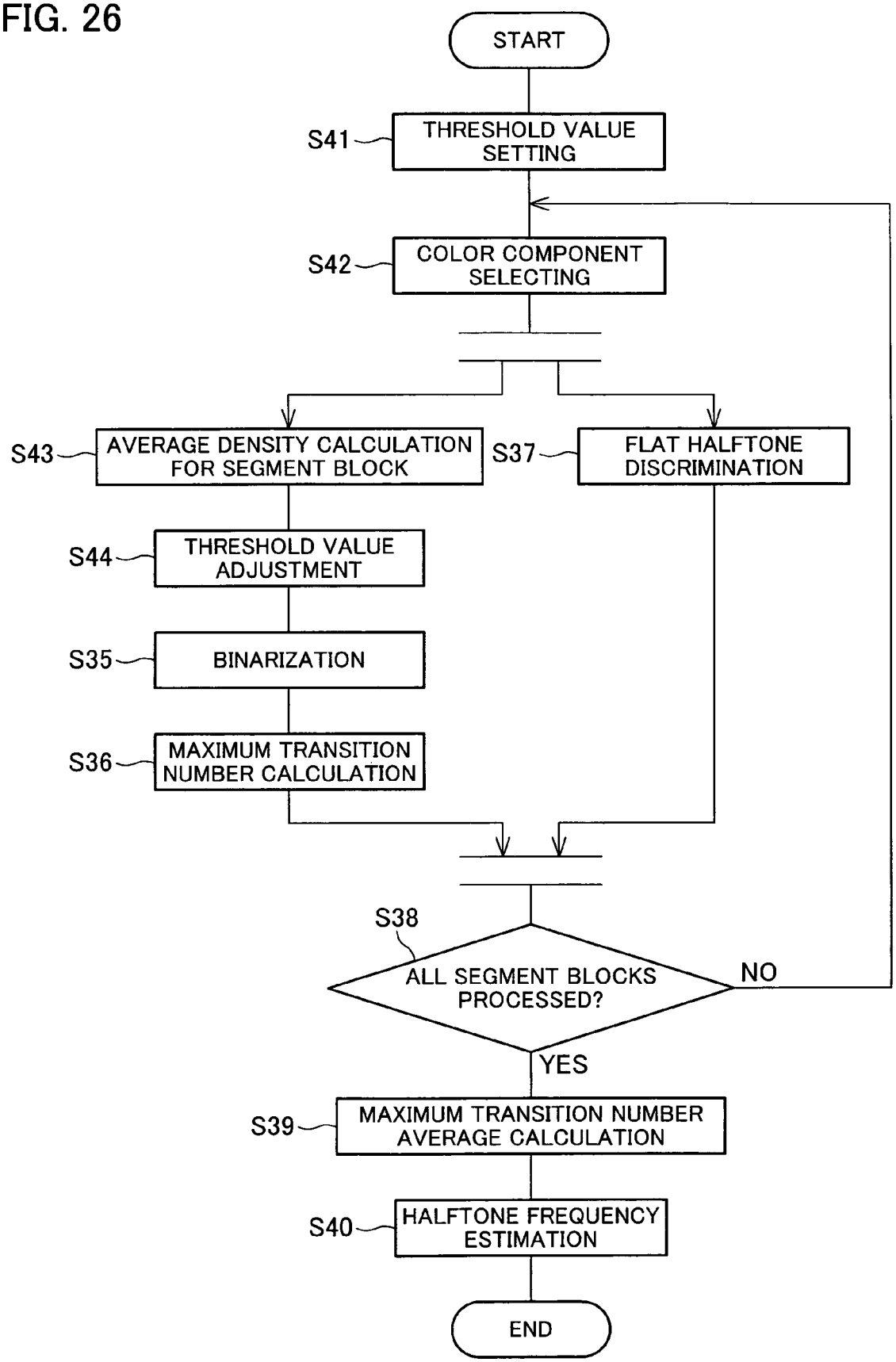
FIG. 26 is a flowchart illustrating a method of process of the halftone frequency determining section as illustrated in FIG. 25.

Next, the method of the halftone frequency determination process performed by the halftone frequency determining section 14a having the above arrangement is described below referring to the flowchart illustrated in FIG. 26.

To begin with, the threshold value setting section 42a sets a fixed value (e.g., the medium of the whole density range) as the threshold value th1 (S41).

Next, the color component selecting section 40 selects image data having a larger busyness than others among the R, G, B image data, and then outputs the selected image data to the pixel density averaging section 48 and the binarization section 44 (S42). Moreover, the color component selecting section 40 outputs to the threshold value adjusting section 43a a selected color component signal that indicates which color component is selected.

Next, the pixel density averaging section 48 calculates out the average pixel density ave of the segment block (S43).

After that, the threshold value adjusting section 43a calculates out the final threshold value th2 by adjusting the threshold value th1 according to Equations (4) using the thave and c3 that correspond to the color component indicated by the selected color component signal outputted from the color component selecting section 40 (S44).

The binarization and the maximum transition number calculation are performed in the same manner as S35 and S36 described above. Moreover, the flat halftone frequency discrimination performed in parallel with S43, S44, S35, and S36 is carried out in the same manner as S37. Further, the processes of S38 to S40 are carried out after S36 and S37. In the present modification, however, the threshold value setting section 42a sets, as a threshold value th1, a fixed value for all the segment blocks. Therefore, if all the segment blocks have not been processed yet at S38, the process returns to the color component selecting process at S42.

<Modification 2>

Another modification of the present invention is described below.

Figure 27:
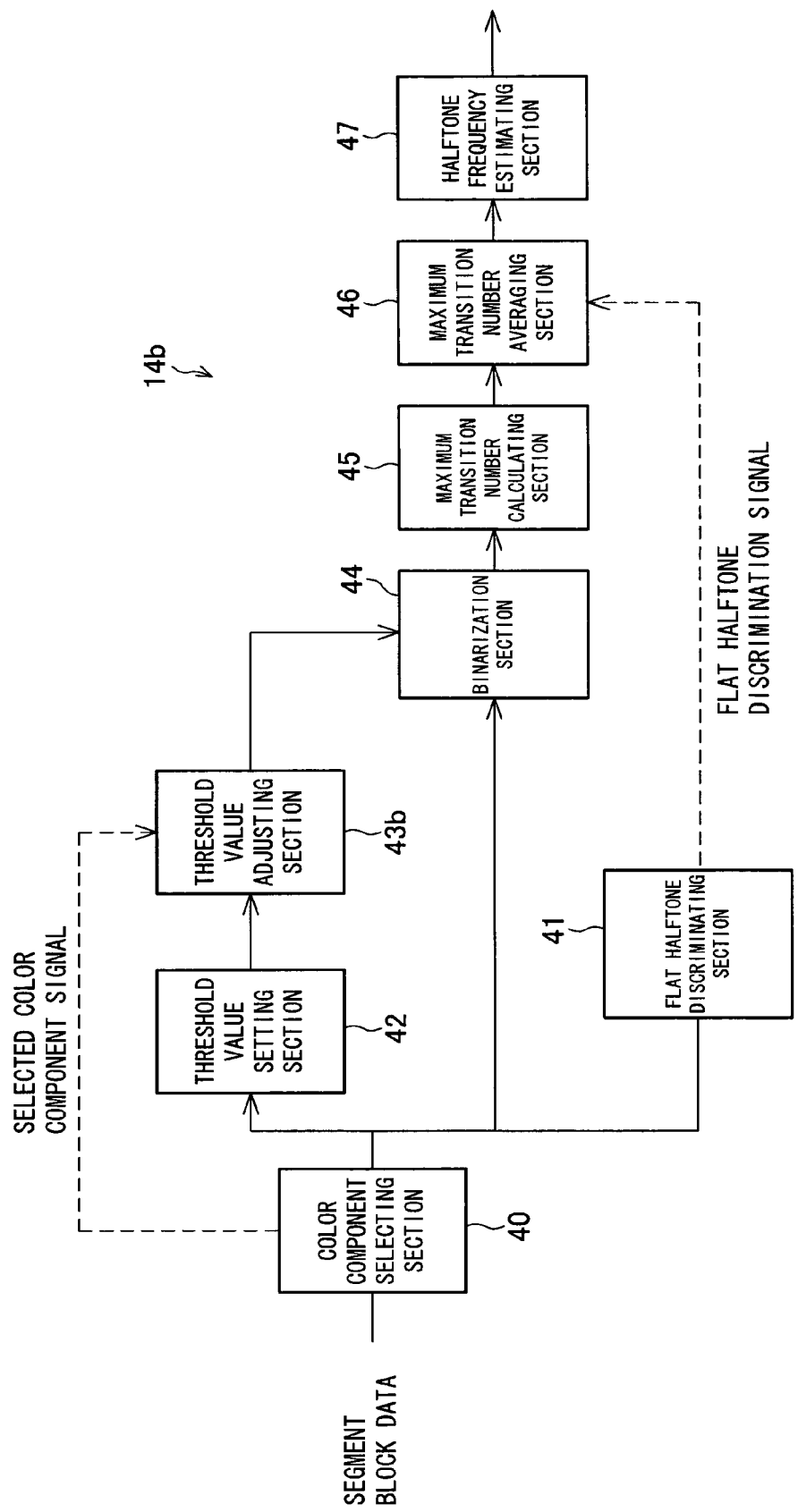
FIG. 27 is a block diagram illustrating a modification 2 of the halftone frequency determining section of the present invention.

A color image forming apparatus of the present modification is provided with a halftone frequency determining section 14b as illustrated in FIG. 27, instead of the halftone frequency determining section 14 as illustrated in FIG. 1.

As illustrated in FIG. 27, the halftone frequency determining section 14b is provided with a color component selecting section 40, a flat halftone frequency determining section 41, the threshold value setting section 42, a threshold value adjusting section (threshold value determining means) 43b, a binarization section 44, a maximum transition number calculating section 45, a maximum transition number averaging section 46, and a halftone frequency estimating section 47.

Using Equation (4), the threshold value adjusting section 43b adjusts the threshold value th1 (average density ave) set by the threshold value setting section 42, thereby to obtain a final threshold value th2. The threshold value adjusting section 43b stores therein thave and c3 predetermined for the respective color components, so that the threshold value adjusting section 43b uses thave and c3 that correspond to the color component indicated by a selection color component signal sent thereto from the color component selecting section 40.

Figure 13:
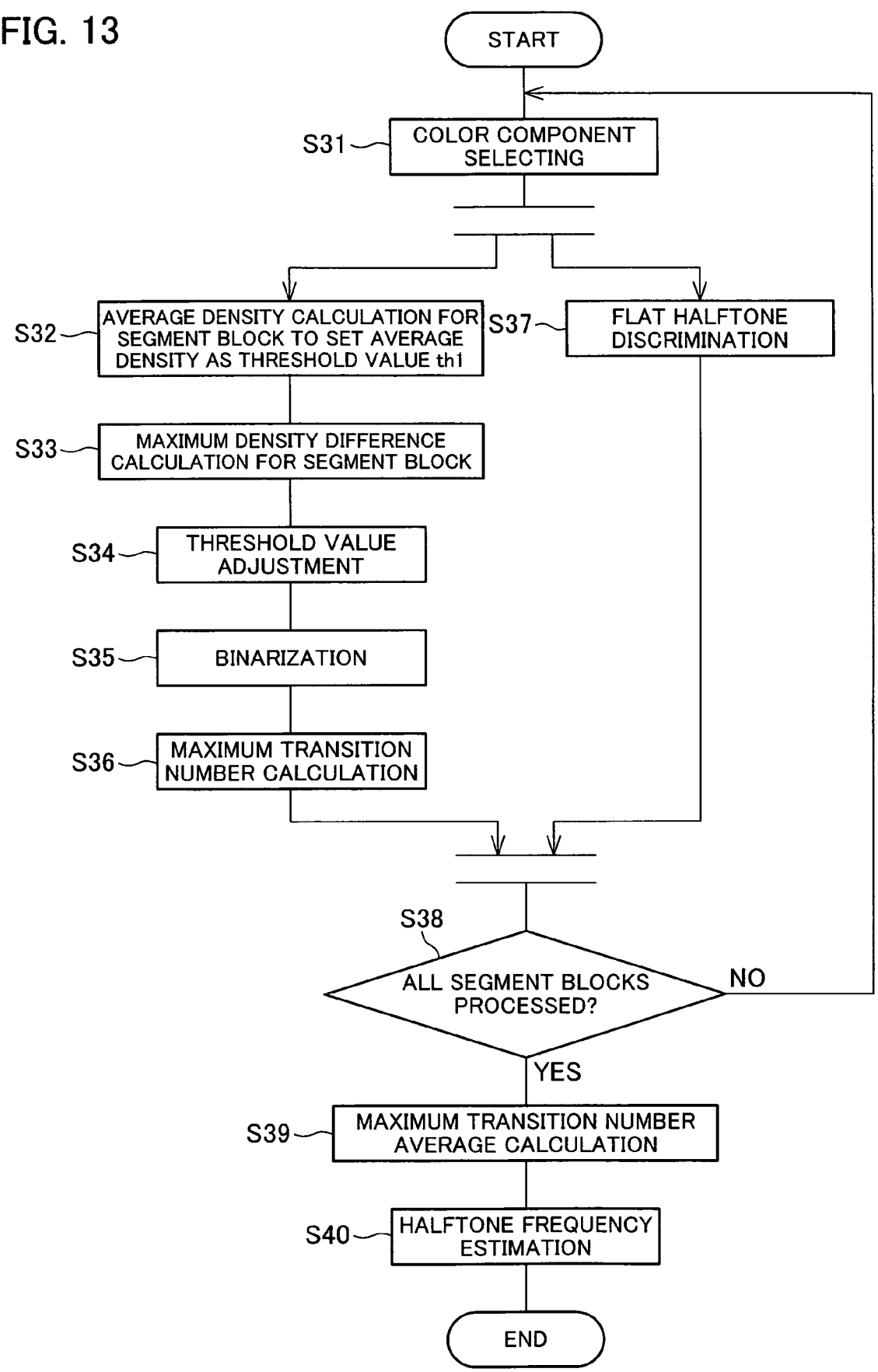
FIG. 13 is a flowchart illustrating a method of the process of the halftone frequency determining section according to the first embodiment.

A method of the halftone frequency determination process performed by the halftone frequency determining section 14b having the above arrangement is almost identical with the procedure of the flowchart of FIG. 13 except that the threshold value adjusting process uses Equations (4) instead of Equations (3) unlike the process at S34 in the flowchart of FIG. 13.

<Modification 3>

In the above embodiment, the flat halftone determining process and threshold value setting/threshold value adjustment/binarization/maximum transition number calculation are performed in parallel, and the average of the transition numbers in the halftone region is calculated out only from the transition numbers of the segment blocks from which the flat halftone discrimination signal flat of 1 is outputted. In this case, to speed up the parallel processes, it is necessary to provide at least two CPUs respectively for the flat halftone determination and for the threshold value setting/threshold value adjustment/binarization/maximum transition number calculation.

In case where only one CPU is provided for performing each process, it may be arranged such that the flat halftone discriminating process is carried out first so that the threshold value setting/threshold value adjustment/binarization/maximum transition number calculation is carried out for the halftone region which is discriminated as a flat halftone portion.

Figure 28:
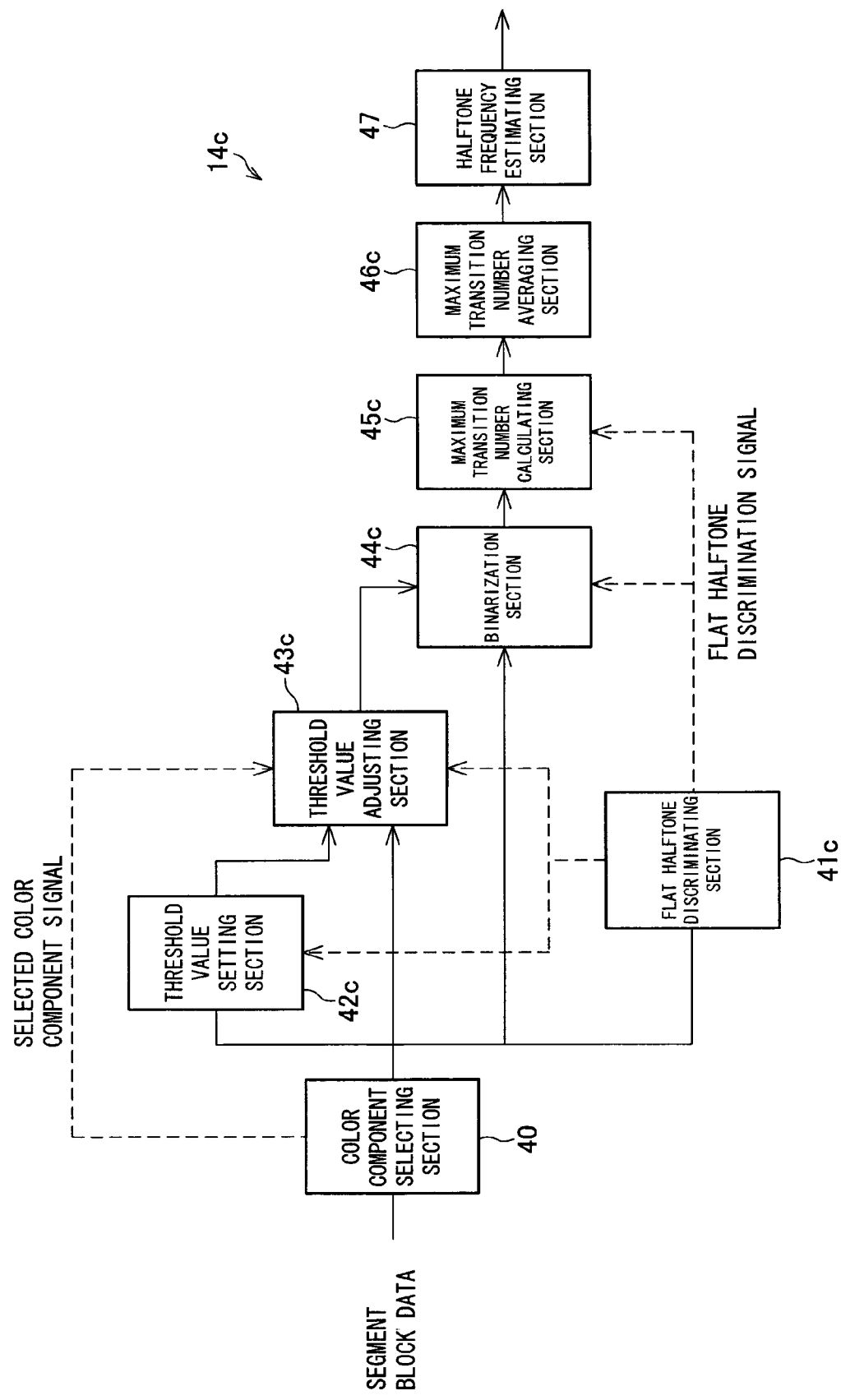
FIG. 28 is a block diagram illustrating a modification 3 of the halftone frequency determining section of the present invention.

In this arrangement, the halftone frequency determining section 14 as illustrated in FIG. 1 is replaced with a halftone frequency determining section (halftone frequency determining means) 14c as illustrated in FIG. 28.

The halftone frequency determining section 14c is provided with a color component selecting section 40, a flat halftone discriminating section (flat halftone discriminating section means) 41c, a threshold value setting section (threshold value determining means) 42c, a threshold value adjusting section (threshold value determining means) 43c, a binarization section (extraction means, binarization means) 44c, a maximum transition number calculating section (extraction means, transition number calculating means) 45c, a maximum transition number averaging section (extraction means, transition number calculating means) 46c, and a halftone frequency estimating section (halftone frequency operating means) 47.

The flat halftone discriminating section 41c performs a flat halftone discriminating process similar to that of the flat halftone discriminating section 41, and outputs a flat halftone discrimination signal flat, which indicates a result of the discrimination, to the threshold value setting section 42c, the threshold value adjusting section 43c, the binarization section 44c, and the maximum transition number calculating section 45c.

Only for the segment blocks for which the flat halftone determination signal of 1 is outputted, the threshold value setting section 42c, the threshold value adjusting section 43c, the binarization section 44c, and the maximum transition number calculating section 45c respectively perform threshold value setting, threshold value adjustment (including calculation of the maximum density difference), binarization, and maximum transition number calculation similar to those corresponding processes performed by the threshold value setting section 42, the threshold value adjusting section 43, the binarization section 44, and the maximum transition number calculating section 45c.

The maximum transition number averaging section 46c calculates an average of all the maximum transition numbers calculated by the maximum transition number calculating section 45.

Figure 29:
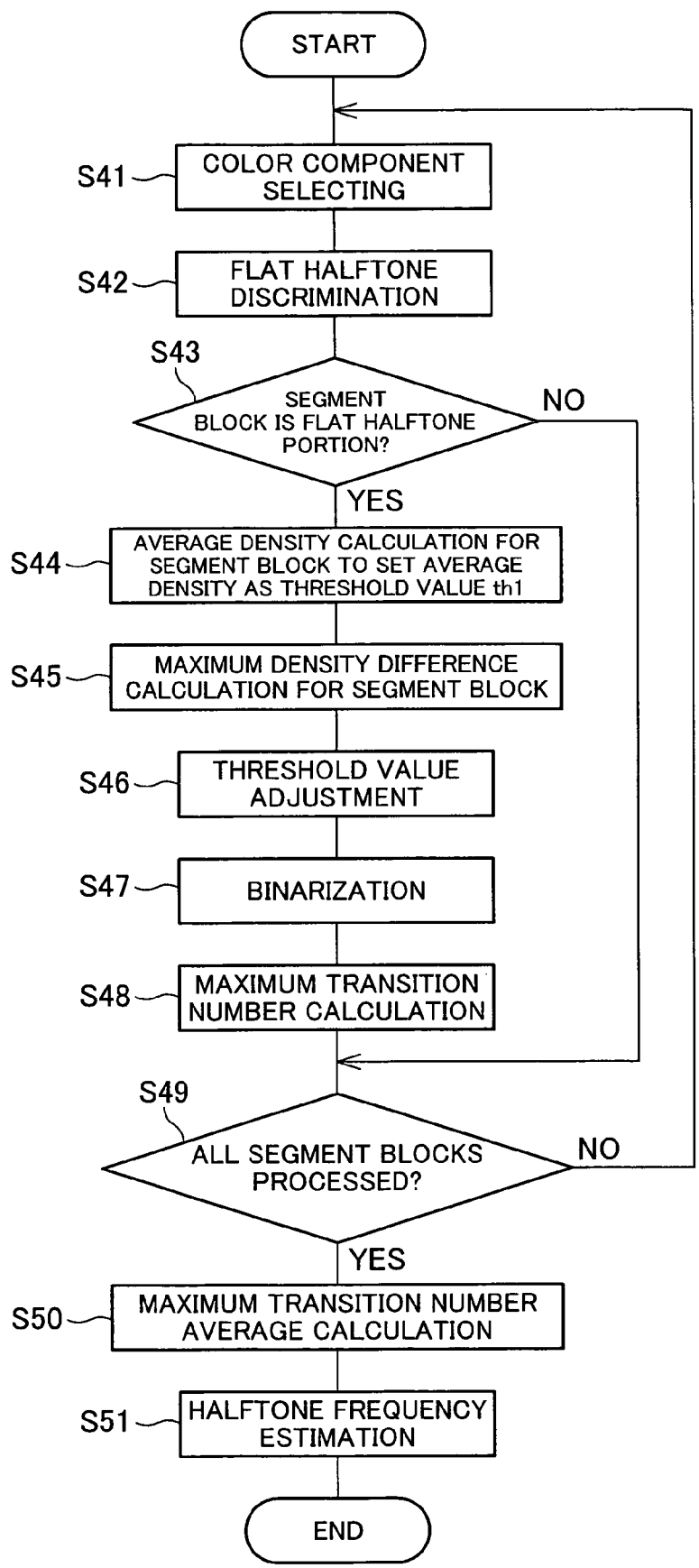
FIG. 29 is a flowchart illustrating a method of process of the halftone frequency determining section as illustrated in FIG. 28.

FIG. 29 is a flowchart illustrating a method of the halftone frequency determining process performed by the halftone frequency determining section 14c.

Firstly, the color component selecting section 40 performs the color component selecting process for selecting a color component having a busyness higher than the rest color components (S41). Next, the flat halftone frequency discriminating section 41c performs the flat halftone frequency discriminating process and outputs the flat halftone frequency discrimination signal flat (S42).

Next, the threshold value setting section 42c, the threshold value adjusting section 43c, the binarization section 44c, and the maximum transition number calculating section 45c judges whether the flat halftone discrimination signal flat is "1" indicating that the segment block is the flat halftone portion, or "0" indicating that the segment block is the non-flat halftone portion. That is, whether the segment block is the flat halftone portion or not is judged (S43).

For the segment block of the flat halftone portion, that is, for the segment block for which the flat halftone discrimination signal flat=1, the threshold value setting section 42c performs the threshold value setting to set the average density as the threshold value th1 (S44), the threshold value adjusting section 43c performs calculation of the maximum density difference (S45) and threshold value adjustment by Equations (3) using the adjusting value that corresponds to the selected color component signal (S46), the binarization section 44c performs the binarization (S47), and the maximum transition number calculating section 45c performs the maximum transition number calculation (S48) in this order, followed by S49.

On the other hand, for the segment block of the non-flat halftone portion, that is, for the segment block for which the flat halftone discrimination signal flat=0, the process goes to S49 with the threshold value setting section 42c, the threshold value adjusting section 43c, the binarization section 44c, the maximum transition number calculating section 45c performing nothing.

Next, at S49, it is judged whether or not the processes are done for all the segment blocks. If not, the processes of the S41 to S48 are repeated for the next segment block.

If yes, the maximum transition number averaging section 46c calculates out an average of the maximum transition numbers, calculated at S48, of the whole halftone region (S50). Note that the maximum transition numbers of the segment blocks for which the flat halftone discrimination signal flat=1 are calculated out at S48. Therefore, the average of the maximum transition numbers of the segment blocks of the flat halftone portion is calculated out at S50. Then, the halftone frequency estimating section 47 estimates the halftone frequency of the halftone region from the average calculated out by the maximum transition number averaging section 46c (S51). By this the halftone frequency determining process is completed.

As described above, the threshold value setting section 42c, threshold value adjusting section 43c, binarization section 44c, and maximum transition number calculating section 45c are only required to perform the threshold value setting, threshold value adjustment, binarization, and maximum transition number calculation respectively with respect to only the segment blocks judged as the flat halftone portion(s). Thus, the halftone frequency determining process may be improved by using only one CPU.

Moreover, the maximum transition number averaging section 46c calculates out the average of the maximum transition numbers of the segment blocks judged as the flat halftone portion(s). That is, the calculated-out maximum transition number average reflects the flat halftone portion(s) in which the density transition is low and from which the binary data correctly reproducing the halftone frequency can be generated. With this, the halftone frequency can be determined highly accurately by determining the halftone frequency by using the maximum transition number average.

<Modification 4>

In the arrangement described above, the flat halftone discriminating process is performed by the flat halftone discriminating section 41, based on the difference in density between the adjacent pixels. However, the flat halftone discriminating process is not limited to this arrangement. For example, flat halftone discriminating process of the G (Green) image data illustrated in FIG. 14(b) may be performed by the flat halftone discriminating section 41 in the following manner.

To begin with, average densities Ave_sub 1 to 4 of pixels of sub segment blocks 1 to 4, which are tetrametric of the segment block illustrated in FIG. 14(b), are obtained from the following Equations:

$$\text{Ave\_sub1} = \frac{\sum_{i=0}^{4} \sum_{j=0}^{4} f(i, j)}{25}$$

$$\text{Ave\_sub2} = \frac{\sum_{i=0}^{4} \sum_{j=5}^{9} f(i, j)}{25}$$

$$\text{Ave\_sub3} = \frac{\sum_{i=5}^{9} \sum_{j=0}^{4} f(i, j)}{25}$$

$$\text{Ave\_sub4} = \frac{\sum_{i=5}^{9} \sum_{j=5}^{9} f(i, j)}{25}$$

If the following conditional equation using the Ave_sub 1 to 4 is satisfied, a flat halftone discrimination signal of 1, which indicates the segment block is of flat halftone, is outputted. If not, a flat halftone discrimination signal of 0, which indicates the segment block is of non-flat halftone, is outputted. The conditional equation is as follows:

max(|Ave_sub 1−Ave_sub 2|, |Ave_sub 1−Ave_sub 3|, |Ave_sub 1−Ave_sub 4|, |Ave_sub 2−Ave_sub 3|, |Ave_sub 2−Ave_sub 4|, |Ave_sub 3−Ave_sub 4|).

TH_avesub is a threshold value predetermined via experiment.

For example, for the segment block illustrated in FIG. 14(b), Ave_sub 1=136, Ave_sub 2=139, Ave_sub 3=143, Ave_sub 4=140. Then, max(|Ave_sub 1−Ave_sub 2|, |Ave_sub 1−Ave_sub 3|, |Ave_sub 1−Ave_sub 4|, |Ave_sub 2−Ave_sub 3|, |Ave_sub 2−Ave_sub 4|, |Ave_sub 3−Ave_sub 4|)=7. This value is compared with TH_avesub. The flat halftone discrimination signal is outputted based on the comparison.

As described above, in Modification 4, the segment block is partitioned into plural sub segment blocks and the average densities of pixels in respective sub segment blocks are obtained. Then, the judgment on whether the segment block is the flat halftone portion or non-flat halftone portion is made based on the maximum value among the differences between the average densities of the sub segment blocks.

With this modification, it is possible to shorten the time period necessary for the arithmetic process, compared with the arrangement described above in which the judgment using the absolute difference sums subm and subs between adjacent pixels is employed.

Second Embodiment

Another embodiment according to the present invention is described below. Sections having the like functions as the corresponding sections in the first embodiment are labeled with like references and their explanation is omitted here.

The present embodiment relates to an image reading process apparatus provided with a halftone frequency determining section 14 of the first embodiment.

Figure 30:
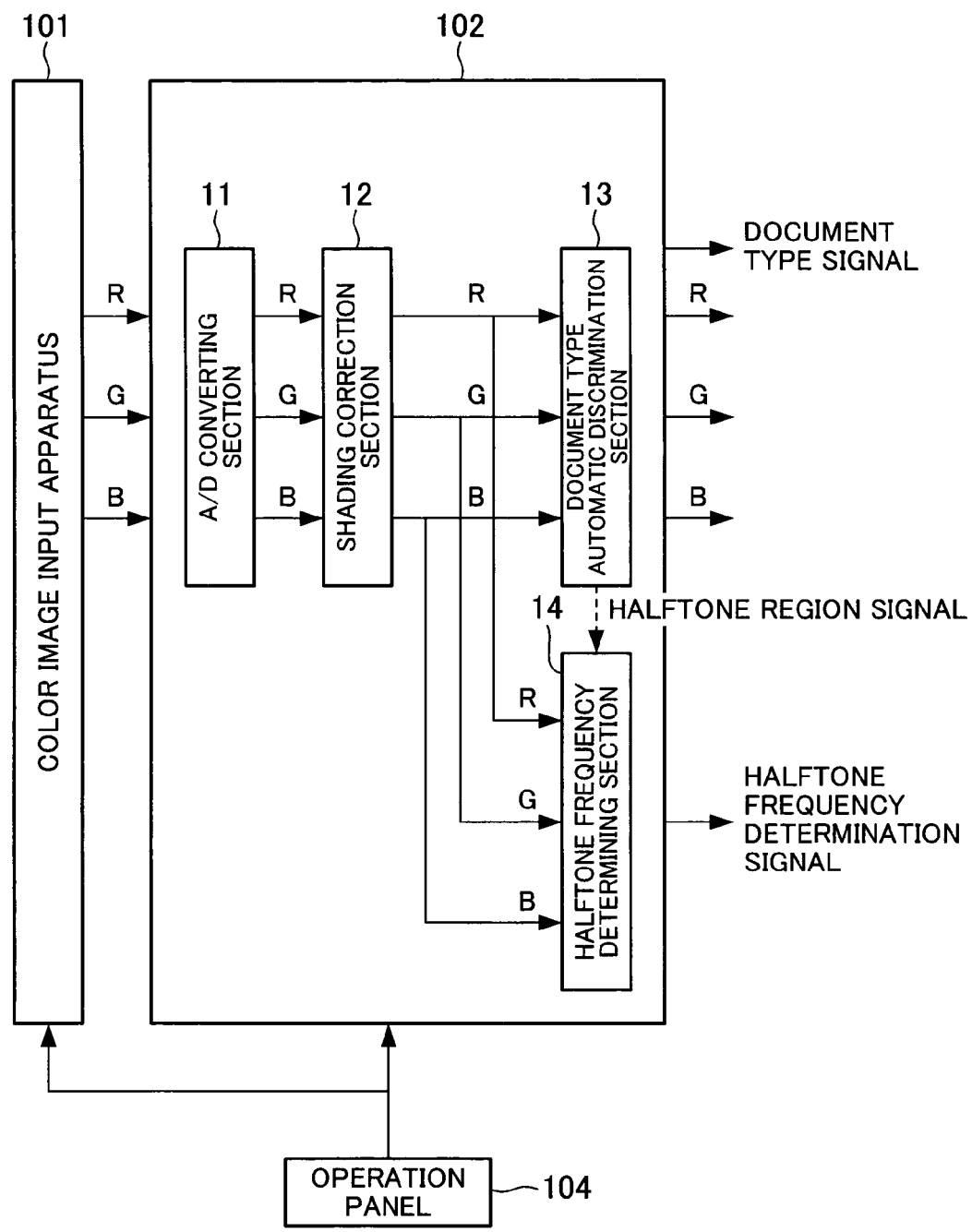
FIG. 30 is a block diagram illustrating an arrangement of an image reading process apparatus according to a second embodiment of the present invention.

The image reading process apparatus according to the present embodiment is, as illustrated in FIG. 30, with a color image input apparatus (image reading apparatus) 101, an image processing apparatus 102, and an operation panel 104.

The operation panel 104 is provided with a setting key(s) for setting operation modes of the image reading process apparatus, ten keys, a liquid crystal display apparatus, and/or the like.

The color image input apparatus 101 is provided with a scanner section, for example. The color image input apparatus 101 reads reflection image from a document via a CCD (Charge Coupled Device) as RGB analog signals (R: red; G: green; and B: blue).

The image processing apparatus 102 is provided with the A/D (analog/digital) converting section 11, the shading correction section 12, the document type automatic discrimination section 13, and the halftone frequency determining section 14, which have been described above.

The document type automatic discrimination section 13 in the present embodiment outputs a document type signal to an apparatus (e.g. a computer, printer or the like) in downstream thereof, the document type signal indicating which type a document is. Moreover, the halftone frequency determining section 14 of the present embodiment outputs a halftone frequency determination signal to an apparatus (e.g. a computer, printer or the like) in downstream thereof, the halftone frequency determination signal indicating halftone frequency determined by the halftone frequency determining section 14.

As described above, the image reading process apparatus outputs the document type signal and the halftone frequency determination signal to the computer in the downstream thereof, in addition to RGB signals representing the document. Alternatively, the image reading process apparatus may be arranged to output these signals to the printer directly, without a computer interposed therebetween. Again in this arrangement, the document type automatic discrimination section 13 is not inevitably necessary. Moreover, the image processing apparatus 102 may be provided with the halftone frequency determining section 14a, the halftone frequency determining section 14b, or the halftone frequency determining section 14c, in lieu of the halftone frequency determining section 14.

[Description on Program and Storage Medium]

Moreover, the halftone frequency determining process according to the present invention may be realized as software (application program). With this arrangement, it is possible to provide a computer or printer with a printer drive in which the software realizing a process that is performed based on the halftone frequency determination result is incorporated.

As an example of the above arrangement, a process that is performed based on the halftone frequency determination result is described below, referring to FIG. 31.

Figure 31:
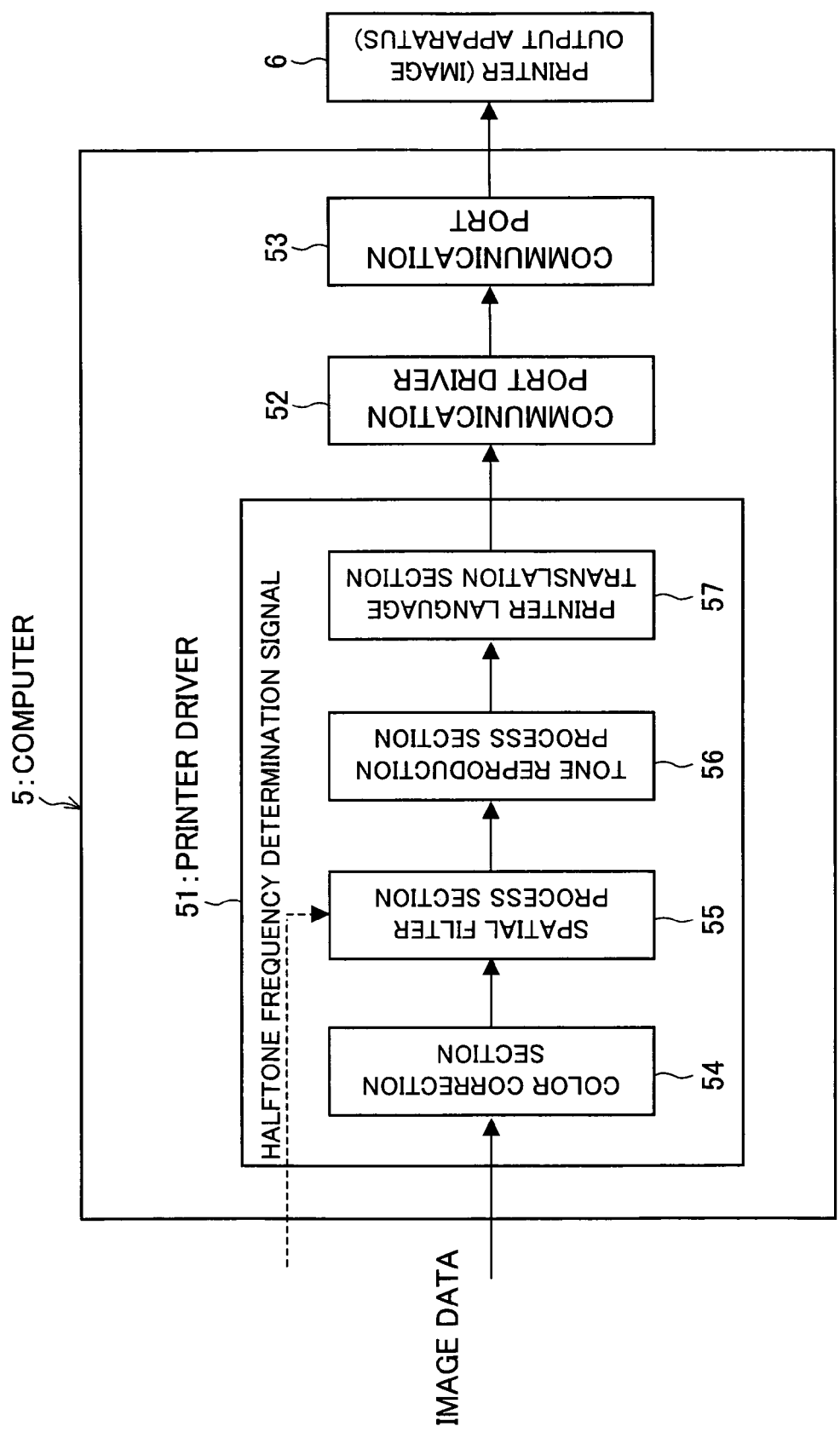
FIG. 31 is a block diagram illustrating an arrangement of the image processing apparatus when the present invention is realized as software (application program).

As illustrated in FIG. 31, a computer 5 is provided with a printer driver 51, a communication port driver 52, and a communication port 53. The printer driver 51 is provided with a color correction section 54, a spatial filter process section 55, a tone reproduction process section 56, and a printer language translation section 57. Moreover, the computer 5 is connected with a printer (image outputting apparatus) 6. The printer 6 outputs an image according to image data outputted thereto from the computer 5.

The computer 5 is arranged such that the image data generated by execution of various application program(s) is subjected to color correction process performed by the color correction section 54 thereby to remove color inaccuracy. Then, the image data is subjected to filtering process performed by the spatial filter process section 55. The filtering process is based on the halftone frequency determination result. In this arrangement, the color correction section 54 also performs black generating/background color removing process.

The image data subjected to the above processes is then subjected to a tone reproduction (intermediate tone generation) by the tone reproduction process section 56. After that, the image data is translated into a printer language by the printer language translation section 57. Then, the image data translated in the printer language is inputted into the printer 6 via the communication port driver 52, and the communication port (for example, RS232C, LAN, or the like) 53. The printer 6 may be a digital complex machine having a copying function and/or faxing function, in addition to the printing function.

Moreover, the present invention may be realized by recoding, in a computer-readable storage medium, a program for causing a computer to execute the image processing method in which the halftone frequency determining process is performed.

Thereby, a storage medium in which the program for performing the image processing method in which the halftone frequency is determined and suitable processes are performed based on the halftone frequency determined can be provided in a form that allows the storage medium to be portably carried around.

As long as the program is executable on a microcomputer, the storage medium may be (a) a memory (not illustrated), for example, a program medium such as ROM, or (b) a program medium that is readable on a program reading apparatus (not illustrated), which serves as an external recording apparatus.

In either arrangement, the program may be such a program that is executed by the microprocessor accessing to the program stored in the medium or such a program that is executed by the microprocessor executing the program read out and downloaded to a program recording area (not illustrated) of the microcomputer. In this case, the microcomputer is installed in advance with a program for downloading.

In addition, the program medium is a storage medium arranged so that it can be separated from the main body. Examples of such a program medium includes storage media that hold a program in a fixed manner, and encompasses: tapes, such as magnetic tapes, cassette tapes, and the like; magnetic disks, such as flexible disks, hard disk, and the like; discs, such as CD-ROM, MO, MD, DVD, and the like; card-type recording media, such as IC cards (inclusive of memory cards), optical cards and the like; and semiconductor memories, such as mask ROM, EPROM (erasable programmable read only memory), EEPROM (electrically erasable programmable read only memory), flash ROM and the like.

Alternatively, if a system can be constructed which can connect to the Internet or other communications network, the program medium may be a storage medium carrying the program in a flowing manner as in the downloading of a program over the communications network. Further, when the program is downloaded over a communications network in this manner, it is preferable if the program for download is stored in a main body apparatus in advance or installed from another storage medium.

The storage medium is arranged such that the image processing method is carried out by reading the recording medium by using a program reading apparatus provided to a digital color image forming apparatus or a computer system.

The computer system is provided with an image input apparatus (such as a flat head scanner, film scanner, digital camera, or the like), a computer for executing various processes inclusive of the image process method by loading thereon a certain program(s), an image display device (such as a CRT display apparatus, a liquid crystal display apparatus, or the like), and a printer for outputting, on paper or the like, process result of the computer. Further, the computer system is provided with communication means (such as a network card, modem, or the like) for being connected with a server or the like via the network.

So far, described are the arrangements in which the prevention of extracting the signal of the unnecessary color component from the composite color halftone region (i.e., removing the signal of the unnecessary color component) is carried out by changing, per segment block, the threshold value for use in the binarization of the image data of the selected color component. That is, the threshold value adjusting section is a particular color component extracting means for extracting selectively the signal of the color component in question, which has been selected by the color component selecting section. However, the removal of the signal of the unnecessary color component is not limited to this. For example, the necessary signal can be selected according to color balance in the image data consisting of the RGB signals.

More specifically, this can be carried out as follows.

As to the halftone pixel or the segment block of the halftone region detected by the document type automatic discrimination section 13, the color component selecting section 40 selects a color component that has a larger busyness than the other color components. If the input image is in composite color halftone, it is desirable that, among CMY in each segment block, only the color having a larger density change (busyness) than the rest be taken into consideration and the halftone frequency of the color be used for determining the halftone frequency of the document. Further, it is desirable that dots of the color having the larger density transition than the rest are processed by using a channel (signal of the input image data) most suitable for representing the density of the dots of the color. Specifically, for a composite color halftone consisted mainly of magenta dots as illustrated in FIG. 14(*a*), G (green) image (complementary color for magenta) is used, which is most suitable for processing magenta. This makes it possible to perform halftone frequency determining process which is based on substantially only the magenta dots. In the segment block as illustrated in FIG. 14(*a*), G (Green) image data is the image data having the larger busyness than the other image data. Thus, for the segment block as illustrated in FIG. 14(*a*), the color component selecting section 40 selects the G (Green) image data as image data to be outputted to the threshold value setting section 42, the threshold value adjusting section 43, and the binarization section 44.

In this process, it is possible to limit the dots in question to the magenta dots. Thus, the feature representing the frequency can be calculated out without the influence from the dots of the color components other than the magenta component, thereby making it possible to perform highly accurate frequency determination for the composite color halftone.

For example, the color component selecting section 40 may output, to the maximum transition number calculating section 45, the selected color component signal that indicates the selected color component.

The maximum transition number calculating section 45 calculates out a maximum transition number of the segment block from a transition number (m rev) of the binary data obtained from main scanning lines and sub scanning lines, i.e., how many times the binary data, obtained from main scanning lines and sub scanning lines, is switched over. Here, based on the balance of pixel values of the R, G, B images that correspond to the pixels for which the binary data is switched over, the maximum transition number calculating section 45 can perform its calculation based on only the dots (here, magenta dots) of the color component in order to obtain the transition number, the color component being indicated by the selected color component signal sent thereto from the color component selecting section 40. With this, the maximum transition number calculating section 45 can count the transition number of the dots of the color in question selectively.

Moreover, the halftone frequency determination is not limitedly applicable the removal of the signal of the unnecessary color component in dealing with the composite color halftone region. For example, the removal of the signal of the unnecessary color component may be applied to the extraction of the halftone region.

As described above, an image processing apparatus according to the present invention may be an image processing apparatus 2 provided with a halftone frequency determining section (halftone frequency determining means) 14 for determining a halftone frequency of an image that has been read from a document by an image reading apparatus. The halftone frequency determining section 14 includes: a color component selecting section (color component selecting means) 40 for selecting a color component which has a larger busyness than other color components; and a maximum transition number calculating section (maximum transition number calculating means) 45 for calculating (counting) a transition number of binary data with respect to dots of the color component selected by the color component selecting section 40.

In other words, the maximum transition number calculating section 45 is a particular color component signal extracting means for detecting only a feature that corresponds to the dots of the color component selected by the color component selecting section 40.

With this, it is possible to remove the signal of the unnecessary color component.

As described above, an image processing apparatus according to the present invention is provided with halftone frequency determining means for determining halftone frequency of an image that has been read from a document by an image reading apparatus, the halftone frequency determining means being arranged as follows. The halftone frequency determining means is provided with flat halftone discriminating means for extracting information of density distribution per segment block consisting of a plurality of pixels, and discriminating, based on the information of density distribution, whether the segment block is a flat halftone region in which density transition is low, or a non-flat halftone region in which the density transition is high; threshold value determining means for determining a threshold value by using an adjusting value that is predetermined in accordance with a reading property of the image reading apparatus with respect to respective color components, the threshold value being for use in extraction of a feature of density transition between pixels; extracting means for extracting, by using the threshold value determined by the threshold value determining means, the feature of density transition between pixels of the segment block which the flat halftone discriminating means discriminates as the flat halftone region; and halftone frequency estimating means for estimating the halftone frequency, based on the feature extracted by the extracting means.

Here, the segment block is not limited to a rectangular region and may have any kind of shape arbitrarily.

In this arrangement, the flat halftone discriminating means extracts information of density distribution per segment block consisting of a plurality of pixels, and discriminates, based on the information of density distribution, whether a given segment block is a flat halftone region (in which the density transition is low) or a non-flat halftone region (in which the density transition is high). Then, the extracting means extracts the feature of density transition between pixels of the segment block which the flat halftone discriminating means discriminates as the flat halftone region. The halftone frequency is determined based on the feature.

As described above, the halftone frequency is determined based on the feature of density transition between pixels of the segment block which is included in the flat halftone region in which the density transition is low. That is, the determination of the halftone frequency is carried out after removing the influence of the non-flat halftone region in which the density transition is high and which causes erroneous halftone frequency determination. In this way, accurate halftone frequency determination is attained.

Moreover, the reading property of the image reading apparatus with respect to respective color components is, for example, a filter spectral property of the image reading apparatus (such as a scanner) with respect to the respective color component, a spectral reflection property of ink with respect to the respective color component, or the like property of the image reading apparatus. For instance, G (Green) image data is theoretically consists of only magenta, which is in a complementary color of green. However, in reality, unnecessary cyan component is also mixed in the G (Green) image data due to the reading property of the image reading apparatus with respect to the document. An extent of influence given by the cyan component is varied depending on the reading property.

Therefore, the adjusting value is predetermined considering the extent of the influence given to the image data by the unnecessary color component other than the particular color component. The use of the adjusting value in determining the threshold value, the threshold value determining means can determine the threshold value so that the influence given by the unnecessary color component is removed from the threshold value.

Further, the extracting means extracts the feature of density transition between pixels according to the threshold value determined by the threshold value determining means. With this, the feature extracted by the extracting means is not influenced by the unnecessary color component. Therefore, the halftone frequency determination based on the particular color component can be performed by determining the halftone frequency from the feature extracted from the extracting means. That is, it is possible to perform highly accurate halftone frequency determination even for the composite color halftone region.

In addition to the above arrangement, the image processing according to the present invention may be arranged such that the extracting means is provided with: binarization means for performing the binarization in order to generate binary data of each pixel of the segment block according to the threshold value determined by the threshold value determining means; transition number calculating means for calculating a transition number of the binary data generated by the binarization means; and transition number extracting means for extracting, as the feature, a transition number of the segment block which the flat halftone discriminating means discriminates as the flat halftone region, from among the transition numbers calculated out by the transition number calculating means.

The binarization with respect to the non-flat halftone region in which the density transition is high results in unfavorable discrimination of the white pixel portion (low density halftone portion) and black pixel portion (high density halftone portion) as illustrated in FIG. 32(d). Such binarization does not generate the binary data that extracts only the printed portion of the halftone thereby correctly reproducing the halftone frequency, as illustrated in FIG. 32(c).

However, even if the binarization using a single threshold value is used with respect to the segment blocks, the above arrangement allows discriminating the flat halftone region in which the density transition is low and from which the binary data from which the halftone frequency can be reproduced correctly can be generated. Then, the transition number extracting means extracts, as the feature, only the transition number of the segment block that is discriminated as the flat halftone region by the flat halftone discriminating means, from among the transition numbers calculated out by the transition number calculating means.

With this, the transition number extracted as the feature corresponds to the flat halftone region in which the density transition is low and from which the binary data correctly reproducing the halftone frequency can be generated. Therefore, the use of the transition number extracted as the feature makes it possible to determine the halftone frequency accurately.

If the binarization was carried out with a fixed threshold value but not the threshold value adjusted by the threshold value determining means, the halftone frequency of the composite color region in which a plurality of colors such as cyan, magenta, and/or yellow is used could not be correctly reproduced sometimes because dots of a plurality of color components would be extracted together.

However, with this arrangement, the threshold value determining means determines (i.e., decides) the threshold value by using the adjusting value predetermined in consideration of the reading characteristics of the reading device with respect to the respective components. With this, the threshold value determining means can determine the threshold value, for example, to fall in a range between the density of the halftone of the particular color component and the density of the unnecessary color component other than the particular color component.

The binary data is generated based on the threshold value, whereby the binary data generated is not influenced by the unnecessary color component. As a result, even for the composite color halftone, it becomes possible to generate the binary data in which the halftone of the desired particular color component is selectively extracted. Highly accurate halftone determination can be attained by using the transition number of such binary data.

In addition to the above arrangement, the image processing apparatus according to the present invention may be arranged such that the extracting means is provided with binarization means for performing the binarization in order to generate, according to the threshold value determined by the threshold value determining means, binarization data of each pixel in the segment block that the flat halftone discriminating means discriminates as the flat halftone region; and transition number calculating means for calculating out, as the feature, a transition number of the binary data generated by the binarization means.

In this arrangement, the binarization means generates the binary data of each pixel in the segment block that is discriminated as the flat halftone region by the flat halftone discriminating means. Then, the transition number calculating means calculates out, as the feature, the transition number of the binary data generated by the binarization means. Therefore, the transition number calculated as the feature corresponds to the flat halftone region in which the density transition is low and from which the binary data that reproduces the halftone correctly can be generated. Therefore, the use of the transition number calculated as the feature allows accurate halftone frequency determination.

In addition to the above arrangement, the image processing apparatus may be arranged such that the threshold value determining means determines the threshold value from an average density of the pixels in the segment block.

With this arrangement, from the average density of the pixels in the current block, the threshold value determining means can operate based on a value located substantially equal to the median of the density range of the current block. Thereby, the threshold value determining means adjusts, by using the adjusting value, the threshold value from the value located substantially equal to the median of the density range. The threshold value adjusted can be within a density range that allows the generation of binary data that correctly reproduces the halftone frequency of the desired color component. This makes it easier to obtain the binary data that correctly reproduces the halftone frequency of the desired color component.

Moreover, by comparing the average density and the median of the density range, the threshold value determining means can determine whether the image is a halftone-based or white-based. Here, the term "halftone-based" means a state of an image in which a color of a color material used (e.g., cyan, magenta, yellow, or a composite color using any of them) in the halftone is dominant. The term "white-based" means is a state of an image in which a color of paper is dominant. For example, assume a case of the density range of 0 to 255, where "0" is white and "255" is a color (e.g., cyan, magenta, or yellow) indicated by a signal of a color component (i.e., a case of a CMY signal which is of complementary color transformation of a RGB signal). Here, if the average density is larger than the median, the image is judged as being halftone-based. If the average density is smaller than the median, the image is judged as being white-based. If the image is halftone-based, the threshold value determining means determines the threshold value by using the adjusting value, so that the threshold value is a value obtained by subtracting a predetermined value from the average density. The threshold value is a value between (a) a density at a peak position of a pixel peak of white dots of the particular color component (here, this density value is a minimal value of the pixel peak) and a density at a peak position of a pixel peak of white dots of the unnecessary color component (here, this density value is a minimal value of the pixel peak). As a result, the transition number calculated out by the transition number calculating means becomes a value that corresponds only to the pixel peak of the white dots in the halftone-based state of the particular color component. With this, the halftone frequency of the desired particular color component can be determined correctly.

On the other hand, if the image is white-based, the threshold value determining means determines the threshold value by using the adjusting value, so that the threshold value is a value obtained by adding a predetermined value to the average density. The threshold value is a value between (a) a density at a peak position of a pixel peak of a white dot of the particular color component (here, this density value is a maximum value of the pixel peak) and a density at a peak position of a pixel peak of a white dot of the unnecessary color component (here, this density value is a maximum value of the pixel peak). As a result, the transition number calculated out by the transition number calculating means becomes a value that corresponds only to the pixel peak in the white-based state of the particular color component. With this, the halftone frequency of the desired particular color component can be determined correctly.

In addition to the above arrangement, the image processing apparatus according to the present invention may be arranged such that the threshold value determining means determines the threshold value from density information of the segment block.

If the threshold value determined by the threshold value determining means was excessively large, such excessively large threshold value would even lead to failure of extracting the dots of the desired particular color component. If the threshold value determined by the threshold value determining means was excessively small, such excessively small threshold value would even lead to extraction of the dots of plural kinds of color components, not only the dots of the desired particular color component.

However, in this arrangement, the determination is based on the density information (e.g., maximum density difference) of the current block. Therefore, with this arrangement, it is easier for the threshold value determining means to determine the threshold value within such a range within which the threshold value allows extracting the particular color component selectively. This arrangement makes it easier to obtain binary data that correctly reproduces the halftone frequency of the particular color component.

In addition to the above arrangement, the image processing apparatus according to the present invention may be arranged such that the flat halftone discriminating means performs the discrimination whether the segment block is the flat halftone region or not based on density differences between adjacent pixels in the segment block.

With this arrangement, the use of the density differences between the adjacent pixels allows more accurate determination as to whether the segment block is the flat halftone region or not.

In addition to the above arrangement, the image processing apparatus according to the present invention may be arranged such that the segment block is partitioned into a predetermined number of sub segment blocks; and the flat halftone discriminating means finds average densities of pixels in the sub segment blocks, and performs the discrimination whether the segment block is the flat halftone region or not based on a difference(s) between the average densities of the sub segment blocks.

With this arrangement, the flat halftone discriminating means uses the difference(s) in the average densities between the sub blocks in determining the flat halftone region. Therefore, the processing time of the flat halftone discriminating means can be shorter compared with the arrangement in which the difference between the pixels is used.

An image forming apparatus may be provided with the image processing apparatus of any of these arrangements.

By employing an image process in which the halftone frequency of the input image data is considered, e.g., by employing a filter process most suitable for the halftone frequency, this arrangement suppresses the moiré while avoiding deterioration of the sharpness and out-of-focusing as much as possible. Moreover, by detecting a character on halftone only in the halftone regions of 133 line/inch or higher and performing a most suitable process for such a character on halftone, it is possible to suppress the image quality deterioration by erroneous determination which is frequently caused for the halftones of halftone frequencies less than 133 line/inch. With this, it is possible to provide an image forming apparatus that outputs an image of good quality.

An image reading process apparatus may be provided with the image processing device of any of these arrangements.

With this arrangement, it becomes possible to output a halftone frequency determination signal based on accurate halftone frequency determination with respect to the halftone region included in the document.

By using an image process program for causing a computer to serve as each means of the image processing device of any of these arrangement, it is possible to easily realize the each means by using a general-purpose computer.

Moreover, the image processing program is preferably stored in a computer-readable storage medium.

With this arrangement, it is possible to easily realize the image processing apparatus on the computer by using the image processing program read out from the storage medium.

Moreover, an image processing method according to the present invention is applicable to digital color copying machines. In addition, the image processing method is also applicable to any apparatus that is required to reproduce the inputted image data with higher reproduction quality. An example of such an apparatus is an image reading apparatus such as scanners.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:
a halftone frequency determining section for determining a halftone frequency of an image that has been read from a document by an image reading apparatus,
the halftone frequency determining section comprising:
a flat halftone discriminating section for extracting information of density distribution from a segment block consisting of a plurality of pixels, and discriminating, based on the information of density distribution, whether the segment block is a flat halftone region in which density transition is low, or a non-flat halftone region in which the density transition is high;
a threshold value determining section for determining a threshold value by using an adjusting value that is predetermined in accordance with a reading property of the image reading apparatus with respect to respective color components, the threshold value being for use in extraction of a feature of density transition between pixels;
an extracting section for extracting, by using the threshold value determined by the threshold value determining section, the feature of density transition between pixels of the segment block which the flat halftone discriminating section discriminates as the flat halftone region; and
a halftone frequency estimating section for estimating the halftone frequency, based only on the feature from the flat halftone region extracted by the extracting section.

2. An image processing apparatus as set forth in claim 1, wherein:
the extracting section comprises:
a binarization section for performing binarization in order to generate binary data of each pixel of the segment block according to the threshold value determined by the threshold value determining section;

a transition number calculating section for calculating a transition number of the binary data generated by the binarization section; and a transition number extracting section for extracting, as the feature, a transition number of the segment block which the flat halftone discriminating section discriminates as the flat halftone region, from among transition numbers calculated out by a transition number calculating section.

3. An image processing apparatus as set forth in claim 2, wherein:

the threshold value determining section determines the threshold value from an average density of the pixels in the segment block.

4. An image processing apparatus as set forth in claim 2, wherein:

the threshold value determining section determines the threshold value from density information of the segment block.

5. An image processing apparatus as set forth in claim 1, wherein:

the extracting section comprises:

a binarization section for performing binarization in order to generate, according to the threshold value determined by the threshold value determining section, binarization data of each pixel in the segment block that the flat halftone discriminating section discriminates as the flat halftone region; and a transition number calculating section for calculating out, as the feature, a transition number of the binarization data generated by the binarization section.

6. An image processing apparatus as set forth in claim 3, wherein:

the threshold value determining section determines the threshold value from an average density of the pixels in the segment block.

7. An image processing apparatus as set forth in claim 5, wherein:

the threshold value determining section determines the threshold value from density information of the segment block.

8. An image processing apparatus as set forth in claim 1, wherein:

the flat halftone discriminating section performs the discrimination whether the segment block is the flat halftone region or not based on density differences between adjacent pixels in the segment block.

9. An image processing apparatus as set forth in claim 1, wherein:

the segment block is partitioned into a predetermined number of sub segment blocks; and the flat halftone discriminating section finds average densities of pixels in the sub segment blocks, and performs the discrimination whether the segment block is the flat halftone region or not based on a difference(s) between the average densities of the sub segment blocks.

10. An image processing apparatus as set forth in claim 1, wherein said halftone frequency estimating section includes a discriminating signal, which indicates the determined halftone frequency.

11. An image processing apparatus as set forth in claim 1, wherein said halftone frequency estimating section estimates the halftone frequency of the halftone region.

12. An image forming apparatus comprising:

an image processing apparatus comprising:

a halftone frequency determining section for determining a halftone frequency of an image that has been read from a document by an image reading apparatus, the halftone frequency determining section comprising:

a flat halftone discriminating section for extracting information of density distribution from a segment block consisting of a plurality of pixels, and discriminating, based on the information of density distribution, whether the segment block is a flat halftone region in which density transition is low, or a non-flat halftone region in which the density transition is high;

a threshold value determining section for determining a threshold value by using an adjusting value that is predetermined in accordance with a reading property of the image reading apparatus with respect to respective color components, the threshold value being for use in extraction of a feature of a density transition between pixels;

an extracting section for extracting, by using the threshold value determined by the threshold value determining section, the feature of density transition between pixels of the segment block which the flat halftone discriminating means discriminates as the flat halftone region; and a halftone frequency estimating section for estimating the halftone frequency, based only on the feature from the flat halftone region extracted by the extracting section.

13. An apparatus for reading an image comprising:

an image processing apparatus comprising:

a halftone frequency determining section for determining a halftone frequency of an image that has been read from a document by an image reading apparatus, the halftone frequency determining section comprising:

a flat halftone discriminating section for extracting information of density distribution from a segment block consisting of a plurality of pixels, and discriminating, based on the information of density distribution, whether the segment block is a flat halftone region in which density transition is low, or a non-flat halftone region in which the density transition is high;

a threshold value determining section for determining a threshold value by using an adjusting value that is predetermined in accordance with a reading property of the image reading apparatus with respect to respective color components, the threshold value being for use in extraction of a feature of density transition between pixels;

an extracting section for extracting, by using the threshold value determined by the threshold value determining section, the feature of density transition between pixels of the segment block which the flat halftone discriminating section discriminates as the flat halftone region; and a halftone frequency estimating section for estimating the halftone frequency, based only on the feature from the flat halftone region extracted by the extracting section.

14. An image processing method comprising:

determining a halftone frequency of an image that has been read from a document by an image reading apparatus using a halftone frequency determining section, the step of determining the halftone frequency comprising:

discriminating a flat halftone using the halftone frequency determining section, the step of discriminating including (a) extracting information of density distribution from a segment block consisting of a plurality of pixels, and (b) discriminating, based on the information of density distribution, whether the segment block is a flat halftone region in which density transition is low, or a non-flat halftone region in which the density transition is high;

determining a threshold value by using a threshold value adjusting section by using an adjusting value that is predetermined in accordance with a reading property of the image reading apparatus with respect to respective color components, the threshold value being for use in extraction of a feature of density transition between pixels;

extracting by using an extraction section, by using the threshold value determined in the step of determining, the feature of density transition between pixels of the segment block which the step of discriminating discriminates as the flat halftone region; and estimating the halftone frequency using the halftone frequency determining section, based on the extracted feature only from the flat halftone region.

15. An image processing method as set forth in claim 14, wherein:

the step of extracting using the extracting section comprises:

performing binarization in order to generate binary data of each pixel in the segment block according to the threshold value determined in the step of determining the threshold value;

calculating out transition numbers of the binary data; and extracting, as the feature, a transition number of the segment block which the step of discriminating discriminates as the flat halftone region, from among the calculated out transition numbers of the binary data.

16. An image processing method as set forth in claim 15, wherein:

the step of determining the threshold value determines the threshold value from an average density of the pixels in the segment block using the threshold value determining section.

17. An image processing method as set forth in claim 15, wherein:

the step of determining the threshold value determines the threshold value from density information of the segment block using the threshold value determining section.

18. An image processing method as set forth in claim 14, wherein:

the step of extracting using the extracting section comprises:

performing binarization in order to generate, according to the threshold value determined in the step of determining the threshold value, binarization data of each pixel in the segment block that the step of discriminating discriminates as the flat halftone region; and calculating out, as the feature, a transition number of the binarization data generated in the step of performing the binarization.

19. An image processing method as set forth in claim 18, wherein:

the step of determining the threshold value determines the threshold value from an average density of the pixels in the segment block using the threshold value determining section.

20. An image processing method as set forth in claim 18, wherein:

the step of determining the threshold value determines the threshold value from density information of the segment block using the threshold value determining section.

21. An image processing method as set forth in claim 14, wherein:

in the step of discriminating, the discrimination whether the segment block is the flat halftone region or not is performed based on density differences between adjacent pixels in the segment block using the halftone frequency determining section.

22. An image processing method as set forth in claim 14, wherein:

the segment block is partitioned into a predetermined number of sub segment blocks;

the step of discrimination finds an average density of the pixels in each sub segment block; and the discrimination whether the segment block is the flat halftone region or not is performed based on a difference (s) between average densities of the sub segment blocks using the halftone frequency determining section.

23. A computer-readable recording medium in which an image processing program for operating an image processing apparatus comprising halftone frequency determining section for determining a halftone frequency of an image that has been read from a document by an image reading apparatus is stored, the program causing the halftone frequency determining section to:

extract information of density distribution per segment block consisting of a plurality of pixels, and discriminating, based on the information of density distribution, whether the segment block is a flat halftone region in which density transition is low, or a non-flat halftone region in which the density transition is high;

determine a threshold value by using an adjusting value that is predetermined in accordance with a reading property of the image reading apparatus with respect to respective color components, the threshold value being for use in extraction of a feature of density transition between pixels;

extract the feature of density transition between pixels of the segment block according to the threshold value; and estimate the halftone frequency, based only on the feature from the flat halftone region.

* * * * *